US010758815B2

United States Patent
Matsui et al.

(10) Patent No.: US 10,758,815 B2
(45) Date of Patent: Sep. 1, 2020

(54) GAME MANAGEMENT DEVICE, GAME SYSTEM, AND COMPUTER-READABLE STORAGE MEDIUM HAVING PROGRAM RECORDED THEREON

(71) Applicant: KONAMI DIGITAL ENTERTAINMENT CO., LTD., Tokyo (JP)

(72) Inventors: Tetsuya Matsui, Tokyo (JP); Tsuyoshi Yamaguchi, Tokyo (JP); Koji Toyohara, Tokyo (JP); Tomoharu Okutani, Tokyo (JP); Keiji Matsukita, Tokyo (JP); Daisuke Sogabe, Tokyo (JP); Toshinori Ajisaka, Tokyo (JP); Kaori Shirobe, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 747 days.

(21) Appl. No.: 15/231,037

(22) Filed: Aug. 8, 2016

(65) Prior Publication Data
US 2016/0339336 A1    Nov. 24, 2016

Related U.S. Application Data

(63) Continuation of application No. PCT/JP2015/052055, filed on Jan. 26, 2015.

(30) Foreign Application Priority Data

Mar. 11, 2014  (JP) ................................. 2014-047323

(51) Int. Cl.
*A63F 9/24* (2006.01)
*A63F 13/2145* (2014.01)
(Continued)

(52) U.S. Cl.
CPC .......... *A63F 13/2145* (2014.09); *A63F 13/30* (2014.09); *A63F 13/35* (2014.09);
(Continued)

(58) Field of Classification Search
CPC .......... A63F 13/2145; A63F 2300/1075; A63F 13/426; A63F 13/812; G06F 3/0482; G06F 3/017
See application file for complete search history.

(56) References Cited

U.S. PATENT DOCUMENTS 5,435,554 A * 7/1995 Lipson .................... A63F 13/10
463/3
5,798,760 A * 8/1998 Vayda ................... G06F 3/0482
715/834

(Continued)

FOREIGN PATENT DOCUMENTS

JP    2000-325654 A    11/2000
JP    2003-71136 A     3/2003

(Continued)

OTHER PUBLICATIONS

Bases Loaded Instruction Manual. Jaleco. 1988. Accessed via the Internet. Accessed Jan. 1, 2020. <URL: http://www.neshq.com/games/b/basesloaded/basesloaded-man02.pdf> (Year: 1988).*

(Continued)

*Primary Examiner* — Dmitry Suhol
*Assistant Examiner* — Carl V Larsen
(74) *Attorney, Agent, or Firm* — Westerman, Hattori, Daniels & Adrian, LLP

(57)  ABSTRACT

A game management device manages a game to be played by selecting with a touch operation, a selectable target from a plurality of selectable targets (for example, pitch types) displayed on a screen. A display control unit display the plurality of selectable targets (for example, a strike pitch (Continued)

location and a ball pitch location) on the screen. An area setting unit sets a plurality of parameter areas respectively corresponding to the plurality of parameters (for example, a strike location and a ball location) within the screen. When performing an operation of moving a selected target to one of the plurality of parameter areas, a parameter setting unit sets a parameter corresponding to the parameter area to which the selected target is moved, the selected target being selected from among the plurality of selectable targets with the contact operation.

5 Claims, 39 Drawing Sheets

(51) Int. Cl.
  *A63F 13/35* (2014.01)
  *A63F 13/533* (2014.01)
  *A63F 13/812* (2014.01)
  *A63F 13/30* (2014.01)
  *A63F 13/426* (2014.01)
  *A63F 13/42* (2014.01)
  *A63F 13/92* (2014.01)

(52) U.S. Cl.
  CPC .......... *A63F 13/426* (2014.09); *A63F 13/533* (2014.09); *A63F 13/812* (2014.09); *A63F 13/42* (2014.09); *A63F 13/92* (2014.09); *A63F 2300/1075* (2013.01)

(56) References Cited

U.S. PATENT DOCUMENTS

| | | | | |
|---|---|---|---|---|
| 8,033,914 B2* | 10/2011 | Yoshikawa | ............ | A63F 13/10 463/36 |
| 8,578,294 B2* | 11/2013 | Eom | ................ | G06F 3/0482 715/769 |
| 2007/0180392 A1* | 8/2007 | Russo | ................ | G06F 3/0482 715/765 |
| 2009/0275371 A1* | 11/2009 | Takahashi | ............ | A63F 13/10 463/3 |
| 2012/0184368 A1* | 7/2012 | Yamaoka | ............ | A63F 13/2145 463/31 |
| 2012/0299827 A1* | 11/2012 | Osborn | ................ | G09G 5/08 345/158 |
| 2013/0104079 A1* | 4/2013 | Yasui | ................ | G06F 3/0482 715/834 |
| 2014/0075388 A1* | 3/2014 | Kuscher | ............ | G06F 3/0482 715/834 |
| 2014/0096050 A1* | 4/2014 | Boblett | ................ | G06F 3/017 715/769 |
| 2014/0298264 A1* | 10/2014 | Pearce | ............ | G06F 3/04883 715/834 |
| 2015/0057056 A1* | 2/2015 | Lee | ................ | A63F 13/426 463/2 |
| 2015/0094127 A1* | 4/2015 | Canose | ................ | A63F 13/42 463/2 |
| 2017/0095734 A1* | 4/2017 | O'Donnell, Sr. | ....... | A63F 13/26 |

FOREIGN PATENT DOCUMENTS

| | | |
|---|---|---|
| JP | 2006-129942 A | 5/2006 |
| JP | 2011-238200 A | 11/2011 |

OTHER PUBLICATIONS

"Professional Baseball Spirits 6", Konami Digital Entertainment Co., Ltd., for PS3, Jul. 16, 2009, cited in Specification (1 page).

Office Action dated Jul. 10, 2018, issued in counterpart Japanese Application No. 2017-132754, with English machine translation. (6 pages).

Office Action dated Jan. 22, 2019, issued in counterpart Japanese Application No. 2017-132754, with English machine translation. (6 pages).

Decision to Grant dated Jun. 6, 2017, issued in counterpart Japanese Application No. 2014-047323, with English machine translation. (6 pages).

Office Action dated Jan. 24, 2019, issued in counterpart Chinese Application No. 201580007840.3, with English machine translation. (17 pages).

Decision to Grant a Patent dated May 31, 2019, issued in counterpart JP Application No. 2017-132754, with English machine translation obtained from JPO website. (5 pages).

Decision to Grant of Patent dated May 17, 2019, issued in counterpart KP Application No. 10-2016-7021625, with English machine translation obtained from JPO website. (4 pages).

Decision to Grant of Patent dated Jul. 10, 2019, issued in counterpart KR Application No. 10-2016-7021625, with machine translation obtained from JPO website (4 pages).

Notice of Allowance dated Jul. 11, 2019, issued in counterpart CN Application No. 201580007840.3, with machine translation obtained from JPO website (3 pages).

* cited by examiner

FIG.3

| PLAYER ID | 001 | |
|---|---|---|
| PLAYER NAME | A | |
| POSITION | PITCHER | |
| PITCH TYPE | | BALL POWER PARAMETER (INITIAL VALUE) | CONTROL PARAMETER (INITIAL VALUE) |
| 1 | FASTBALL | B | F |
| 2 | CURVEBALL | C | F |
| 3 | FORKBALL | F | F |
| 4 | CUTBALL | D | F |
| 5 | CHANGE-UP | E | E |

FIG.15

| SELECTED PITCH TYPE | CHANGES IN PARAMETERS OF NON-SELECTED PITCH TYPES ||
| --- | --- | --- |
| | UP | DOWN |
| FASTBALL | CURVEBALL | FASTBALL |
| | CHANGE-UP | CUTBALL |
| | FORKBALL | SHOOTBALL |
| CURVEBALL | FASTBALL | CURVEBALL |
| | CUTBALL | CHANGE-UP |
| | SHOOTBALL | FORKBALL |
| ⋮ | ⋮ | ⋮ |

FIG.16

| SELECTED PITCH TYPE | CHANGES IN PARAMETERS OF NON-SELECTED PITCH TYPES ||
| --- | --- | --- |
| | UP | DOWN |
| FASTBALL | CURVEBALL +2 | FASTBALL −2 |
| | CHANGE-UP +1 | CUTBALL −1 |
| | FORKBALL +1 | SHOOTBALL −1 |
| CURVEBALL | FASTBALL +2 | CURVEBALL −2 |
| | CUTBALL +1 | CHANGE-UP −1 |
| | SHOOTBALL +1 | FORKBALL −1 |
| ⋮ | ⋮ | ⋮ |

FIG.17

| ATTRIBUTE | PITCH TYPE |
|---|---|
| HIGH SPEED BALL | FASTBALL |
| | CUTBALL |
| | SHOOTBALL |
| | ⋮ |
| LOW SPEED BALL | CURVEBALL |
| | CHANGE-UP |
| | FORKBALL |
| | ⋮ |

FIG.18

| ATTRIBUTE OF SELECTED PITCH TYPE | CHANGES IN PARAMETERS OF NON-SELECTED PITCH TYPES | |
|---|---|---|
| | UP | DOWN |
| HIGH SPEED BALL | LOW SPEED BALL | HIGH SPEED BALL |
| LOW SPEED BALL | HIGH SPEED BALL | LOW SPEED BALL |

FIG.19

| ATTRIBUTE ID | ATTRIBUTE | PITCH TYPE |
|---|---|---|
| 1 | FASTBALL TYPE | FASTBALL |
| | | TWO-SEAM |
| | | ⋮ |
| 2 | MISS SWING TYPE | SLIDER |
| | | HIGH SPEED SINKER |
| | | ⋮ |
| 3 | SWERVE AT HAND TYPE | CUT BALL |
| | | SHOOTBALL |
| | | ⋮ |
| 4 | PITCH TO CONTACT TYPE | SLURVE |
| | | KNUCKLE |
| | | ⋮ |
| 5 | SLOW BALL TYPE | CHANGE-UP |
| | | SLOW CURVEBALL |
| | | ⋮ |
| 6 | FALL BALL TYPE | FORKBALL |
| | | SPLIT |
| | | ⋮ |

FIG.20

| ATTRIBUTE OF SELECTED PITCH TYPE | CHANGES IN PARAMETERS OF NON-SELECTED PITCH TYPE | | |
|---|---|---|---|
| | UP | DOWN | NO-CHANGE |
| FASTBALL TYPE | · MISS SWING TYPE<br>· SWERVE AT HAND TYPE<br>· PITCH TO CONTACT TYPE<br>· SLOW BALL TYPE<br>· FALL BALL TYPE | FASTBALL TYPE | |
| MISS SWING TYPE | · PITCH TO CONTACT TYPE<br>· SLOW BALL TYPE | · MISS SWING TYPE<br>· SWERVE AT HAND TYPE | · FASTBALL TYPE<br>· FALL BALL TYPE |
| SWERVE AT HAND TYPE | · SLOW BALL TYPE<br>· FALL BALL TYPE | · SWERVE AT HAND TYPE<br>· FASTBALL TYPE<br>· PITCH TO CONTACT TYPE | MISS SWING TYPE |
| PITCH TO CONTACT TYPE | · SWERVE AT HAND TYPE<br>· FALL BALL TYPE | · PITCH TO CONTACT TYPE<br>· SLOW BALL TYPE | · FASTBALL TYPE<br>· MISS SWING TYPE |
| SLOW BALL TYPE | · FASTBALL TYPE<br>· MISS SWING TYPE | · SLOW BALL TYPE<br>· PITCH TO CONTACT TYPE<br>· FALL BALL TYPE | SWERVE AT HAND TYPE |
| FALL BALL TYPE | · FASTBALL TYPE<br>· SWERVE AT HAND TYPE | · FALL BALL TYPE<br>· MISS SWING TYPE<br>· SLOW BALL TYPE | PITCH TO CONTACT TYPE |

FIG.21

| PITCH | PITCH TYPE OF SELECTABLE TARGET | | | | SELECTED CARD NUMBER |
|---|---|---|---|---|---|
| | 1 | 2 | 3 | 4 | |
| 1ST PITCH | FASTBALL B | FORKBALL F | CURVEBALL C | FASTBALL B | 4 |
| 2ND PITCH | FASTBALL C | FORKBALL E | CURVEBALL B | CURVEBALL C | 1 |
| 3RD PITCH | CUTBALL D | FORKBALL D | CURVEBALL A | CURVEBALL B | |
| 4TH PITCH | | | | | |
| ⋮ | | | | | |

…

GAME MANAGEMENT DEVICE, GAME SYSTEM, AND COMPUTER-READABLE STORAGE MEDIUM HAVING PROGRAM RECORDED THEREON

CROSS-REFERENCE TO RELATED APPLICATION

This application is based on Japanese Patent Application Serial No. 2014-047323, filed in the Japan Patent Office on Mar. 11, 2014, the contents of which are hereby incorporated by reference.

BACKGROUND OF THE INVENTION

1. Field of the Invention

The present invention relates to a game management device, a game system, and a computer-readable recording medium having recorded thereon program, which control a game.

2. Background Art

Conventionally, a baseball game which requires for a pitching operation, three operations of selecting a pitch type, setting a pitch location, and starting a pitching motion has been proposed. In the case of playing such baseball game with a stationary game device, since these operations can be performed by operating with a controller or the like while displaying a game image on a large size screen such as a television monitor or the like, the user can perform these operations without feeling much stress.

PROFESSIONAL BASEBALL SPIRITS 6, Konami Digital Entertainment Co., Ltd., for PS3, Jul. 16, 2009

However, in the case of the baseball game using a smartphone or the like as the platform, it is possible to incorporate the above operation functions. However, since the screen size is limited, it is difficult to perform complicated operations. In particular, in the case of a portable terminal such as the smartphone, etc., the user is expected to play a game while holding the portable terminal with rasher hand. Therefore, it would be troublesome to perform the operation made up of a plurality of steps. It is therefore desired to simplify the operations.

SUMMARY OF THE INVENTION

It is an object of the present invention to realize a game in which a game operation such as a pitching operation, etc., including a plurality of operation elements can be performed with ease even with a game screen of limited size.

In one aspect of the present invention, a game management device which manages a game to be played by selecting with a touch operation, a selectable target from a plurality of selectable targets displayed on a screen is provided. The game management device includes a display control unit configured to display the plurality of selectable targets on the screen; an area setting unit configured to set a plurality of parameter areas respectively corresponding to the plurality of parameters within the screen; and a parameter setting unit configured when performing an operation of moving a selected target to one of the plurality of parameter areas, to set a parameter corresponding to the parameter area to which the selected target is moved, the selected target being selected from among the plurality of selectable targets with the contact operation.

In another aspect of the present invention, provided is a game system including a server and a terminal device which communicates with the server. The game system is configured to manage a game to be played by selecting with a touch operation in the terminal device, a selectable target from a plurality of selectable targets displayed on a screen, wherein either the server or the terminal device includes a display control unit configured to display the plurality of selectable targets on the screen; an area setting unit configured to set a plurality of parameter areas respectively corresponding to the plurality of parameters within the screen; and a parameter setting unit configured when performing an operation of moving a selected target to one of the plurality of parameter areas, to set a parameter corresponding to the parameter area to which the selected target is moved, the selected target being selected from among the plurality of selectable targets with the contact operation.

The game management device and the game system according to the present invention can also be realized by a computer, in that case, by causing the computer to function as the foregoing respective units, a program and a computer-readable storage medium having recorded thereon the program, that enable the foregoing game management device and the game system by means of a computer would fall under the scope of the present invention.

The object, characteristics and advantages of the present invention become more apparent by the detailed explanation and the accompanying drawings below.

BRIEF DESCRIPTION OF THE DRAWINGS

FIG. 3 is an explanatory diagram illustrating an example of a player database.

FIG. 15 is an explanatory diagram illustrating an example of parameter change information.

FIG. 16 is an explanatory diagram illustrating another example of the parameter change information.

FIG. 17 is an explanatory diagram illustrating an example of pitch type attribute information.

FIG. 18 is an explanatory diagram illustrating another example of the parameter change information.

FIG. 19 is an explanatory diagram illustrating another example of the pitch type attribute information.

FIG. 20 is an explanatory diagram illustrating another example of the parameter change information.

FIG. 21 is an explanatory diagram illustrating an example of the pitch type parameter information managed by a parameter management unit.

BEST MODE FOR CARRYING OUT THE INVENTION

In the following, a game device and a game server as examples of a game management device, a game system, and a computer-readable recording medium having recorded thereon program, according to one embodiment of the present invention are described with reference to the accompanying drawings.

[Configuration of Game Device]

The game device as the game management device according to one embodiment of the present invention can be constituted by a smart phone, a mobile phone terminal, a PHS (Personal Handy-phone System) terminal, a mobile information terminal (PDA: Personal Digital Assistant), a tablet computer, a game dedicated machine, a personal computer, a multi-functional television receiver or the like. In the present embodiment, explanations will be given through an example in which the game device is the smart phone.

The smart phone is a portable terminal that combines a cell phone with a portable information terminal, and by installing a game program, for example, downloaded from the game server in a storage device, it is possible for a user to play various types of games by executing the game program by the CPU (Central Processing Unit) of the smart phone.

Figure 1:
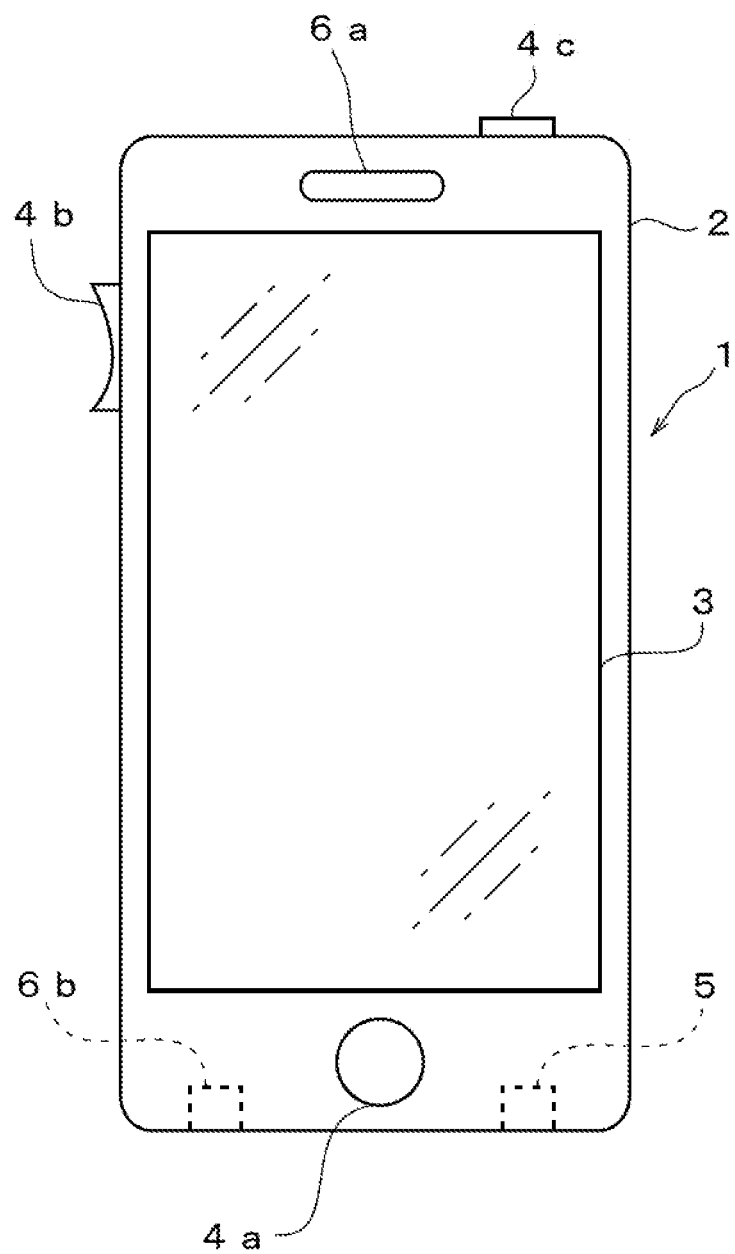
FIG. 1 is a plan view illustrating an appearance of a game device according to an embodiment of the present invention.
Figure 2:
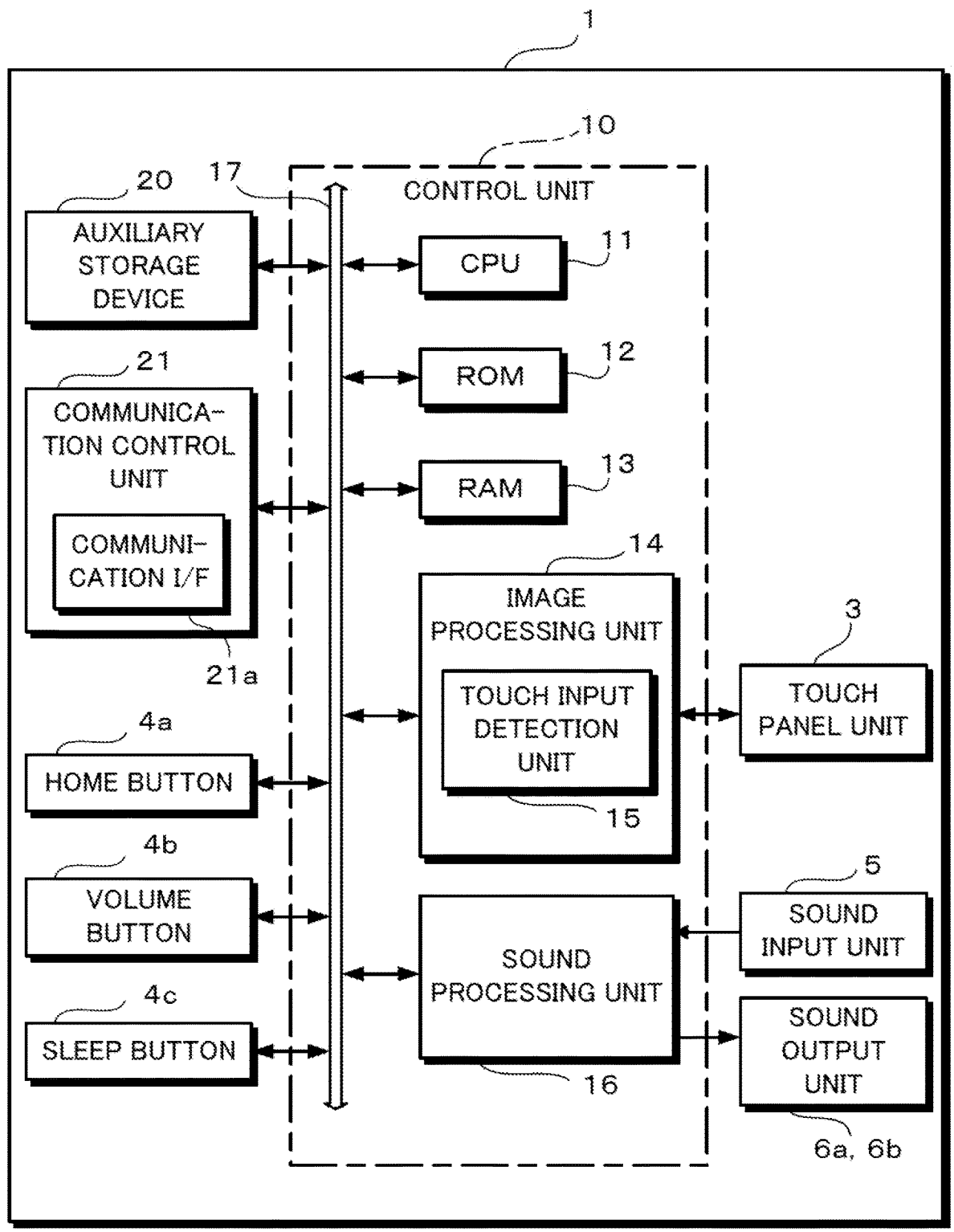
FIG. 2 is a block diagram illustrating an example of a hardware configuration of the game device.

FIG. 1 is the plan view illustrating an appearance of a game device 1 according to the embodiment of the present invention. FIG. 2 is the block diagram illustrating an example of the hardware configuration of the game device 1. The game device 1 has a main body 2, a touch panel unit 3, button operation units 4a, 4b and 4c, a sound input unit 5, and sound output units 6a and 6b.

The touch panel unit 3 is an image display unit of a contact input-type teamed on one of the surfaces of a cabinet of the main body 2. This touch panel unit 3 is constituted by combining a display unit such as a liquid crystal display, etc., with a position input unit provided with a touch interface. With this type of touch panel unit 3, a contact position can be detected by making an indication unit such as a finger of the user, or a pen in contact with the screen, thereby making it possible to perform an intuitive input operation. The touch panel unit 3 of the present embodiment is constituted as a multi-touch projected capacitive touch screen, and it is possible to detect multi-points simultaneously. For the touch panel 3, other types of touch panel may be adopted such as the resistance film type, the infrared ray type, the electromagnetic induction type, the surface capacitive type, and the like.

The button operation unit is made up of a home button 4a, a volume button 4b, a sleep button 4c, and the like, and enables other basic operations than the operation with the touch panel 3 of the button operation. The home button 4a is provided, for example, under the touch panel unit 3 of the main body 2, and by pressing the home button 4a, the home screen is displayed in the touch panel unit 3. The volume button 4b is provided, for example, on the side face of the main body 2, and the volume is increased by pressing the upper part of the volume button 4b, and the volume is decreased by pressing the lower part of the volume button 4b. The sleep button 4c is provided, for example, on top of the main body 2, and by pressing the sleep button 4c, the game device 1 is switched to the sleep state, while by pressing the sleep button 4c in the sleep state, the game device 1 is switched back from the sleep state.

The sound input unit 5 is made up of a microphone built in the main body 2. The sound input unit 5 is configured, for example, to pick up sound from the opening for a microphone provided on the lower surface of the main body 2. This sound input unit 5 is used when performing telephone communication or recording.

The sound output unit 6a is prowled, for example, above the touch panel unit 3 of the main body, and serves as a receiver speaker when performing the telephone communication. The sound output unit 6b is built in the main body 2, and is configured to output sound effect and the like from the output opening provided on the lower surface of the main body 2 when executing the game.

The main body 2 of the game device 1 also stores a headset jack, a connecter for power supply or for connection with a personal computer, a lens for a built-in camera, etc.; however, the explanations thereof are omitted here.

Further, as illustrated in FIG. 2, the game device 1 mainly comprises a control unit 10, an auxiliary storage device 20, and a communication control unit 21.

The control unit 10 includes a CPU 11, a ROM (Read Only Memory) 12 and a RAM (Random Access Memory) 13 as main storage devices, an image processing unit 14 and a sound processing unit 18, which are mutually connected via a bus line 17 including an address bus, a data bus and a control bus and the like. Note that an interface circuit is interposed between the bus line 17 and the respective constituent elements as needed, but the illustration of such interface circuits is omitted in the drawing.

The CPU11 interprets and executes commands of the game program, and controls the game device 1 as a whole. The ROM12 stores a program necessary for the basic operation control of the game device 1. The RAM13 stores various programs and data to secure a work area for the CPU 11.

The image processing unit 14 drives the touch panel unit 3 based on an image display command from the CPU 11, and displays an image on the screen of the touch panel unit 3. In addition, the image processing unit 14 is provided with a touch input detection unit 15. This touch input detection unit 15 is configured to detect the contact position coordinate on the screen when the finger or a pen is in contact with the screen of the touch panel unit 3 and supply a coordinate signal to the CPU11. The CPU 11 then recognizes the contact position on the screen of the touch panel unit 3. Further, when the finger or the like is in contact with the predetermined detection target area displayed on the screen of the touch panel unit 3, the image processing mat 14 supplies the selection signal indicating that the detection target area is selected to the CPU 11. Accordingly, the CPU 11 can recognize that the detection target area on the screen of the touch panel unit 3 is selected.

The sound processing unit 16 converts an analog sound signal into a digital sound signal when sound is input from the sound input unit 5, and generates the analog sound signal based on the sound instruction from the CPU11 and outputs the resulting analog sound signal to the sound output unit 6a or 6b.

The auxiliary storage device 20 is a storage device for storing a game program, various data and the like. As the auxiliary storage device 20, for example a hard disk drive or a flash memory drive, or the like may be used.

The communication control unit 21 comprises a communication interface 21a, and has a communication control function for data communication when the game is executed, and a communication control function for sending and receiving sound data as a portable phone terminal, and the like. Here, the communication control function for data communication includes, for example, a wireless LAN (Local Area Network) connecting function, an internet connecting function via a wireless LAN or a portable phone line network, a near-field wireless communication function using a predetermined frequency tend (for example, a 2.4 GHz frequency band) and the like. The communication control unit 21 emits connection signals for connecting the game server 1 to the wireless LAN or internet based on a command from the CPU 11, and receives information sent from the communication partner and supplies the information as received to the CPU 11.

The game device 1 may also be provided with an imaging device (camera) such as a CCD (Charge Coupled Device) image sensor, a GPS (Global Positioning System) signal reception circuit a triaxle acceleration sensor, or the like.

The game device 1 having the foregoing configuration is capable of executing various types of games by loading the game program stared in the auxiliary storage device 20 into the RAM 13 and executing the downloaded game program by the CPU 11. With this game device 1, it is possible to execute a match type game by connecting it to other game device 1 by a wireless LAN communication, an internet communication, a near field communication, a cable communication or the like, and carrying out sending and receiving of data while making the game devices 1 in sync with one another.

[Game Example]

The game device 1 according to the present embodiment manages (controls) a game in which a user selects one from among the plurality of selectable targets. In the following, explanations will be given through an example of a baseball game in which a pitcher (pitcher character) throws a ball of the pitch type which the user selected from among a plurality of pitch types.

The information on the player characters in the game is managed in a player database. FIG. 3 is an example of the player database. The player database includes the information on all the player characters registered in the game. However, FIG. 3 illustrates the information for just one pitcher character (player ID=001).

In the player information database, stored is the information on players names, positions (defensive positions), pitch types each pitcher character has, etc., in association with a player ID which uniquely identifies each player character. In the example of FIG. 3, the pitcher character with the player ID=001 has five pitch types of the "fastball", the "curveball", the "forkball" the "cutball" and the "change-up".

Further, in the player information database, stored in association with each pitch type of the pitcher character is an initial value of the parameter of the pitch type. In the present embodiment, for the pitch type parameters, two parameters of ball power and ball control are shown as examples. The ball power parameter is a parameter indicating the power of the ball pitched. The ball control parameter is a parameter indicating the ball control (ball control level). For the initial value, a different value is set according to each pitcher character to reflect the fact that the strong pitch type and the weak pitch type are different for each pitcher character. For the pitch type parameter, a change parameter indicating how large the change of the ball pitched is, or the like may be adopted. The pitch type parameters are not limited to the above examples, and it is only required to set at least one parameter.

In the present embodiment, for the ball power parameter and the ball control parameter, one of the eight ranks of "S", "A", "B", "C", "D", "E", "F"and "G" is set, in which the rank "S" is thee highest rank, and the rank is the lowest rank. For the ball power parameter, the higher is the rank, the stronger is the ball power, and for the ball control parameter, the higher is the rank, the better is the ball control. To be described later, each pitch type parameter is subjected to change from the initial value in the game.

Figure 4:
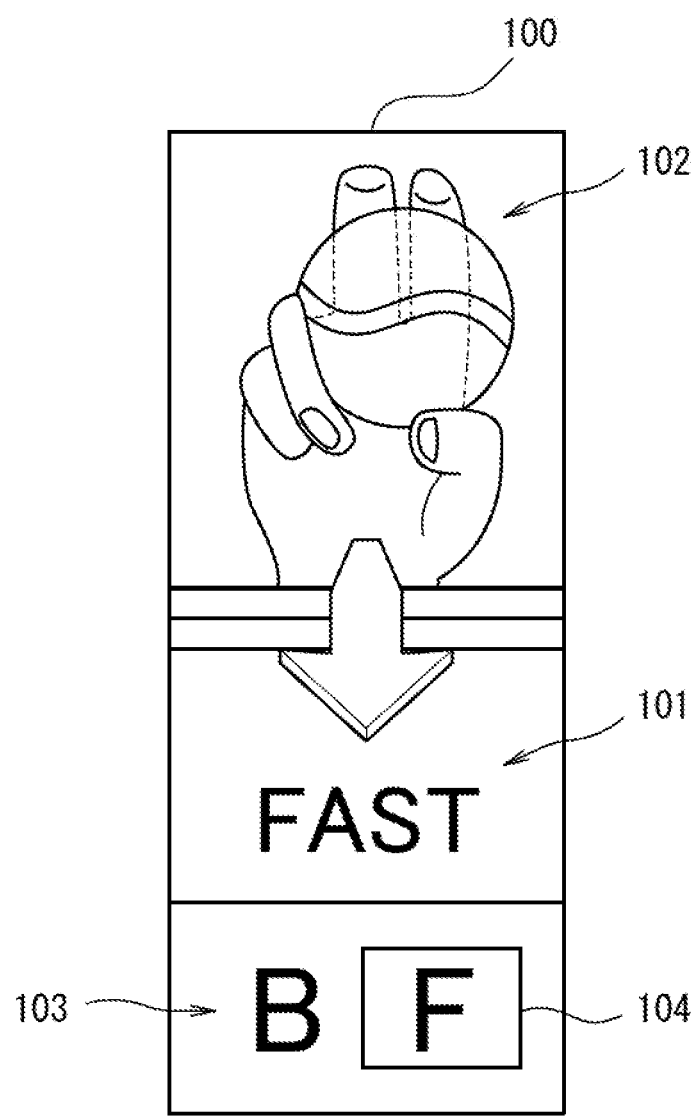
FIG. 4 is an explanatory diagram illustrating an example of a pitch type card.

As illustrated in FIG. 4, in the baseball game of the present embodiment, the pitch type information of each pitcher character is formed in a digital card to visualize the pitch type information on the pitch type of each pitcher character, and the pitch type card 100 as an example of the pitch type selectable target is displayed on the game screen. On this pitch type card 100, displayed area a name 101 of pitch type such as the fastball and the like, an image 102 showing how the ball of the pitch type is gripped, a ball power parameter 103 of the pitch type, a ball control parameter 104 of the pitch type, and the like.

Figure 5:
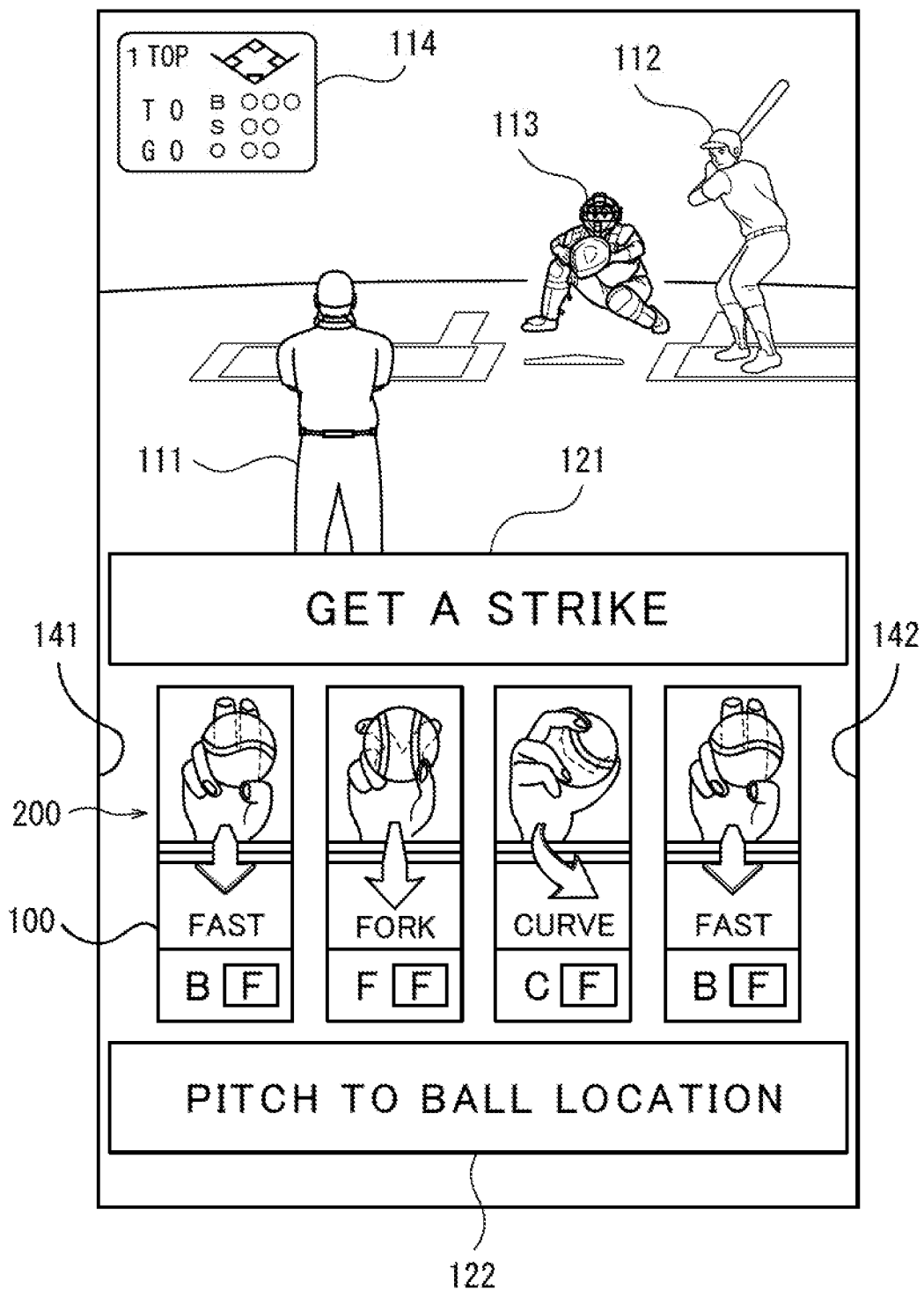
FIG. 5 is an explanatory diagram illustrating an example of a screen for a pitching operation before pitching a first ball.

FIG. 5 illustrates an example of the screen for the pitching operation, for the user to perform an operation for the patching. On this screen for the pitching operation, displayed are the pitcher character 111 to be operated by the user, the batter character 112 of the opponent, the catcher character 113, the game progress information 114 (current inning, score, ball count, information of the runner) and the like. The batter character 112 of the opponent is operated by the opponent user in the on-line match mode, while in the computer match mode, the batter character 112 of the opponent is automatically controlled by the CPU 11. Additionally, the referee character, the stoke zone or the like may be displayed on the screen.

In addition, a predetermined number (four in this example) of pitch type cards 100 are displayed as a plurality of selectable targets. The four pitch type cards 100 to be displayed on the screen as selectable targets are selected at random from among a plurality of pitch type card 100 as the pitch types of the pitcher character 111. In the example of FIG. 4, two fastball cards 100, one forkball card 100, one curveball card 100, in total of four pitch type cards 100 are displayed on the screen. As in this example, two or more pitch type cards 100 of the same pitch type may be displayed. Here, initial values are set for the respective parameters (the ball power parameter and the ball control parameter) of the above four pitch type cards 100 initially displayed on the screen.

Hereinafter, the four pitch type cards 100, which are a plurality of selectable targets displayed on the screen, are referred to as a pitch type card group 200.

Furthermore, on the screen for the pitching operation, displayed are a strike location area 121 and a ball location area 122 for setting parameters of the pitch locations so as to sandwich the pitch type card group 200 in between. In FIG. 5, shown is an example in which the strike location area 121 of a band shape is displayed in the area above the pitch type card group 200, and the ball location area 122 of a band shape is displayed in the area below the pitch type card group 200. In the strike location area 121, for example, displayed is the text information of "Get a strike" so that the user can clearly recognize what area is the strike location area 121. Similarly, in the ball location area 122, displayed is the next information of, for example, "Pitch to ball location".

Figure 6:
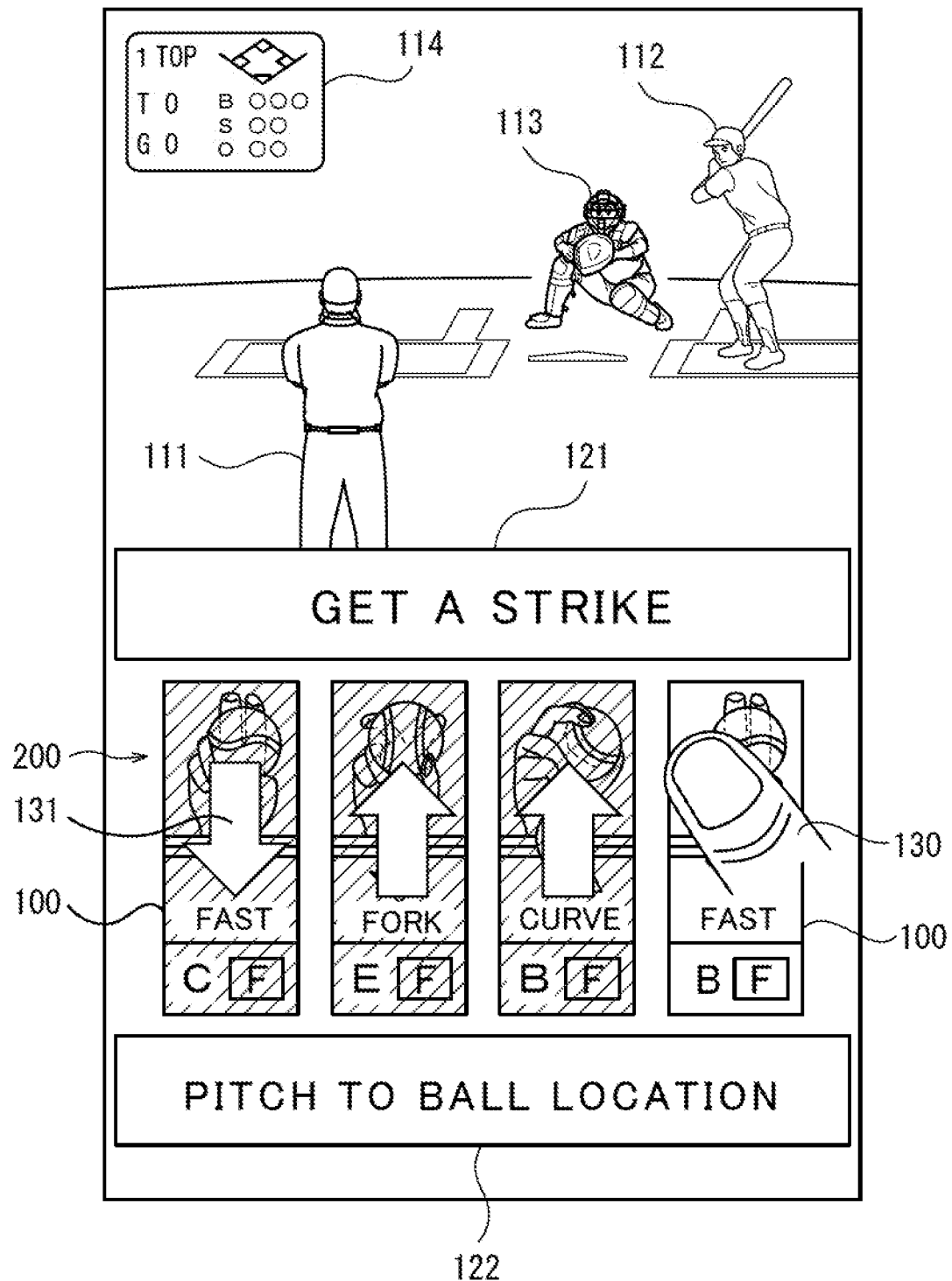
FIG. 6 is an explanatory diagram illustrating an example of a screen for a patching operation when a candidate is designated.

On the above screen for the pitching operation displayed in the touch panel unit 3, the user selects the pitch type and the pitch location by making a contact with the screen. The basic pitching operation is as follows. As illustrated in FIG. 6, the user designates the candidate by making his/her finger in contact with air arbitrary pitch type card 100 from the pitch type card group 200 displayed on the screen. The display state (color, density or the like) of the other remaining pitch type cards 100 than the designated candidate are changed, thereby notifying that the candidate is designated. Alternatively, it may be configured to change the display state of the pitch type card 100 of the candidate by making the finger in contact with the pitch type card 100 of the candidate.

Further, when the candidate is designated in the above described manner, for the remaining pitch type cards 100 ether than the designated candidate, the information on changes in parameters (for example, the information on increase or decreases in parameter expressed using arrows, values, symbols or the like) is displayed on the screen. Namely, when the candidate is designated from the pitch type card group 200, at the stage before the selection of the candidate is confirmed, the user is notified of the changes in parameters of the other remaining pitch type cards 100 on the assumption that the selection of the candidate is confirmed. In the example of FIG. 6, an arrow object 131 indicating an increase or a decrease of the parameter is displayed for each of the other three pitch type cards 100 than the designated candidate.

Incidentally, although the two parameters of the ball power parameter and the ball control parameter are set for each pitch type card 100, in the present embodiment, explained is an example in which the ball power parameter is the only parameter which is subjected to change.

Figure 8:
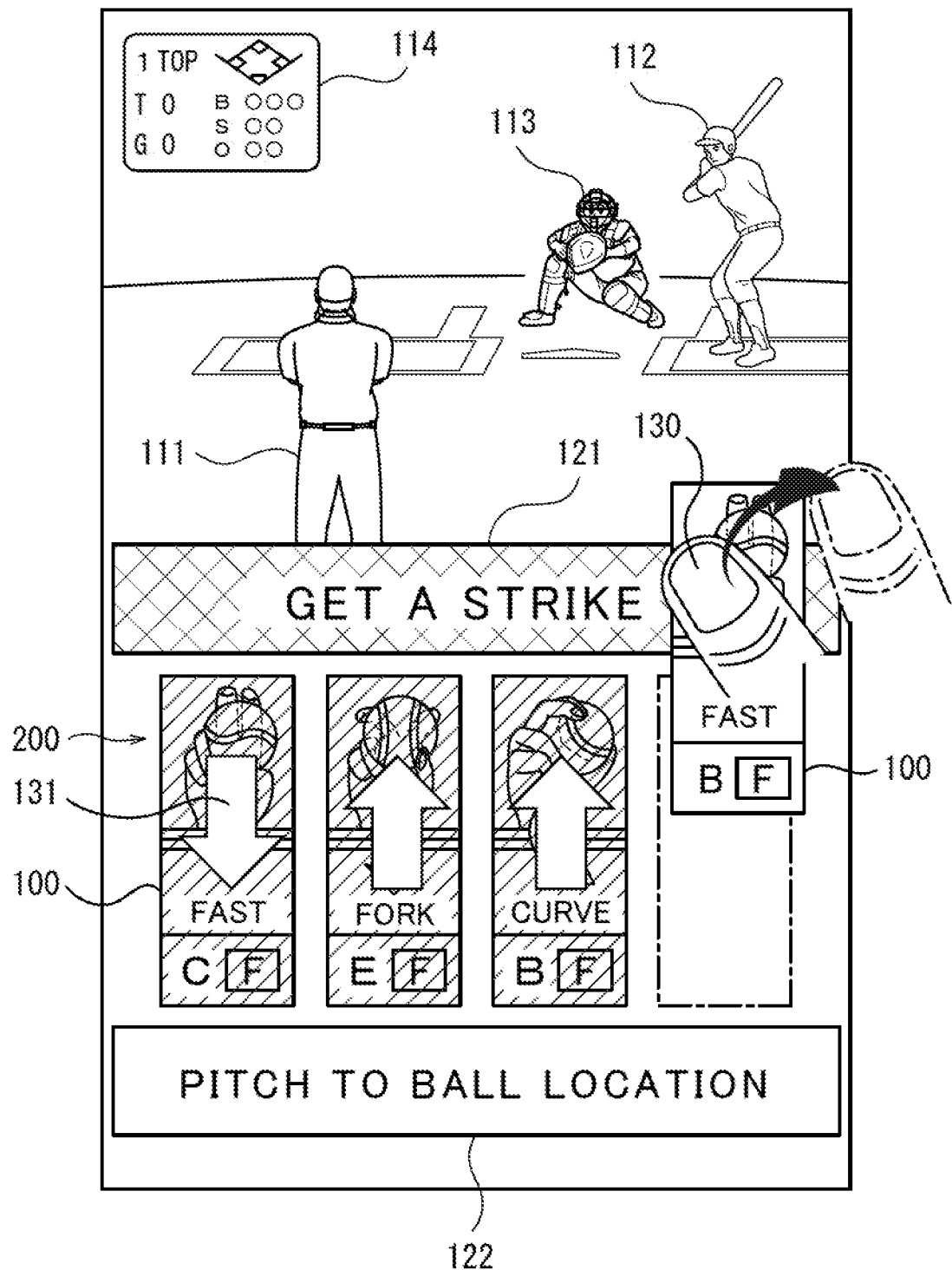
FIG. 8 is an explanatory diagram illustrating an example of the screen when an operation of moving the candidate to a strike location aim is being performed.

Here, a concrete example is shown with reference to FIG. 8. When the user designates by touching (with his/her finger) the pitch type card 100 of the light end of the fastball as the candidate, the downward arrow object 131 is displayed for the pitch type card 100 of the left end of the fastball. In the meantime, for the pitch type cards 100 of the forkball and the curveball, the upward arrow objects 131 are displayed. With this display, the user can recognize that if the selection of the pitch type card 100 of the light end of the fastball is confirmed, the ball power parameter of the non-selected pitch type card 100 of the fastball of the left end would be decreased. On the other hand, the ball power parameters of the non-selected pitch type cards 100 of the forkball and the curveball would be increased respectively. Namely, at the time of designating the candidate from the pitch type card group 200, the user can recognize beforehand, by throwing a pitch of what pitch type, the pitch types with what parameters would be available for the pitch after next.

For the pitch type card 100 which is not the candidate, it may be configured to display only the arrow object 131 indicating changes in ball power parameter, or maybe configured to also display the ball power parameter as changed. In the example of FIG. 6, the display of the ball power parameter of the pitch type card 100 of the fastball at the left end, which is not the candidate, is changed from the initial rank "B" to the lowest rank "C". Similarly, the display of the ball power parameter of the pitch type card 100 of the forkball, which is not the candidate, is changed from the initial rank "F" to the higher rank "E". The display of the ball power parameter of the pitch type card 100 of the curveball, which is not the candidate, is changed from the initial rank "C" to the higher rank "B".

In the state one of the pitch type cards 100 in the pitch type card group 200 is merely touched with the finger 130, the selection of that pitch type card 100 has not been confirmed. Specifically, in the designated state of the candidate illustrated in FIG. 8, if the user removes the finger 130 from the screen, the designated state of the candidate is cancelled, and the screen is changed back to the screen of FIG. 5. Namely, with the cancellation of the designated state of the candidate, the arrow objects 131 displayed above the non-selected pitch type cards 100 are also deleted, and the ball power parameters of these pitch type cards 100 are changed back to the previous ranks before being changed in the display.

Figure 7:
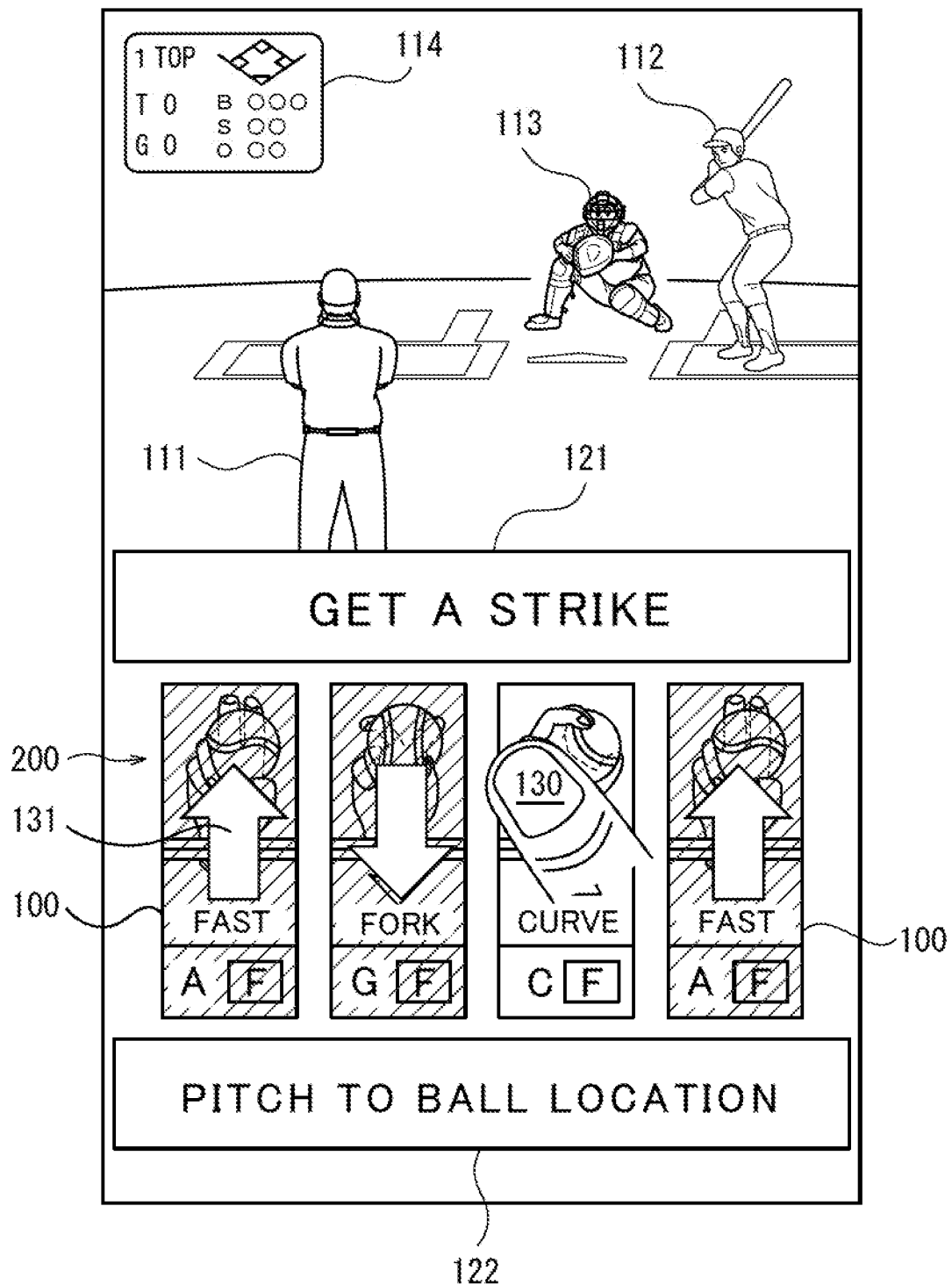
FIG. 7 is an explanatory diagram illustrating another example of the screen for the pitching operation when the candidate is designated.

For example, in the state of the screen of FIG. 5, as illustrated in FIG. 7, when the user designates the pitch type card 100 of the curveball as the candidate by touching the pitch type card 100 (with his/her finger), the upward arrow objects 131 are displayed respectively for the two pitch type cards 100 of the fastball. In the meantime, for the pitch type card 100 of the forkball, the downward arrow object 131 is displayed. As a result, the user can recognize that if the user confirms the selection of the pitch type card 100 of the curveball, the ball power parameter of the non-selected pitch type cards 100 of the fastball would be increased, and the ball power parameter of the non-selected pitch type card 100 of the forkball would be decreased.

As illustrated in FIG. 6, if the pitch type card 100 of the fastball is designated as the candidate, the ball power parameter of the pitch type card 100 of the forkball would be increased. However, as illustrated in FIG. 7, if the pitch type card 100 of the curveball is designated as the candidate, the ball power parameter of the pitch type card 100 of the forkball would be decreased. As described, even for the pitch type cards 100 of the same pitch type, depending on the candidate to be designated from among the pitch type card group 200, the ball power parameter of the pitch type card 100 could be increased or decreased.

By repeating the designation and the cancellation for each of the candidates to try designating the respective pitch type cards 100 of various kinds, it is possible for the user to make use of simulation beforehand to see with the selection of the pitch type for the next pitch, how the parameter of the pitch type would be changed for the pitch after next. As a result, it is required for the user to mix pitches to make a pitch sequence in consideration of not only the next pitch but also the subsequent development.

After selecting the pitch type card 100 as the candidate by touching it with the finger 130, the user can determine the pitch type and the pitch location at the same time by moving the pitch type card 100 of the candidate either to the strike location area 121 or the ball location area 122. For example, as illustrated in FIG. 8, the selection of both the pitch type "fastball" and the pitch location "strike location" can be confirmed at the same time by the following operation. That is, the pitch type card 100 of the fastball of the right end of the screen is touched with the finger 130, and while maintaining this contact state of the finger 130 to the screen (maintaining the contact state without removing the finger 130 from the screen while the finger 130 is being moved), by moving the finger 130 to the strike location area 121 and then releasing the finger 130 from the screen, the selection of both the pitch type "fastball" and the pitch location "strike location" are confirmed. This operation is a so-called a drag and drop operation. By moving the finger 130 while contacting the pitch type card 100 on the screen with the finger 130 without removing the finger 130 from the screen, the pitch type card 100 is moved in association with changes in contact position coordinate of the finger 130.

It is preferable that when the pitch type card 100 being moved (or the contact coordinate position of the finger 13) is superimposed on the strike location area 121, the display state of the strike location area 121 is changed (for example, by changing color, density, etc.). With this configuration, it is clarified that where to remove the finger 130 from the screen to move the pitch type card 100 to the strike location area 121.

Similarly, the selection of both the pitch type of corresponding to the pitch card 100 of the candidate and the pitch location "ball location" can be confirmed at the same time by the following operation. That is, the pitch type card 100 of the candidate is touched with the finger 130, and while maintaining this contact state of the finger 130 to the screen, by moving the finger 130 to the ball location area 122 and then removing the finger 130 from the screen, the selection of both the pitch type corresponding to the pitch card 100 of the candidate and the pitch location "ball location" can be confirmed.

Figure 9:
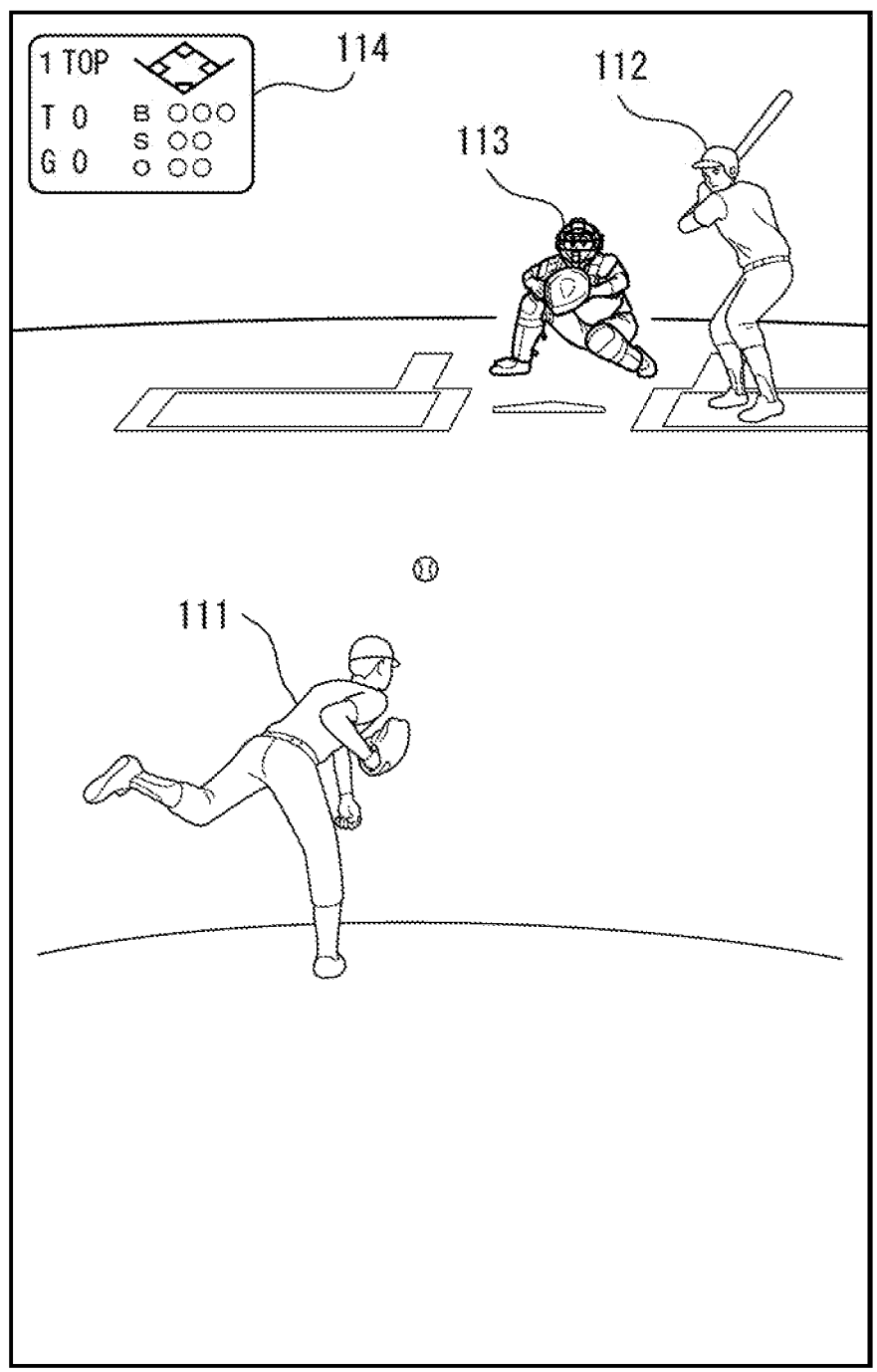
FIG. 9 is an explanatory diagram illustrating an example of the screen showing the state the pitcher character performs a pitching operation.

As described, after the pitch type card 100 of the pitch type card 200 is dragged to the strike location area 121 or the ball location area 122, both the pitch type and the pitch location are confirmed at the timing the finger 130 is removed from the screen in the meantime, the pitching is started, and as illustrated in FIG. 9, the pitcher character 111 throws the pitch. Namely, according to the forgoing configuration, the game operation including three operation elements of the pitch type selection, the pitch location setting and the starting a pitch can be performed with case by moving one of the plurality of pitch type cards 100 displayed on the screen to the strike location area 121 or the ball location area 122 with one finger.

It may be configured that after the pitch type and the pitch location are confirmed by the above operation of moving the pitch type card 100, the pitcher character 111 starts pitching at the timing the operation of stalling the pitch is performed as another operation (for example, the operation of tapping the screen, etc.).

Affording to the present embodiment, for the pitch location, it is possible to select the pitch location only between the strike location and the ball location, and the orbit of the ball released from the pitcher character 111 is determined by the CPU 11 of the game device 1 based on the pitch type and the parameter of the pitch type (in particular, ball control parameter) as determined.

Furthermore, in the above operation example, the pitch type card 100 on the screen is moved by the dragging operation. However, the pitch type card 100 may be moved by other operation. For example, the pitch type card 100 may be moved by the user's operation of making the finger 130 in contact with a specific pitch type card 100 on the screen and quickly sliding the finger 130 in the direction of the strike location area 121 or the ball location area 122 (so-called a flick operation).

In the above example, to realize a simple pitching operation without requiring the user to set the pitch location in details, for the pitch location parameter, the user is allowed to select only between the strike location and the ball location. However, the present embodiment is not intended to be limited to this example, and to be described later, it may be configured to enable more detailed setting of the pitch location (for example, the pitch location setting among the high location, the low location, the inside location, the outside location, etc.).

Figure 10:
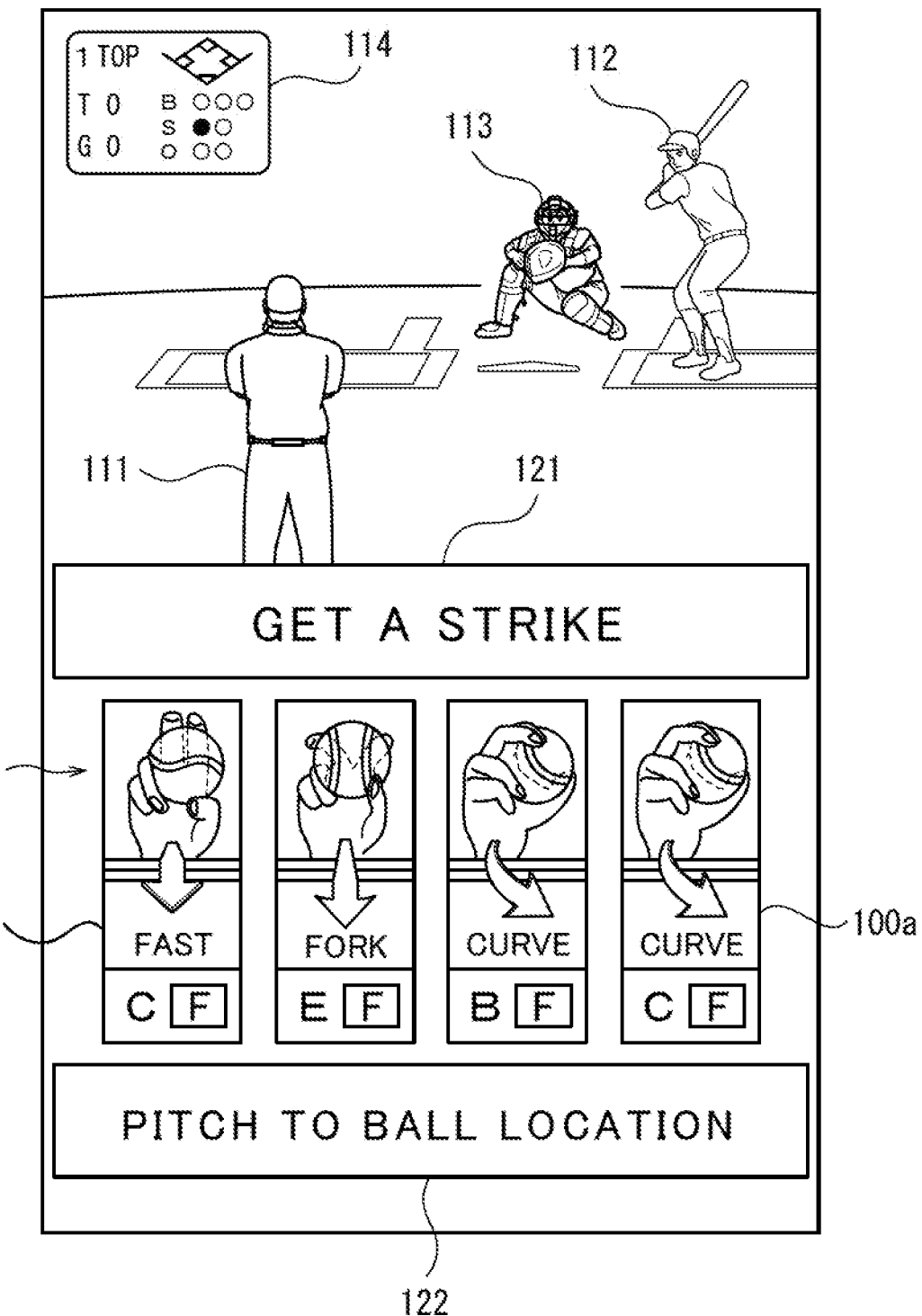
FIG. 10 is an explanatory diagram illustrating an example of the screen for the pitching operation before throwing a first pitch.

When the second pitch is to be thrown against the batter character 112 currently at bat after the first pitch (i.e., the case where the batter character 112 let the first pitch go by, or swung the bat but missed the ball, at hit the foul ball), the user performs the pitching operation for the second pitch in the same manner as the pitching operation for the first pitch. In this case, as illustrated in FIG. 10, the pitch type card 100 of the fastball at the right end confirmed for the first pitch is deleted from the screen, and instead, a new pitch type card 100*a* (in this example, the pitch type card 100*a* of the curveball) is replenished on the screen. Here, the new pitch type card 100*a* to be replenished is the pitch type card 100 selected at random from the plurality of pitch type card 100 as the pitch types of the pitcher character 111. Furthermore, the parameter of the new pitch type card 100*a* replenished is set to the initial rank.

On the other hand, the ball power parameters of the three pitch type cards 100 (fastball, forkball, curveball) other than the new pitch type card 100*a* are changed as being affected by the fastball confirmed as the pitch type of the first pitch (see FIG. 6 and FIG. 8). Therefore, even for the same pitch type of the curveball, the ball power parameter of the pitch type card 100 of the curveball, the second one from the right, affected by the first pitch is in the "B rank"; while the ball power parameter of the new pitch type card 100*a* replenished in the pitch type card group 200 for the second pitch is in the initial "C rank".

As described, in the game of the present embodiment, the pitch type cards 100 to be affected by the pitch type of the last pitch are only the pith type cards 100 which were in the field for the selection of the last pitch (those included in the deck consisting of four pitch type cards 100), and the replenished new pitch type card 100*a* is not affected by the pitch type of the last pitch. However, this is merely a non-limited example, and it may be configured that the replenished new pitch type card 100*a* is also affected by the pitch type of the last pitch. For example, the ball power parameter of the pitch type card 100*a* replenished in the pitch type card group 200 for the second pitch may be set in "B rank" which is the same rank as the pith type card 100 of the curveball, the second one from the right, affected by the pitch type of the first pitch.

As illustrated in FIG. 6, etc., when the user selects the fastball, the ball power parameter of the fastball is decreased for the next pitch, while the ball power parameter of the curveball is increased for the next pitch on the contrary. This relationship is determined beforehand in the game program. The parameter change information indicating how the parameters of non-selected (non-designated) pitch types change with the selection of the pitch type (or designation of the pitch type as the candidate) is stored beforehand in the memory device of the game device 1. Based on the parameter change information, the game device 1 changes the parameters of non-selected (or non-designated) pitch type cards 100. How the parameter is to be changed can be determined arbitrary. An example of this configuration is shown below.

To each of the pitch types (the pitch type cards 100), assigned is one of the plurality of attributes. Specifically, for example, for the pitch types of the fastball, the cutball, and the like, the attribute of "high speed ball" is assigned, and for the pitch types of the curveball, the change-up, and the like, the attribute of "low speed ball" is assigned. Further, in the case where the attribute of the selected pitch type is the same as the attribute of the non-selected pitch types, the parameters of the non-selected pitch types are decreased. For example, when the fastball of the attribute "high speed ball" is pitched, since it can be assumed that the batter's eyes would become able to follow that ball speed for the next pitch, the ball power parameters of the fastball and the cutball of the same attribute are decreased. On the other hand, in the case where the attribute of the selected pitch type is different from the attributes of the non-selected pitch types, the parameters of the non-selected pitch types are increased. For example, when the curveball of the attribute "low speed ball" is pitched, it can be assumed that the batter's eyes would not be able to follow that ball speed of the pitch type of the attribute "high speed ball" for the next pitch. Thus, the ball power parameters of the fastball and the cutball of different attributes are improved. As a result, a game with a sense of reality can be realized like the pitching in the baseball game in the real world.

Here, the attributes of the pitch types are not intended to be limited to the "high speed ball" and the "low speed ball", and the pitch types may be classified by the attributes of, for example, a "fastball type" and a "breaking ball type". For other examples of the attributes of the pitch types, explanations will be given later.

For the respective pitches in and after the third pitch against the batter character 112 currently at bat, in the same manner as the second pitch, the pitch type card 100 of the pitch type, selection of which is confirmed, is deleted from the screen, and a new pitch type card 100*a* to which the parameter of an initial value is set is replenished on the screen. Then, each time the selection of the pitch type is confirmed, and the pitching is performed, the ball power parameters are changed for the non-selected pitch type card 100, and the changes in parameters are accumulated for each pitch. For example, in the case where the user selected fastball for the two pitches continuously (the pitch type card 100 of the fastball was selected twice continuously), the ball power parameter of the pitch type card 100 of the curveball remaining without being selected is increased by two steps; on the other hand, the ball power parameter of the pitch type card 100 of the fastball remaining without being selected is decreased by two steps. As described, the mere the pitch type of the same attribute is continuously pitched, the larger is the effect on the ball power parameter of the non-selected pitch type displayed on the screen. Therefore, if, for example, the pitch of only the pitch type of the fastball is patched continuously, the ball power parameter of the pitch type with the attribute of "high speed ball" is decreased more and more. On the contrary, the ball power parameter of the pitch type with the attribute of "low speed ball" is increased more and more.

Therefore, even for the pitch type of small ball power parameter (low rank), by making a pitch selection in consideration of the attribute, it is possible to make use of such pitch type and increase the existence value thereof. In particular, according to the game of the present embodiment, it is possible to select to which of the strike location and the ball location, a pitch of the pitch type designated as the candidate is to be pitched. Therefore, for example, by throwing a pitch of the pitch type of a small ball power parameter (low rank) to the ball location, it is possible to increase the ball power parameter of the pitch type whose parameter is different from that of the selected pitch type. Then, at the ball count of the best opportunity, it is possible to perform a pitch to contact the batter character in a mental play by making the use of the pitch type card 100 with an improved ball power parameter.

Figure 11:
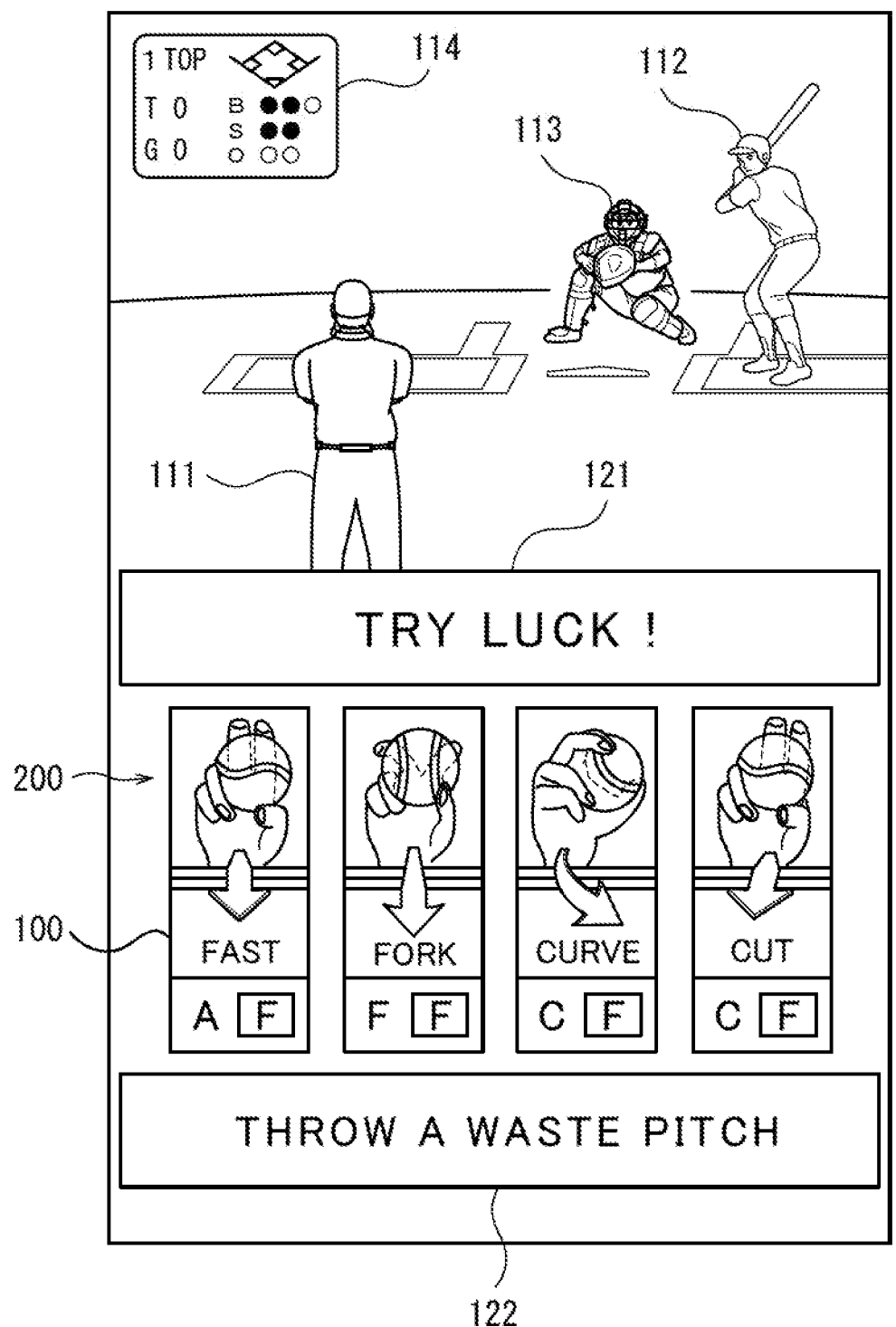
FIG. 11 is an explanatory diagram illustrating an sample of the screen for the pitching operation when the count is two strikes.

As illustrated in FIG. 11, when the ball count becomes two strikes, the display of the strike location area 121 is changed from the current message "Get a strike!" to, for example, the message "Try luck!" Similarly, the display of the ball location area 122 is also changed from the current message "Pitch to ball location" to the message "Throw a waste pitch".

Figure 12:
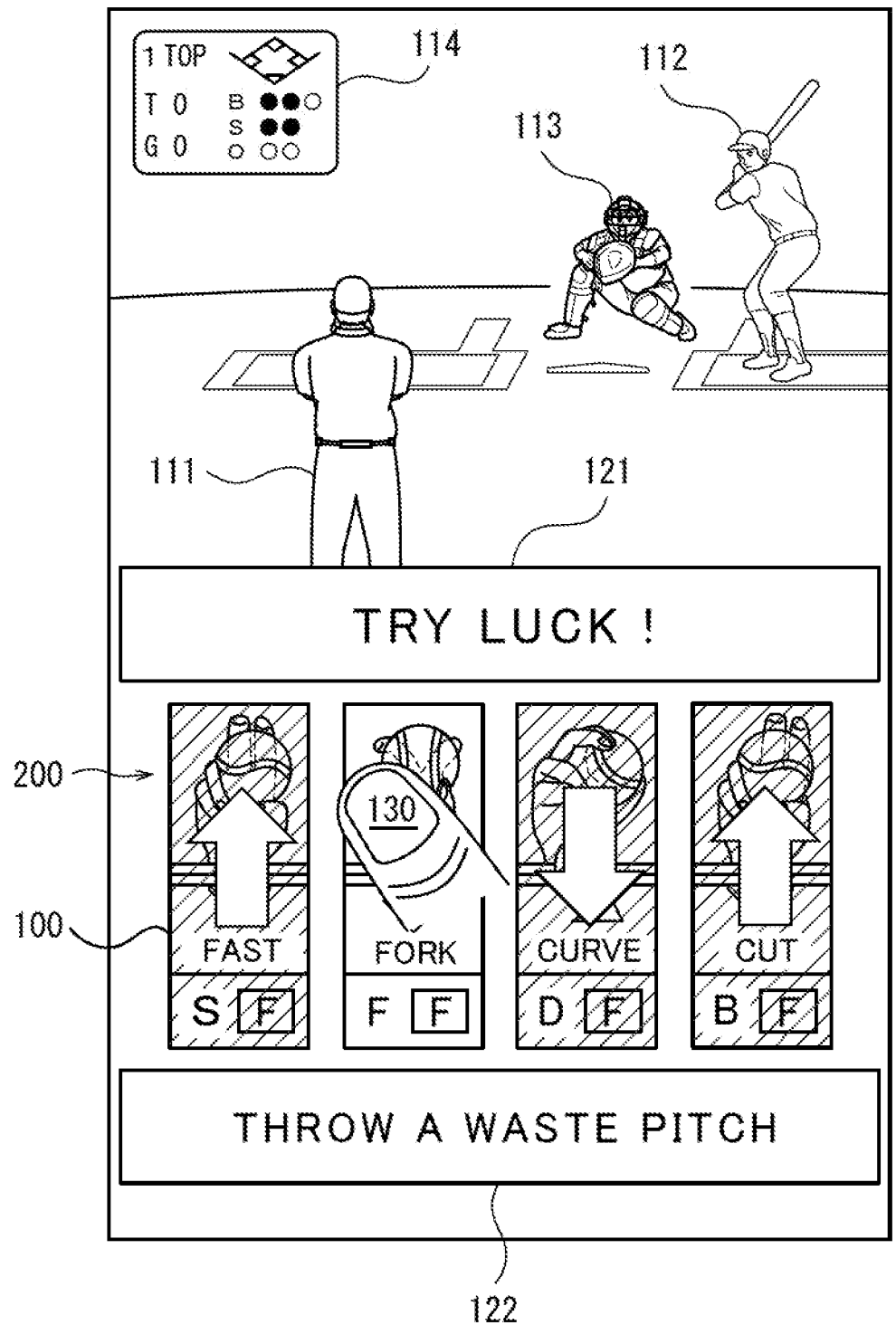
FIG. 12 is an explanatory diagram illustrating another example of the screen for the pitching operation when the candidate is designated.

In the example of FIG. 11, the ball count is "two balls and two strikes", and it is still possible to throw another pitch to the ball location. Further, the pitch type card group 200 includes the pitch type card 100 of the fastball in A rank (just one rank to the highest rank). Therefore, the user needs to consider if it is possible to rank up the pitch type card 100 of the fastball to the highest rank S by throwing the next pitch to the ball location. Here, for example, as illustrated in FIG. 12, when the user designates the candidate by touching the pitch type card 100 of the forkball (or the curveball may be adopted), the parameter of the pitch type card 100 of the fastball would be improved as the user is notified with the arrow object 131. Therefore, at the ball count of "two balls and two strikes", if the user performs the operation of pitching the pitch type card 100 of the forkball or the curveball to the ball location, the ball count would become "three balls and two strikes". Then, at this ball count, it is possible for the user to pay off the pitch by throwing the pitch of the pitch type card 100 of the fastball having an increased ball power parameter in S rank (highest rank).

When a new batter character 112 comes to bat after the batter character 112 at bat is completed, four pitch type cards 100 are selected again at random from the pitch types of the pitcher character 111, and the selected four pitch type cards 100 are displayed on the screen. To the respective parameter's of these four pitch type cards 100, initial values are applied. In this way, for each bat (i.e., each time the batter at bat changes), the initial values are set for the parameters of the four pitch type cards 100 as the plurality of selectable targets.

At the time the last pitch was thrown to the batter character 112 at the previous bat, the remaining three pitch type cards 100 without being selected may be maintained as the selectable targets for the first pitch against the next new batter character 112. Even in this case, the parameters of the three remaining pitch type cards 100 without being selected are reset to initial values for the first pitch against the next new batter character 112. Further, another new pitch type card 100 with the parameter of the initial value is replenished.

This configuration is merely an example. For example, instead of changing the parameters of all the pitch cards 100 back to the initial values, it may be configured to maintain the changes in parameters for non-selected pitch cards 100 even when the batter character 112 at bat changes. More specifically, the changes in parameters of the non-selected pitch cards 100 may be maintained until the pitching for one inning is completed.

[Basic Functional Configuration of the Game Device]

Figure 13:
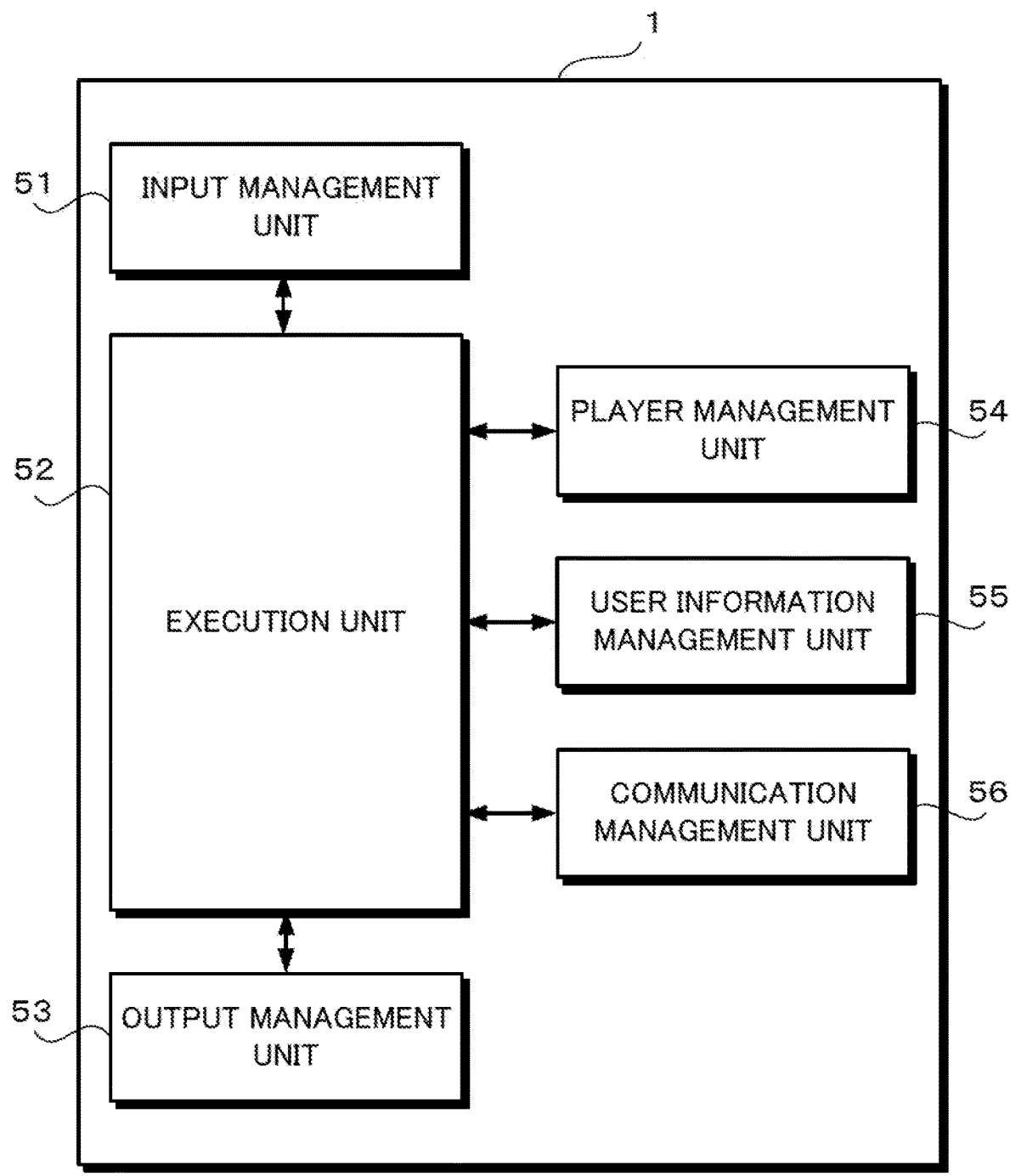
FIG. 13 is a functional block diagram illustrating an example of a basic functional configuration of the game device.

FIG. 13 is a functional block diagram illustrating an example of the basic functional configuration of the game device 1. The game device 1 according to the present embodiment composes an input management unit 51, an execution unit 52, an output management unit 53, a player management unit 54, a user information management unit 55, a communication management unit 56 and the like. These respective units are realized by the CPU 11 of the game device 1 executing the program according to the preset embodiment.

The input management unit 51 outputs the information on the operations via the touch input detection unit 15 and the like, to be output to the executing unit 52. The execution unit 52 executes various computations and data processing based on the information on the operations. In the present baseball game, based on the user's pitching operation, the executing unit 52 executes pitching by the pitcher character 111, etc. The information on the result of processing executed by the execution unit 52 is stored in a predetermined region the storage device (RAM 13, the auxiliary storage device 20, etc.). The output management unit 53 controls respective outputs via the image processing unit 14 and the sound processing unit 16. For example, as illustrated in FIG. 5, the output management unit 53 displays the screen for the pitching operation including the plurality of pitch type cards 100, and the like. A display control unit 74, to be described later, is included in some of the functions of the output management unit 53.

The player management unit 54 has a function of managing all the player characters in the game based on the above described player database (see FIG. 3).

The user information management unit 55 manages the information on each user's game the information stared in the memory device (the RAM 13, the auxiliary storage device 20, etc.). The items to be managed by the user information management means 55 differ depending on the kind or the content of the game. For example, in the case of the game to be played in the on-line mode by making an access to the game server, the user information management unit 55 stores in the memory device, such information as log-in IDs, passwords, user names, etc., which uniquely identifies each user in association with user IDs. For example, the user information management unit 55 also manages in the storage device, various kinds of information such as user's game level, acquired points, information on user's friends, the information in the game, saved data after the game, and the like.

The communication management unit 58 has a function of managing information communication between the game device 1 with the game server or the game device 1 of other user via the communication control unit 21.

[The Major Functional Configuration of the Game Device (First Embodiment)]

Figure 14:
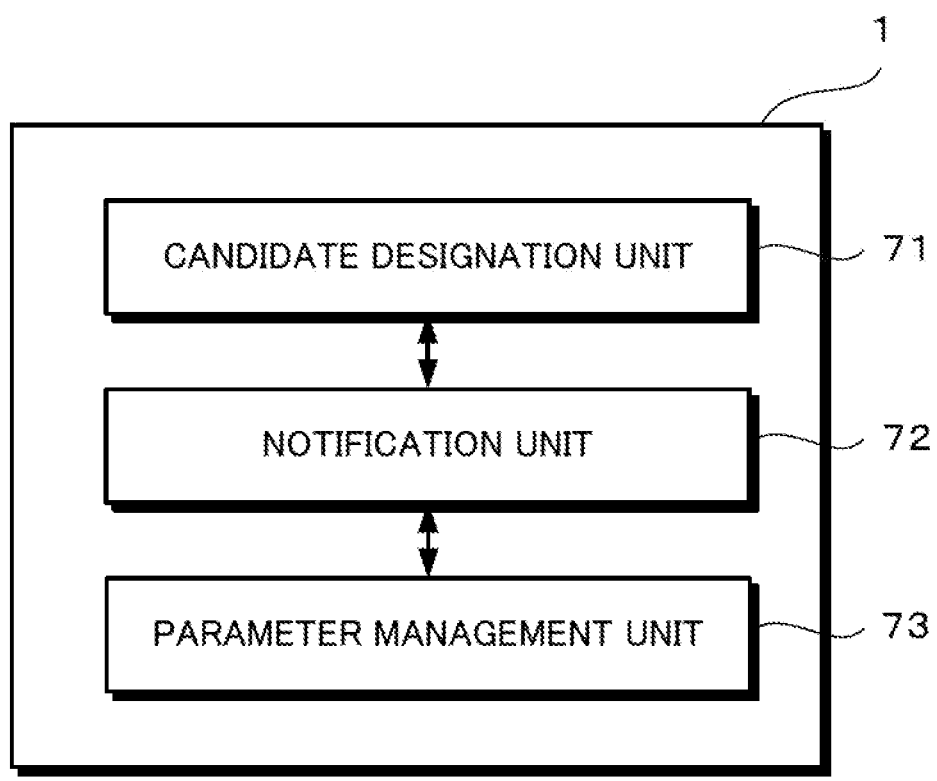
FIG. 14 is a functional block diagram illustrating an example of a major configuration of the game device.

Next, explained is the major functional configuration of the game device 1, which realizes the above game referring to the functional block diagram of FIG. 14. The game device 1 as the game management device mainly comprises a candidate designation unit 71, a notification unit 72, a parameter management unit 73 and the like. These respective units are realized by the CPU 11 of the game device 1 executing the program according to the preset embodiment.

The candidate designation unit 71 has a function of designating the candidate from among the plurality of selectable targets based on the information on the user's operation. In the example of the baseball game of the present embodiment, the selectable targets are all or some of the pitch types of the pitcher character 111. The information on pitch types of the pitcher character 111 is stored in the player database illustrated in FIG. 3. According to the present embodiment, since four pitch type cards 100 are displayed on the screen as the selectable targets, if the number of pitch types of the pitcher character 111 is not more than four, all the pitch types of the pitcher character 111 maybe displayed; however, if the number of pitch types of the pitcher character 111 is five or more, some of the pitch types of the pitcher character can be the selectable targets. It should be noted as illustrated in FIG. 5 that a plurality of pitch type cards 100 of the same pitch type maybe displayed on the screen. Therefore, for example, even in the case where the pitcher character 111 has four pitch types, it is not necessarily that all the four pitch types are the selectable targets.

The pitch types of the fastball, the curveball, and the like of the selectable targets are visualized as pitch type cards 100 on the screen. Therefore, in the following description, the wording "pitch type" indicates the pitch type card 100, and the wording pitch type card 100 indicates "the pitch type" itself.

Examples of the users operation of designating the candidate includes a user's operation of contacting with the finger 130 one of the plurality of pitch type cards 100 displayed on the screen for the pitching operation. With the screen for the pitching operation, when the user contacts the screen with the finger 130, the coordinate information of the contact position is taken in the game device 1 as the information on the user's operation via the touch input detection unit 15. Further, when the coordinate of the contact position of the finger 130 is overlapped with any one of the plurality of pitch type cards 100 displayed on the screen (the coordinate of the contact position is included in the display region of the pitch type card 100), the pitch type card 100 is designated as the candidate. The information on the pitch type card 100 designated as the candidate is temporarily stored in the RAM 13.

As described above, it is preferable to clearly the state where the candidate is designated on the screen with the configuration wherein upon designating the candidate, the display state of the designated pitch type card 100 of the candidate is made different from the display state of the non-designated pitch type cards 100 (for example, the color or the density of either one of them is made different from that of the other). In the example of FIG. 6, the other pitch type cards 100 than the pitch type card 100 of the candidate are displayed darker than usual so that the pitch type card 100 of the candidate stands out on the screen.

The user's operation of designating the candidate is not limited to the operation of contacting one of the plural pitch type cards 100 with the finger 130 on the screen. For example, in the case where the game device is constituted by a game dedicated machine or a personal computer, the candidate may be designated by the user's operation of moving a cursor displayed on the screen. Namely, the user operates using a printing device such as an analog stick, a mouse, etc., to make the cursor be superimposed on one of the plural pitch type cards 100 on the screen (or performs a clicking operation in the state where the cursor is superimposed on one of the pitch type cards 100). In this case, the candidate designation unit 71 designates as the candidate the pitch type card 100 on which the cursor is superimposed The user's operation of designating the candidate is not limited to the above example, and any other user's operation of designating a specific selectable target in a selectable manner from among the plurality of selectable targets may be adopted.

It is preferable that the screen of the game device 1 is constituted by the touch panel unit 3 for the following reason. That is, as illustrated in FIG. 6, since it is possible to perform an operation of directly contacting the pitch type card 100 on the screen with the contact object such as the finger 130 of the user or a pen or the like, the user can designate the candidate intuitively.

Next, the ratification unit 72 is explained. The notification unit 72 has a function of notifying the information on changes in parameters of the selectable targets (for example, pitch type cards 100) other than the designated candidate at the time the candidate is designated by the candidate designation unit 71. In the example of the baseball game of the present embodiment as illustrated in FIG. 6, when the pitch type card 100 of the fastball is designated as the candidate, before the selection is confirmed, on the assumption that the selection is confirmed, the notification is made of the information on changes (up or down) in ball power parameters of the remaining pitch type cards 100 (for example, fastball, forkball, curveball) by using the arrow objects 131 displayed on the screen.

In the example of FIG. 8, the user is notified of the changes in parameters on the screen such that in the case where the direction of the arrow object 131 on the pitch type card 100 which is not designated as the candidate is upwards, the ball power parameter of the pitch type card 100 is increased; on the other hand, in the case where the direction of the arrow object 131 is downwards, the ball power parameter of the pitch type card 100 is decreased. This is merely an example, and it may be configured to notify only the directions of changes in parameters of the selectable targets other than the candidate by using symbols such as "+ (plus)", "− (minus)" or the like.

In the baseball game of the present embodiment, for the parameter of the pitch type, the "ball power" parameter is subjected to change. However, it may be configured to change such parameters as the "ball speed" parameter, the "change level of breaking ball" parameter and the like.

According to the game of the present embodiment, as described above, the parameters of the pitch types are expressed by eight ranks of S, and A to G, and the parameter is changed by rank by rank. However, it may be configured to change the parameter each time by two or more ranks. For example, it may be also configured such that in the case where the pitch type card 100 of the fastball is selected, the parameter of the pitch type card 100 of the curveball is increased by one rank; however, the parameter of the pitch type card 100 of the forkball is increased by two ranks. Namely, the amount of change in parameters (or change level) may be varied depending on the non-selected selectable targets. In this case, the notification unit 72 may be configured to notify both the direction and the amount of changes in parameter. For example, the notification unit 72 may notify whether the parameter is increased at decreased by using the upwards or downwards arrow objects 131; in the meantime, notifies the amount of change in parameters by using the length of each arrow object 131. Specifically, the length of the arrow object 131 is set longer in the case where the parameter is increased by two ranks than the case where the parameter is increased by one rank. In the case, however, it is not necessarily that the length of the arrow object 131 in the case where the parameter is improved by two ranks is set just twice as long as the length of the arrow object 131 in the case where the parameter is improved by one rank. For example, to clearly indicate the amount (degree) of change in parameter, the length of the arrow object 131 may be set longer than the length corresponding to the actual amount of change. On the contrary, the length of the arrow object 131 may be set shorter than the length corresponding to the actual amount of change. Namely, there may be some shift between the actual amount (degree) of change in parameter and the length of the arrow object 131.

It may be configured to notify the direction or the amount of changes in parameter by displaying using the numeral values and the symbols such as "+1 (%)", "+2 (%)", "−1 (%)", "−2 (%)", etc. Alternatively , sound notice may be adopted in addition to the above notice using the screen, or the sound notice may be adopted alone in replace of the display notice using the screen.

The notification unit 72 may be configured to manage the changes in parameters of the pitch type cards 100 as the selectable targets independently. However, the changes in parameters of the pitch type cards 100 as the selectable targets are managed by the parameter management unit 73. Therefore, the notification unit 72 needs to obtain from the parameter management unit 73, the information on changes in parameters of the remaining selectable targets, when the specific candidate (the pitch type card 100) is designated by the candidate designation unit 71 as the candidate, on the assumption that the selection of the selectable target is confirmed, and to inform the information on changes in parameters as obtained.

Next, the parameter management unit 73 is explained. The parameter managing unit 73 manages the pitch type parameters as a plurality of selectable targets displayed on the screen and stores the pitch type parameters in the storage device (RAM 13 or the like). FIG. 21 illustrates an example of the information on the pitch type parameters stored in the storage device and managed by the parameter management unit 73.

In the game of the present embodiment, to the four pitch type cards 100 displayed on the screen as the selectable targets, assigned are one to four card numbers in order from the left on the screen, and the parameters of the pitch type cards 100 at respective positions on the screen are managed. For example, as illustrated in FIG. 5, it is assumed that the four pitch type cards 100 which are selectable targets as the pitch types for the first pitch are the card number 1=fastball, the card number 2=forkball, the card, number 3= curveball, and the card number 4=fastball. In this case, as illustrated in FIG. 21, stored as the pitch types of the selectable targets for the first pitch, are pitch types of the card numbers one to four and the initial values for the parameters of the respective pitch types. The initial value of each pitch type parameter may be obtained from the player database illustrated in FIG. 3.

In the present embodiment, the "ball power parameter" is the only parameter that is subjected to change. Therefore, in FIG. 21, for the sake of convenience, only the rank for the "ball power parameter" is indicated below the pitch type. For example, the "fastball B" indicates that the ball power parameter of the pitch type of the fastball is in the B rank.

When the candidate designated by the candidate designation unit 71 is confirmed as the selected target, the parameter management unit 73 changes the parameters of the selectable targets other than the selected target as confirmed (in this embodiment, non-selected three pitch type cards 100). The parameter management unit 73 further stores the parameters as changed in the memory device and manages the parameters stored in the memory device (in and after the second pitch in FIG. 21). In the following, shown is an example in which the parameter management unit 73 changes the parameters of the pitch types.

According to the selected pitch type (the pitch type card 100), the parameter change information indicating how the parameters of the non-selected pitch types change is stored beforehand in the memory device (the auxiliary storage device 20 or the like). When the selection of the pitch type card 100 designated as the candidate is confirmed, the parameter management unit 73 changes the parameters of the non-selected pitch type cards 100 (the ball power parameter in the present embodiment) based on the parameter change information. FIG. 15 shows an example of the parameter change information.

According to the example of the parameter change information of FIG. 15, with the selection of the pitch type of the fastball, the parameters of the non-selected pitch types, the curveball, the change-up, and the forkball are increased; one the other hand, the parameters of the non-selected pitch types, the fastball, the cutball and the shootball are decreased. As another example, with the selection of the pitch type of the curveball, the parameters of the non-selected pitch types, the fastball, the cutball and the shootball are increased; one the other hand, the parameters of the non-selected pitch types, the curveball, the change-up, and the forkball are decreased. These are merely examples, with the selection of which pitch type, the parameters of which pitch types are to be improved or to be decreased can be set arbitrarily.

In the case where an amount of change in parameters (degree of change) is not constant, as illustrated in FIG. 16, the information on the amount of change in parameters (degree of change) is also included in the parameter change information. In the example of FIG. 16, with the selection of the pitch type of the fastball, the parameter of the non-selected pitch types, the curveball is improved by two steps, the parameters of the change-up and the forkball are improved by one step. On the other hand, the parameter of the non-selected pitch type, the fastball is lowered by two steps, and the parameters of the cutball and the shootball are lowered by one step.

Further, it may be configured to set an attribute to each pitch type to manage changes in parameter by the attribute. Next, an example of this configuration is shown. As illustrated in FIG. 17, in the baseball game of the present embodiment, the attribute of either one of the "high speed ball" and the "low speed ball" as a plurality of attributes is set to each of the plurality of pitch types as the selectable targets (pitch type cards 100). This attribute information is stored beforehand in the memory device (the auxiliary storage device 20, or the like) of the game device 1. In the example of FIG. 17, the attribute "high speed ball" is set for the pitch types of the "fastball", the "cutball", the "shootball" or and the like, and the attribute "low speed ball" is set for the pitch types of the "curveball", the "forkball", the "change-up", and the like. The parameter management unit 73 changes the parameters of the non-selected pitch type cards 100 based on the attribute of the selected pitch type card 103 as confirmed, and the attributes of the non-selected pitch type cards, i.e., other pitch type cards 100 that the one selected among the four pitch type cards. For example, the parameter management unit 73 changes the parameter of the non-selected pitch type based on the parameter change information illustrated in FIG. 18.

According to an example of the parameter change information of FIG. 18, with the selection of the pitch type with the attribute of the "high speed ball" (the fastball, the cutball, the shootball, and the like), the parameters of the non-selected pitch types, the pitch types with the attribute of the "low speed ball" are improved; one the other hand, the parameters of the non-selected pitch types with the attribute of the "high speed ball" are lowered. With the selection of the pitch type with the attribute of the "low speed ball" (the curveball, the forkball, the change-up and the like), the parameters of the non-selected pitch types, the pitch types with the attribute of the "high speed ball" am improved; one the other hand, the parameters of the pitch types with the attribute of the "low speed ball" are lowered. Namely, the parameters of the non-selected pitch type cards 100 are improved when the attribute of the pitch type card 100 selected by the user is different from the attribute of the non-selected pitch type card 100. This is because as described earlier, when the "high speed ball" (or the "low speed ball") is pitched, the batter's eyes would not be able to follow changes in the speed of the ball pitched for the "low speed ball" (or the "high speed ball") of different attribute. Therefore, the ball power parameter of the pitch type of different attribute from that of the one selected is improved. On the other hand, in the case where the attribute of the pitch type card 100 selected by the user is the same as the attribute of the non-selected pitch type card 100, the parameter of the non-selected pitch type card 100 is lowered. This is because as described earlier, when the "high speed ball" (or the "low speed ball") is pitched, the batter's eyes would become able to follow that ball speed. Therefore, the ball power parameter of the pitch type of the same attribute with that of the one selected is decreased.

As described, according to the configuration wherein the attribute is set to each pitch type as a selectable target, to manage the changes in parameters of the non-selected pitch type, the management processing can be simplified.

Although two attributes are adopted for the pitch types in the above example, three or more attributes may be adopted. An example of is illustrated in FIG. 19. In this example, a plurality of pitch types are divided into six types based on the features, all "fastball type", a "miss swing type", a "swerve at hand type", a "pitch to contact type", a "slow ball type", a "fall ball type". Then, the parameter management unit 73 changes the parameters of the non-selected pitch types based on the parameter change information illustrated in FIG. 20.

The parameter change information of FIG. 20 also includes the information on the parameters of the non-selected pitch types, which are not changes, other than the information on the parameters of the non-selected pitch types, which are increased or decreased. For example, in the case where the pitch type of the "miss swing type" (a slider, a high speed sinker, or the like) is selected, the parameters of the non-selected pitch types of the "pitch to contact type" and the "slow ball type" are increased; the parameters of the non-selected pitch types of the "miss swing type" and the "swerve at hand type" are decreased; and the parameters of the non-selected pitch types of the "fastball type" and the "fall ball type" are not changed. This is in consideration of the similarity of the selected pitch type of the "miss swing type", and the non-selected pitch types of the "fastball type" and the "fall ball type", and after the pitch of the "miss swing type" is thrown, the next pitch of the "fastball type" or the "fall ball type" would not be affected.

As in the above example, it may be configured to include the combination of the pitch types where with the selection of particular pitch type 100, the parameters of the non-selected pitch types would not be changed. Namely, the configuration wherein when the selection of the candidate is confirmed, the parameters of the selectable targets other than the one confirmed are changed includes the case where some of the parameters of the non-selected selectable target(s) other than the one confirmed is (are) changed, and the rest of the parameters of the non-selected selectable target(s) is (are) not changed.

Figure 22:
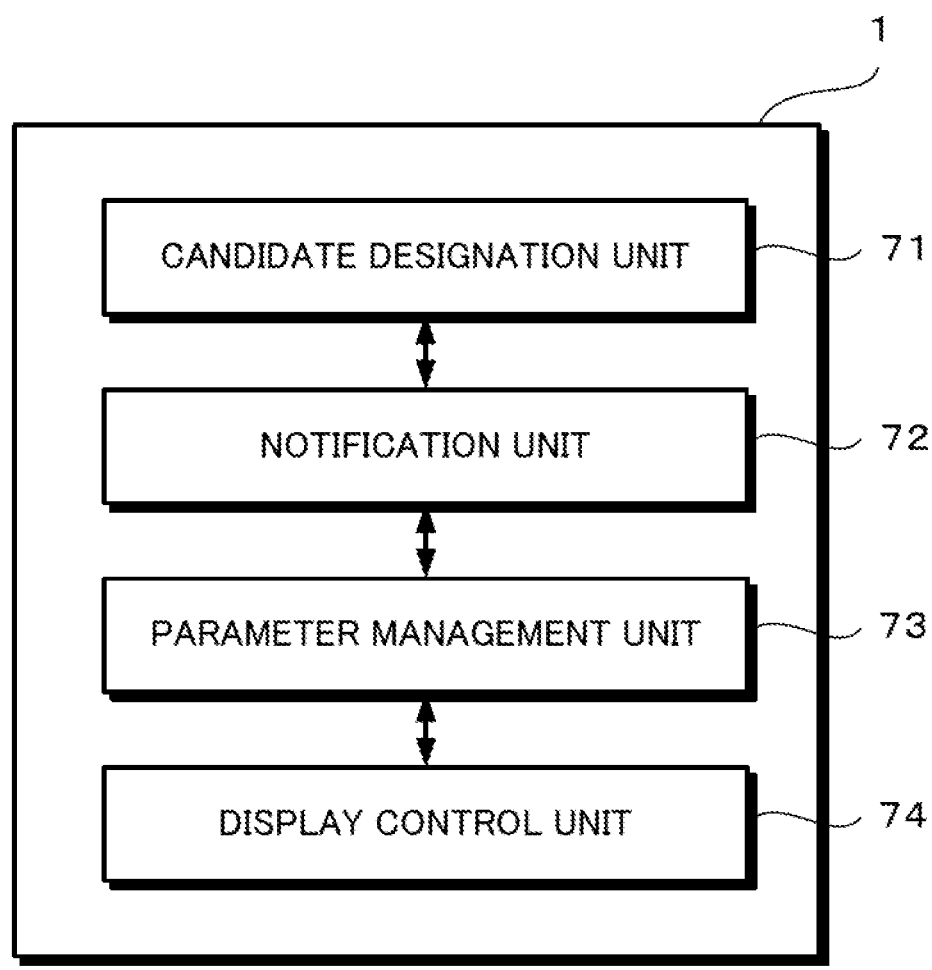
FIG. 22 is a functional block diagram illustrating another example of the major configuration of the game device.

As illustrated in FIG. 22, the game device 1 further comprises the display control unit 74 in addition to the candidate designation unit 71, the notification unit 72, and the parameter management unit 73. The display control unit 74 has a function of displaying the plurality of pitch type cards 100 on the screen as a plurality of selectable targets.

After the candidate designated by the candidate designation unit 71 is confirmed as the selected target and the game related to the selectable target as confirmed has proceeded (for example, after the pitch is thrown by the pitcher character 111), the display control unit 74 deletes the display of the selected target as confirmed and displays a new selectable target on the screen. In the example of the baseball game of the present embodiment, after the selection of the pitch type card 100 of the fastball with the card number 4 is confirmed for the first pitch as illustrated in FIG. 8, and the pitch of the fastball has been thrown as illustrated in FIG. 9, the display control unit 74 deletes the pitch type card 100 of the fastball with the card number 4 is deleted from the screen, and instead displays on the screen as a new selectable target, for example, the pitch type card 100a of the curveball as illustrated in FIG. 10. For example, the display control unit 74 displays on the screen the pitch type card 100a randomly selected firm among the pitch type cards the pitcher character 111 can pitch (the pitch types of the pitcher character 111) as a new selectable target. As a result the new pitch type card 100a can be replenished in replace of the pitch type card 100 adopted for the first pitch, to be the selectable pitch type card 100a for the second pitch.

Furthermore, the parameter management unit 73 sets the parameter of the pitch type card 100a as the new selectable target displayed by the display control unit 74 to a predetermined initial value (so-called a default value). For example, the parameter management unit 73 obtains the initial value of the pitch type of the pitcher character 111 based on the player database illustrated in FIG. 3, and applies the initial value to the replenished new pitch type card 100a. Therefore, the parameter of the initial value is displayed for the new pitch type card 100a displayed on the screen by the display control unit 74. In this case, as illustrated in FIG. 21, the selectable four pitch type cards 100a for the second pitch are the card number 1=a fastball C, the card number 2=a forkball E, the card number 3=a curveball B and the card number 4=a curveball C, and this information is stored in the storage device. Incidentally, although FIG. 21 shows an example in which the information on the selected card number is stored for each pitch, this information may be omitted.

According to this configuration, when one of the pitch type cards 100 is selected, only the non-selected pitch type cards 100 displayed on the screen are subjected to changes in parameters, and the new pitch type cards 100 subsequently replenished is not subjected to a change in parameter. For example, as illustrated in FIG. 8, for the first pitch, the pitch type card 100 of fastball is selected, and with this selection of the pitch type card 100, the parameters of the pitch type cards 100 of the curveball and the like of the remaining selectable targets are improved. Thereafter, as illustrated in FIG. 10, when the pitch type card 100a of the curveball is newly replenished, the pitch type card 100 of the curveball having an improved parameter in "B rank" and the pitch type card 100a of the curveball having a parameter of in an initial "C rank" remain as the selectable targets. In this way, even for the same pitch type of the curveball, since the respective parameters are different, since there would be more variations for the selectable targets, the user can enjoy the operation of limiting a selection of the pitch type in consideration of differences in parameters.

The parameter management unit 73 has the following functions. That is, each time the candidate designated by the candidate designation unit 71 is confirmed as the selected target, the parameter management unit 73 stores in the memory device, the parameters as changed of the other selectable targets than the selected target as confirmed, and accumulates the changes in parameters.

For example, as illustrated in FIG. 21, in the case where the fastball is selected for two consecutive pitches (for the first pitch, the card number 4=fastball, and for the second pitch, the card number 1=fastball), the parameter of the card number 2=forkball remaining without being selected neither for the first pitch nor the second pitch, is stepped up by two steps from the initial "F rank" to the "E rank" and further to the "D rank". The parameter of the card number 3=curveball, remaining without being selected neither for the first pitch nor the second pitch, is stepped up by two steps from the initial "C rank" to the "B rank" and further to the "A rank". The parameter of the card number 4=curveball, remaining without being selected for the second pitch, is stepped up by one step from the initial "C rank" to the "B rank".

Furthermore, for example, the pitch type of the pitch type card 100 remaining without being selected neither for the first pitch nor the second pitch is the fastball the parameter of the pitch type card 100 remaining without being selected is stepped down by two steps. Here, the upper limit and/or the lower limit may be set for the changes in parameters so that the changes in parameter s of the pitch type cards 100 would not become too large.

As described, in the case where the selectable target which initially has a parameter of the initial value remains without being selected n times, changes in parameters (up or down) would be accumulated for the changes in n times. Namely, it is possible for the user to increase the parameter of the specific selectable target to the level as desired by purposely not selecting it many times, thereby imparting an interesting feature just like so-called growing a character.

However, there may be the case where decreases in parameter are accumulated. Furthermore, as the number of pitches at one bat increases, it is likely that the non-selected numbers of times for the respective pitch type cards 100 on the screen vary (for example, continuously not selected n times, continuously not selected (n−1) times, continuously not selected only (n−2) times, etc.). Namely, the respective numbers of times the change in parameter is accumulated vary among the respective pitch type cards 100. Therefore, it is possible realize a game with high amusement properties which provides a variety of options for strategies Incidentally, although FIG. 21 shows the example in which the respective parameter change histories of the pitch types with the card numbers 1 to 4 are stored for each pitch, only the updated parameters of the pitch types with the card numbers 1 to 4 may be stored. Namely, it may be configured to update (rewrite) the respective parameters of the pitch types of the card numbers 1 to 4 to be the latest information each time the selection of the pitch type is confirmed, and the pitch of the selected pitch type is thrown.

The parameter management unit 78 may be configured to set all the parameters of the plurality of selectable targets, displayed on the screen to be selectable for the pitch type of the first pitch, to predetermined initial values, at each bat against one batter character 112. Namely, each time the batter character 112 at bat is changed, the parameters of the pitch cards with the card numbers 1 to 4 are all set to the initial values. In this case, as described above, it maybe configured to reselect all the four pitch type cards 100 to be displayed on the screen, or may be configured to keep the three pitch type cards 100 remaining without being selected for the last pitch at the last bat as the selectable targets for the first pitch at the next bat, and change the parameters of these three pitch type cards 100 respectively to the initial values.

As described above, until one at bat is completed, the parameter management unit 73 stores in the memory device, the parameters of the non-selected selectable targets (other than the selected target), each being changed for each pitch and accumulates the changes in parameters. Namely, since the pitches are thrown against the same batter throughout the one at bat, for example, if the pitches of the same pitch type are repeated, the batter's eyes would become able to follow the pitch of that pitch type. Therefore, it is configured to accumulate the changes in parameters throughout the one at bat. On the other hand, after the one at bat is ended, and a pitch is to be thrown against a new batter at the next bat, the pitches thrown at the last bat would not affect the new batter at the next bat. Therefore, as described above, at each one at bat (i.e., every time the batter at bat is changed), the parameters of the plurality of selectable targets are all reset to the initial values. As a result, the game with high amusement properties can be realized by reflecting the described reality of the actual baseball in the game.

Figure 23:
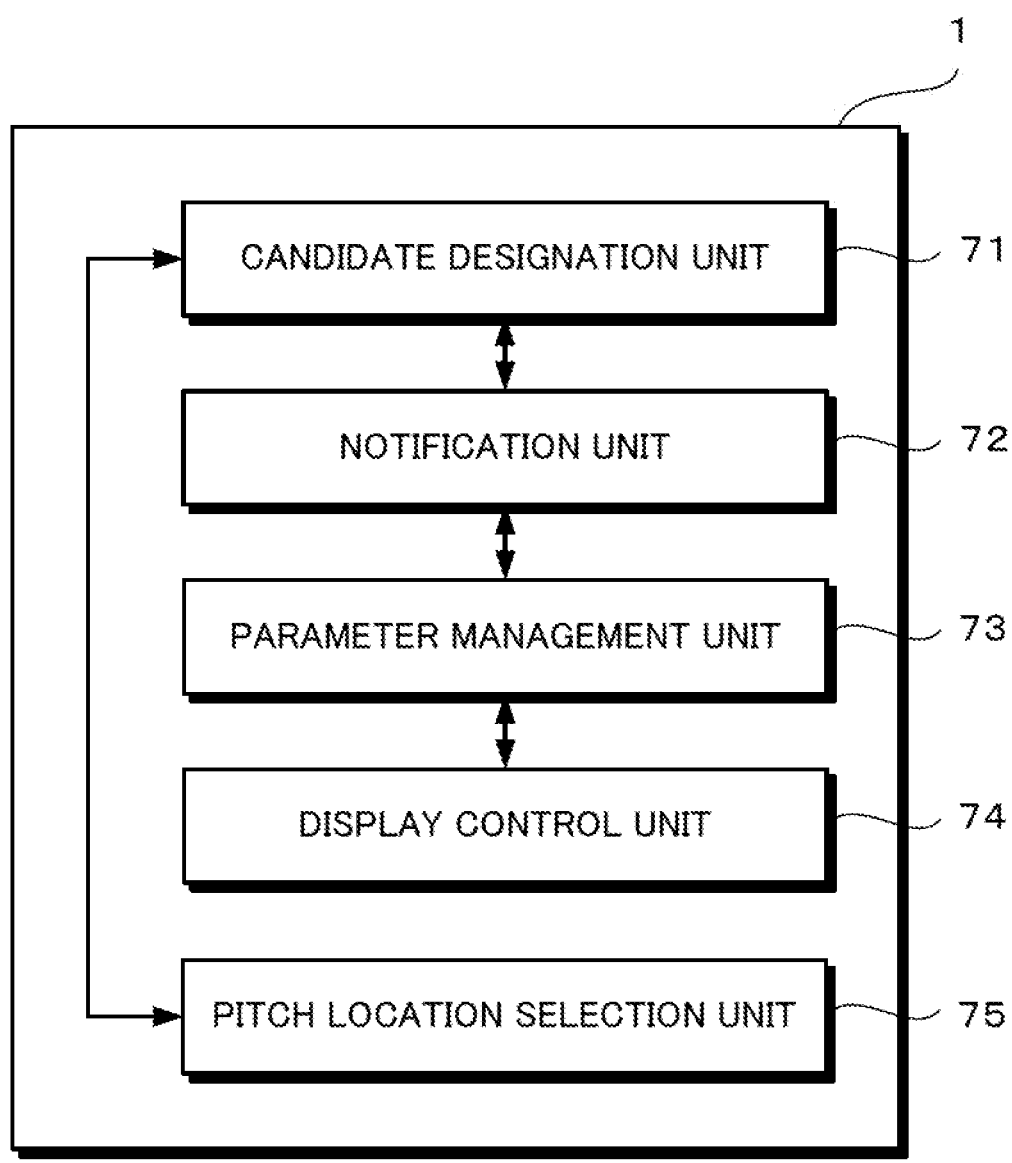
FIG. 23 is a functional block diagram illustrating another example of the major configuration of the game device.

Further, as illustrated in FIG. 23, it is preferable that the game device 1 further comprises a pitch location selection unit 75 in addition to the candidate designation unit 71, the notification unit 72, the parameter management unit 73 and the display control unit 74. The pitch location selection unit 75 has the function of selecting to which of the strike location or the ball location, the pitch of the pitch type designated as the candidate by the candidate designation unit 71 is to be thrown based on the information on the user's operation.

In the baseball game of the present embodiment, as illustrated in FIG. 8, etc., the pitch location selection unit 75 determines the pitch location of the pitch type as the candidate based on the information on the operation of moving to the strike location area 121 or the ball location area 122, the pitch type card 100 designated as the candidate (based on the information of the contact coordinate position input from the touch input detection unit 15). Namely, in the case where the pitch type card 100 is moved to the strike location area 121, the pitch location selection unit 75 determines the pitch location to be the strike location, and in the case where the pitch type card 100 is moved to the ball location area 122, the pitch location selection unit 75 determines the pitch location to be the ball location.

Figure 33:
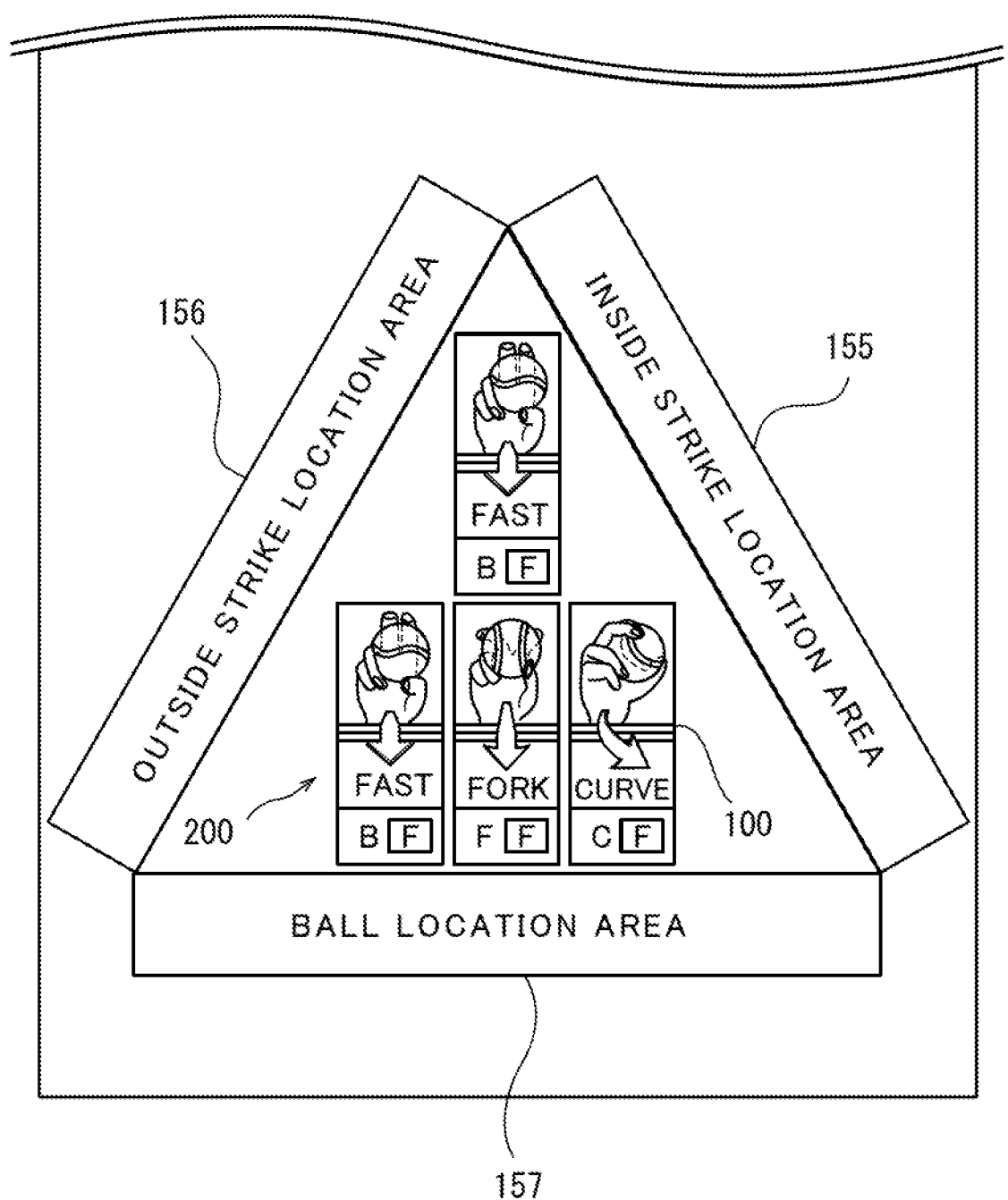
FIG. 33 is an explanatory diagram illustrating an example of the screen for the pitching operation, which has three parameter areas.

In the above example, a selectable patching is realized by the operation of moving the pitch type card 100 either to the strike location area 121 or the unfair ball location area 122. However, the configuration of realizing the selectable pitching is not limited to this example. For example, as illustrated in FIG. 33, it may be configured to allow the user to perform the selectable pitching between the strike location and the ball location and further to roughly set the strike location by the operation of moving the pitch type card 100 to an inside strike location area 155, an outside strike location area 156 or a ball location area 157. The example of FIG. 33 is described details later. Alternatively, it may be configured to select either the strike location or the ball location by operating buttons or direction keys. Namely, it is only required to configure the pitch location selection unit 75 to enable the selectable pitching between the strike location and the ball location based on the information on the operation of enabling the selectable pitching between the strike location and the ball location. Therefore, it is possible to apply various operations including the operation using buttons displayed on the screen, the operations using buttons, and the like.

According to this configuration, since an option is given to make a pitch of the pitch type selected by the user at the ball location, it is possible for the user to mix pitches to make a pitch sequence by effectively selecting a pitch to the ball location (so-called a waste pitch, a pitch which tempts the tatter to swing, a pitch to be thrown before a money pitch to make the money pitch effective, etc.). For example, as illustrated in FIG. 12, even in the case where the pitch type "forkball" of low parameter is displayed on the screen as the candidate, by throwing this pitch to the ball location, it is possible to improve the parameters of the remaining pitch types (for example, fastball and the like) of the selectable targets. Therefore, the user can take such strategy that to increase the parameter of the pitch type to be used as a money pitch, a pitch of other pitch type of low parameter is thrown at the ball location purposely. In this way, it is possible make an effective use of the pitch type of low parameter by throwing the pitch at the ball location as necessary (a pitch can be thrown at the ball location at maximum of three times until the count becomes three balls), thereby realizing a game with high amusement properties.

Figure 24:
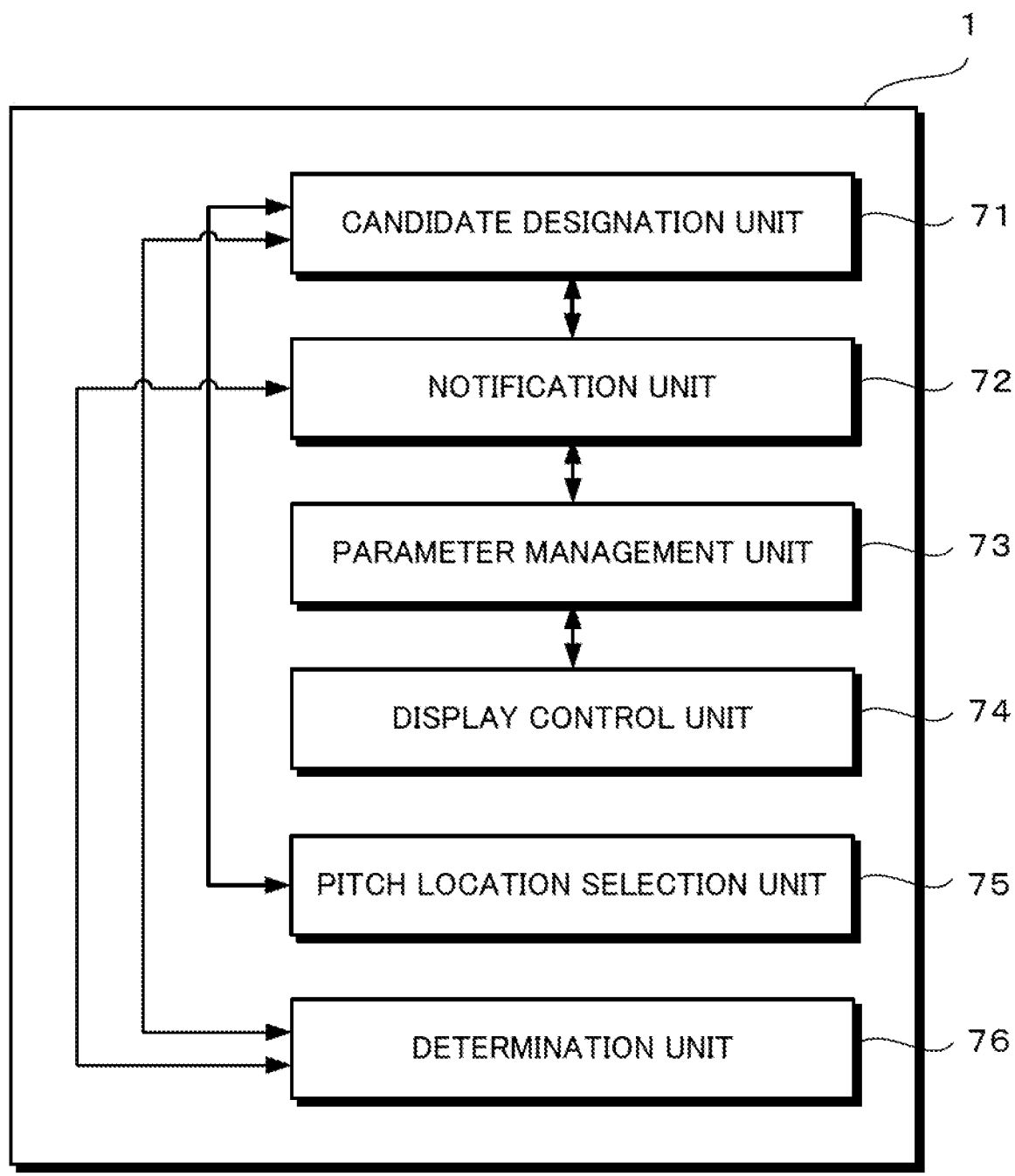
FIG. 24 is a functional block diagram illustrating another example of the major configuration of the game device.

Next, a variation of the configuration of the game device 1 is explained. As illustrated in FIG. 24, it is preferable that the game device 1 further comprises a determination unit 78 other than the candidate designation unit 71, the notification unit 72, the parameter management unit 73, the display control unit 74 and the pitch location selection unit 75. This determination unit 76 determines the risk level of allowing the batter to make a hit or the safe level of getting the batter out based on the parameter of the pitch type of the candidate on the assumption that the pitch type of the candidate designated by the candidate designation unit 71 is pitched to the strike location. An example of the method of calculating the risk level and the safe level is shown below.

For example, it may be configured to set the relationship between the parameters of the pitch types and the risk levels or the safe levels beforehand, and determine the risk level or the safe level of the pitch type designated as the candidate based on the information indicating such relationship. For example, the above relationship may be set such that when the ball power parameters of the pitch types are in ranks S and A, the risk level is 10% (safe level is 90%); when the ball power parameters of the pitch types are in ranks B and C, the risk level is 30% (safe level is 70%); when the ball power parameters of the pitch types are in ranks D and E, the risk level is 50% (safe level is 50%); and when the ball power parameters of the pitch types are in ranks F and G, the risk level is 70% (safe level is 30%). This above risk levels or the safe levels maybe adjusted based on the parameters (batting power parameters, etc.) of the batter characters 112. For example, the parameter of the batter character 112 is in the rank B or higher, the risk level is adjusted to be increased by 10% (the safe level is decreased by 10%), or when the parameter of the batter character 112 is in the lower rank than the rank E, the risk level is adjusted to be decreased by 10% (the safe level is increased by 10%).

Alternatively, the numeral values 1 to 8 may be assigned respectively to the ranks S and A to G of the parameters of the pitch types. Then, the risk level D and the safe level R may be computed using the following formula (1) and the formula (2) wherein "v" is the numeral value of the ball power parameter of the pitch type designated as the candidate, "D" is the risk level allowing the batter to make a hit, and "R" is the safe level of getting the batter out.

$$D=f(v)=10 \times a \times v \tag{1}$$

$$R=100-D \tag{2}$$

In the above formula (1), "a" is a constant.

In the above example, the risk level or the safe level is calculated in a simple manner based on only the ball power parameter of the pitch type of the pitcher character 111. However, it may tie configured to adjust the risk level or the safe level based on the parameter (batting power parameter or the like) of the batter character 112. For example, in the above formula (1), "a" may be expressed as the function "b", i.e., a=f(b). Namely, in the above formula (1), "a" is a variable subjected to change based on the parameter "b" of the batter character 112.

Figure 25:
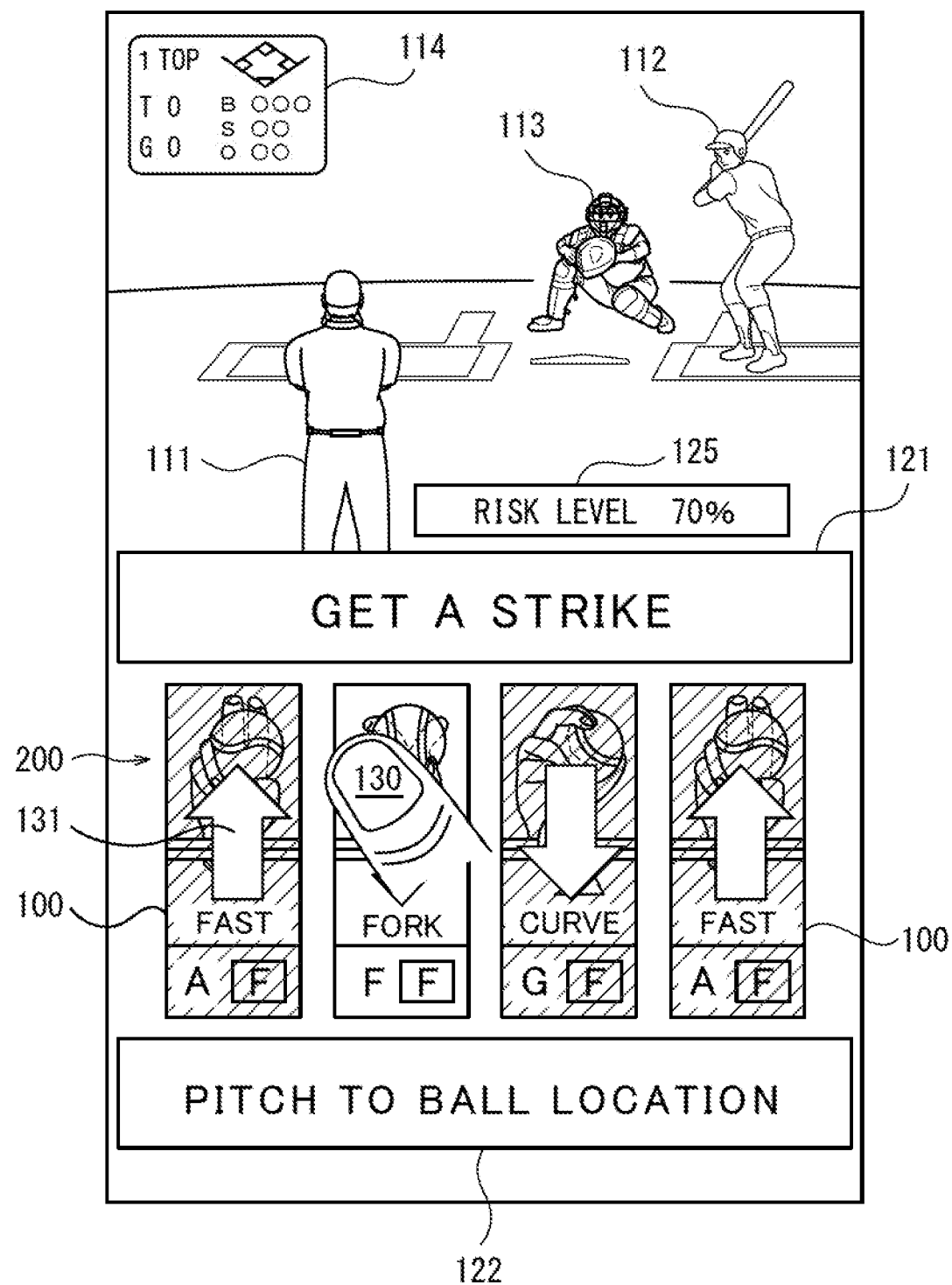
FIG. 25 is an explanatory diagram illustrating an example of a screen for the pitching operation, which includes a risk level display area.

The notification unit 72 is configured to notify the information on the risk level or the safe level obtained from the determination unit 76 at the time the candidate is designated by the candidate designation unit 71. An example of the notification is shown in FIG. 25. In FIG. 25, a risk level display area 125 is displayed on the screen, and a numeral value indicative of the risk level is displayed in this risk level display area 125, whereby the user is notified of the risk level on the assumption that a pitch of the pitch type designated as the candidate is thrown at the strike location. However, the present embodiment is not intended to be limited to this example, for example, the risk level or the safe level maybe shown with the display in gages or using illustrations. Alternatively, in combination with the notification with above display on the screen, a sound notification may be adopted, or in replace of the screen display notification, only the sound notification may be adopted.

Here, it is configured to display the risk level only when the candidate is designated by the user by contacting the pitch type card 100 with the finger 130, and the display of the risk level disappears from the screen when the user cancels the designation of the candidate by releasing the finger 130 from the screen.

According to the foregoing configuration, the user can decide to which of the strike location or the ball location, the pitch is to be thrown in consideration of the risk level or the safe level as notified. Therefore, even for a beginner of the baseball game, who is not very aware of the skill of getting the batter cut by effectively using the waste pitch, the pitch at the ball location may be selected if there is a high risk by throwing the pitch to the strike location. In this way, while performing the game, the user can naturally learn how to effectively use the waste ball, which makes the user find the game interesting.

In the following, an example of the operations when pitching in the game device 1 of the present embodiment is explained with reference to the flowcharts of FIG. 26 and FIG. 27.

The game device 1 selects the four pitch type cards 100 as the selectable targets at random from among the plurality of pitch type cards 100 as the pitch types of the pitcher character 111 (S1). Incidentally, instead of randomly selecting the pitch type cards 100, it may be configured to select the pitch type cards 100 according to the predetermined order. The information on the pitch type of the pitcher character 111 can be obtained from the player database illustrated in FIG. 3.

Further, the game device 1 sets the initial parameters to the four pitch type cards 100 selected in the step S1 (S2). The parameters of this initial value can be obtained from the player database. In this case, the game device 1 stores in the storage device the four pitch type cares 100 and their parameters as illustrated in FIG. 21. Then, as illustrated in FIG. 5, the game device 1 displays the four pitch type cares 100 with initialized parameters on the screen as the plurality of selectable targets (S3).

Thereafter, it is determined which one of the four pitch type cards 100 is designated by the user as the candidate (S4). In the present embodiment, as illustrated in FIG. 6, by touching one of the four pitch type cards 100 with the finger 130, it is possible to designate the candidate. When one of the four pitch type cards 100 is designated (S4; YES), the game device 1 obtains the information on the changes in parameters of the non-selected three pitch type cards 100 (S5). The changes in parameters of the pitch types are managed by the parameter management unit 73. For example, on the assumption that the selection of the candidate is confirmed, the game device 1 obtains the information car changes in respective parameters of the non-selected three pitch type cards 100 other than the candidate based on the parameter change information as illustrated in FIG. 18.

Then, the game device 1 notifies the information on changes in the parameters of the non-designated three pitch type cards 100 on the screen (S8). For example, as illustrated in FIG. 6, the game device 1 displays the arrow object 131 indicating an increase or a decrease of the parameter for each of the non-designated three pitch type cards 100 other than the candidate. With this configuration, at the time the user designates the pitch type for the next pitch as the candidate, it is possible for the user to recognize on the screen how the parameters of the remaining non-designated pitch types would be changed.

Further, the game device 1 determines based on the parameter of the designated pitch type, the risk level of allowing the batter to make a hit on the assumption that the pitch type designated as the candidate is pitched at the strike location (S7). The risk level is calculated, for example, by the above equation (1). Then, as illustrated in FIG. 25, the game device 1 displays the risk level on the screen (S8). Incidentally, in replace of the risk level, or in combination of the risk level, the safe level of getting the batter out may be displayed on the screen. Also, these steps S7 and S8 may be omitted.

Thereafter, if the user cancels the designation of the candidate by releasing the finger 130 from the pitch type card 100 (S9: YES), the game device 1 cancels the notification with the arrow object 131 and the notification of the risk level displayed on the screen (S10), and sets the display of the screen back to the previous display of the screen before the candidate is designated. Thereafter, the sequence goes back to S4.

On the other hand, when the user performs an operation of moving the pitch type card 100 designated as the candidate to the strike location area 121 or the ball location area 122 (S11; YES), the game device 1 confirms the selection of the pitch type of the candidate, and at the same time confirms the pitch location (S27 of FIG. 12). For example, as illustrated in FIG. 8, when the pitch type card 100 of the fastball as the candidate is moved to the strike location area 121. the game device 1 confirms that the fastball is to be pitched to the strike location. Furthermore, as illustrated in FIG. 9, the game device 1 lets the pitcher character 111 start pitching (S13).

Thereafter, the game device 1 displays the result of batting by the batter character 112 on the screen (S14). Furthermore, it is determined if the pitching continues for the same batter character 112 currently at bat (S15). For example, when the batter character 112 hits the foul ball swings and misses the ball but not yet a strike out, lets the pitch go by but not yet the strike out nor the base on balls, the pitching continues for the same batter character 501 (S15: YES). Then, the sequence goes back to S16.

In step S16, the game device 1 changes the respective parameters of the non-selected three pitch type cards 100 for the current pitch. Namely, as notified using the arrow object 131 in the step S6, the game device 1 changes the respective parameters of the non-selected three pitch types 100. The game device 1 further stores the parameters as changed in the storage device as illustrated in FIG. 21.

Further, the game device 1 selects the pitch type card 100 at random from among the plurality of pitch type cards 100 of the pitch types of the pitcher character 111 (S17) in replace of the pitch type card 100 used for the current pitch. Then, the game device 1 sets an initial value to the parameter of the new pitch type card 100 (S18). Further, as illustrated in FIG. 21, the game device 1 stores the new pitch type card 100 and its parameter (initial value) in the storage device. Further, the game device 1 displays the new pitch type card 100 whose parameter has been initialized on the screen in replace of the pitch type card 100 used made (S19). Then, the sequence proceeds to the step S4 of FIG. 28.

On the other hand, if the pitching does not continue for the same batter character 112 (S15: NO), the game device 1, for example, when the batter character 112 made a hit, or became out if the inning has not been ended with three outs (S20: NO), the sequence proceeds to S1 of FIG. 28. Then, another set of the four pitch cards 100 is newly selected for the new pitcher character 112 (S1), and the parameters of the four pitch type cards 100 are initialized (S2).

The processing in the above steps S1 to S20 is repeated until the pitcher character 111 gets three outs and the inning ends.

In the above example, the selectable target is confirmed as the candidate by moving the pitch type card 100 designated as the candidate to the strike location area 121 or the ball location area 122. However, this is merely a non-limited example. As a variation, it may be configured such that when a prescribed time period has passed (for example, 2 seconds) after the user designates the pitch type card 100 as the candidate (for example, the pitch type card 100 is kept being pushed with the finger 130 for 2 seconds), the pitch type card 100 of the candidate is confirmed automatically as the selected target and the pitching of the selected pitch type is started. In this case, the selection of the pitch location between the strike location and the ball location is also determined automatically.

Figure 28:
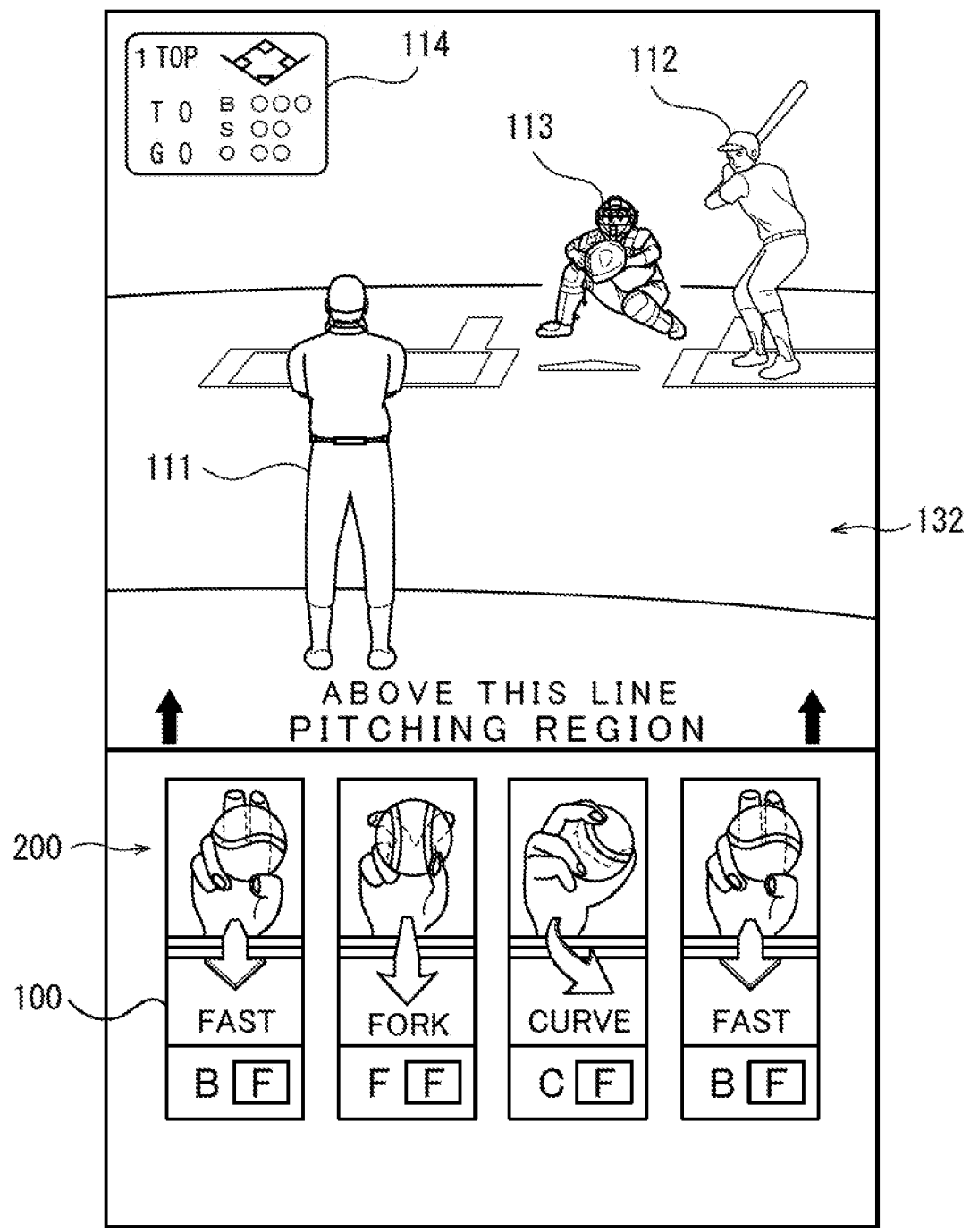
FIG. 28 is an explanatory diagram illustrating an example of the screen for the pitching operation.

As described, it is preferable to configure such that the selectable pitching can be made between the strike location and the ball location. However, it may be configured that the user does not perform the operation of setting the pitch location (i.e., the user only selects the pitch type when throwing a pitch). For example, as illustrated in FIG. 28, the strike location area 121 and the ball location area 122 are omitted from the screen for the pitching operation, and all the regions above the pitch type card group 200 is set to a pitching region 132. Then, when the user drags by touching an arbitrary pitch type card 100 from the pitch type card group 200 and moves it to the pitching region 132, the pitch type is confirmed, and the pitcher character 111 starts pitching. In this case, the pitch location is automatically determined by the game device 1.

In the above example, the parameters of the pitch types are expressed by eight ranks of S, and A to G. However, this is merely a non-limited example. For example, the parameters of the pitch types may be expressed by using ability values of, for example, 0 to 99.

It may be configured that the more continuously the pitch type of the same attribute is selected, the larger is the amount of change (change degree) of the parameter of the non-selected pitch type. Next, an example of this configuration is shown. For example, in the case where the pitch type of the same attribute is selected continuously three times (specifically, for example, the fastball is pitched three times continuously), the parameter (ability value) of the non-selected pitch type of the same attribute as that of the selected pitch type is changed by "−5" for the first pitch, by "−7" for the second pitch, and further by "−9" for the third pitch. Therefore, in this case, the parameter of the pitch type of the same attribute remaining without being selected is changed (decreased) by "−21" in total. On the other hand, in this case where the pitch type of a different attribute is selected continuously three times, the parameter (ability value) of the non-selected pitch type of the different attribute from that of the selected pitch type is changed by "+5" for the first pitch, by "+7" for the second pitch, and further by "+9" for the third pitch. Therefore, in this case, the parameter of the pitch type of the same attribute remaining without being selected is changed (increased) "+21" in total.

In the above example, for the plurality of selectable targets, the four pitch type cards 100 are shown. However, the number of the pitch type cards 100 is not limited to four, as long as two at mere selectable targets are displayed. Furthermore, it is not necessarily that the number of selectable targets displayed on the screen is fixed, and the number of the selectable targets may be variable. Namely, the number of the pitch type cards 100 to be displayed in the field (deck) may be variable. For example, it may be configured that although usually four pitch type cards 100 are displayed on the screen, when a predetermined condition is satisfied, the number of the pitch type cards 100 is increased to five or more. For the predetermined condition, an arbitrary condition can be set such as a condition on the consumption of points and a condition on in-game currency owned by the user, a condition on the access to the game continuously made for a predetermined days (for example, 7 days), a condition on consecutive victories for the matches in the game (for example, three consecutive victories), and the like.

In the foregoing embodiment, explanations have been given mainly through the example in which the present invention is applied to the baseball game. However, the present embodiment is not intended to be limited to this example. Further, the game device 1 of the present embodiment is characterized in that when a specific selectable target is designated from among the plurality of selectable targets (items), changes in parameters of the remaining selectable targets according to the designation are notified to the user beforehand. The game device 1 is also applicable to various other games as long as the configuration having the above characteristic is adopted. In the following, shown is an example in which the present invention is applied to another game.

In the match game using characters or items, for example using a monster character (hereinafter, simply referred to as a monster), for the plurality of selectable targets, a plurality of monsters are displayed on the screen. For example, the monsters are formed into cards, a deck is constituted by the plurality of monster cards, and the respective monsters in the deck are displayed on the screen as the selectable targets. To each monster, a parameter of offensive power is set (for example, in the numbers of 0 to 99).

Furthermore, any one of the plurality of attributes is set to each monster. For example, three attributes are provided the attribute A (the attribute A has a good affinity to the attribute B but has a bad affinity to the attribute C); the attribute B (the attribute B has a good affinity to the attribute C but has a bad affinity to the attribute A); and the attribute C (the attribute C has a good affinity to an attribute A but has a bad affinity to an attribute B), and any one of these three attributes is applied to each monster. The number of the attributes may be two, four or more.

While selecting the monster to be used for the next offensive action from the deck, user makes the monster to perform an offensive action against an opponent monster. Here, the game device 1 is configured to notify the user how the parameters of the non-designated other monsters are changed at the time the monster to be used for the next offensive action is designated from the deck as the candidate. For example, the notification may be made by displaying the arrow object 131, or the "+" symbol or the symbol, or numerical values and symbols "+5", "−10", or the like. For example, the game device 1 notifies the change in offensive powers of the non-designated monsters such that the offensive power of the non-designated monster of the same attribute as (or similar attribute to) that of the designated candidate is decreased; on the other hand, the offensive power of the non-designated monster of different attribute from that of the designated candidate is increased. This is to reflect the following characteristic into the offensive power of the non-designated monster. That is, the opponent becomes used to the offensive action from the previous monster, and becomes immune to the offensive action from the monster of the same attribute as (or similar attribute to) that of the previous monster; on the other hand, the opponent becomes weaker against the offensive action from the monster of different attribute from that of the previous monster.

Furthermore, in replace of the monsters, such items as weapons, fighter planes, tanks, offensive skills (skill cards) or the like may be used as the selectable targets. Also in the match using the above characters or items, by adopting the configuration of the game device 1 as explained through the example of the baseball game, similar functions and effects can be exhibited.

In the above example, explanations have been given through the case where the game device 1 is provided with "the candidate designation unit 71 configured to select the candidate from among the plurality of selectable targets" and "the notification unit 72 configured to notify the user of the changes in parameters of the selectable targets other than the candidate at the time the candidate is selected from among the plurality of selectable targets". However, the configuration wherein the above units 71 and 72 are omitted may be adopted. Namely, the game device 1 as the game management device which manages the game in which the user selects the selectable target to be used for the match from among the plurality of selectable targets may comprise the parameter management unit 73 configured to change the parameters of the selectable targets other than the selected target when one selectable target is selected from among the plurality of selectable targets based on the information on the user's operation. Namely, in FIG. 14 and FIG. 22 to FIG. 24, the game device 1 may be configured to omit the candidate designation unit 71 and the notification unit 72. In the flowchart of FIG. 26, steps S4 to S10 may be omitted.

According to the configuration, when a selection of any selectable target from among the plurality of selectable targets is confirmed, the parameters of the non-selected selectable targets other than the selected target are changed. In the above example of the baseball game, when the selection of the pitch type card 100 of for example, the fastball from among the four pitch type cards 100 of the selectable targets is confirmed, the ball power parameter of the non-selected pitch type card 100 of, for example, the curveball is increased (on the contrary, the ball power parameter of the pitch type card 100 of the fastball is decreased). In the example of the match game other than the baseball, the monsters A, B, C, D and E are displayed as a plurality of selectable targets in the user's deck. In this example, in the case where the monster B is selected from the user's deck for the offensive action against the opponent of the match (the selection is confirmed), the offensive powers of the non-selected other monsters A, C, D and E are changed.

In the match game in which the opponent (including both an actual opponent user and the CPU), after a certain selectable target as selected from among the plurality of selectable targets (items) is used for the match, the opponent of the match becomes used to that selected target. For example, for the non-selected selectable target of the same attribute as that of the selected target used, the opponent becomes immune to and stronger; on the contrary, for other non-selected selectable target, the opponent becomes weaker. In order to artificially reproduce the above feature in the game, after the selectable target is selected and used, the parameter of the non-selected selectable target remaining without being used are changed. The foregoing configuration is applicable to various match games, and examples of the selectable targets include the pitch types for the baseball game, various characters such as monsters, weapons, offensive skills, and the like.

According to the foregoing configuration, by selecting the specific selectable target from among the plurality of selectable targets, the parameters of the non-selected selectable targets are changed according to the selected target. Therefore, various options become available for the strategy by deciding which selectable target is to be selected, thereby realizing the game with high amusement properties.

[The Major Functional Configuration of the Game Device (Second Embodiment)]

Next, mainly explained is the functional configuration of the game device 1, which realizes a user interface which enables game operations with ease, such as a pitching operation, etc., inducting a plurality of operation elements even with a limited size of a game screen.

Figure 29:
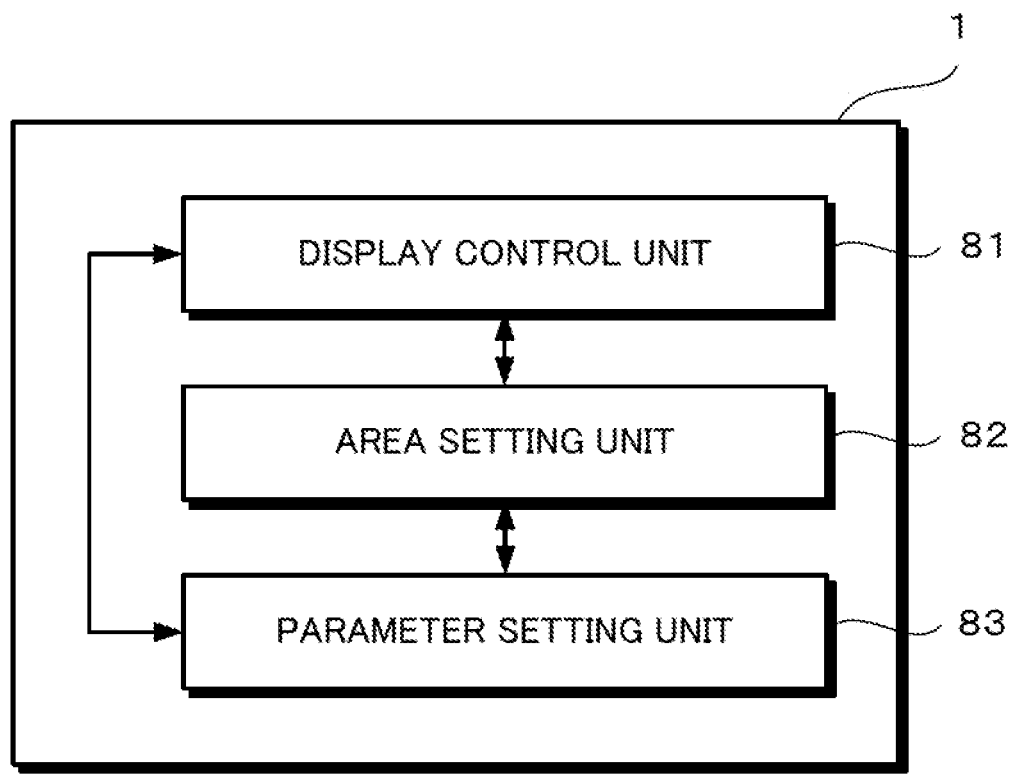
FIG. 29 is a functional block diagram illustrating another example of the major configuration of the game device.

The game device 1 according to the present embodiment is a game management device which manages the game to be played by selecting with the touch operation, the selectable target from the plurality of selectable targets displayed on the screen, and mainly comprises as illustrated in FIG. 29, a display control unit 81, an area setting unit 82, a parameter setting unit 83, etc. The examples of the above contact operation include other than a touch operation with respect to the touch panel unit 3, a touch operation with respect to a touch pad for a back surface input mounted on the back surface of the display unit (a so-called, a back surface touch operation), and the like. Here, shown is an example of the touch operation with respect to the touch panel unit 3.

The display control unit 81 has a function of displaying a plurality of selectable targets on the screen. This display control unit 81 has the function similar to that of the display control unit 74 of the first embodiment. As illustrated in FIG. 5, the display control unit 81 displays a plurality of pitch type cards 100 as the plurality of selectable targets.

The area setting unit 82 has a function of setting the plurality of parameter areas respectively corresponding to the plurality of parameters within the screen on which the plurality of selectable targets are displayed. In the example of the baseball game, the plurality of parameters correspond to a plurality of pitch location parameters including a strike location parameter, a ball location parameter, and the like. Further, as illustrated in FIG. 5, examples of the plurality of parameter areas can be the strike location area 121 corresponding to the pitch location parameter of the "strike location" and the ball location area 122 corresponding to the pitch location parameter of the "ball location".

The number of the parameter areas to be set by the area setting unit 82 can be determined arbitrary. As illustrated in FIG. 5, other than the configuration wherein two parameter areas (strike location area 121 and the ball location area 122) corresponding to the two pitch locations are set, a configuration wherein three or more parameter areas are set may be adopted.

The parameter setting unit 83 is configured that when performing an operation of moving a selected target to one of the plurality of parameter areas, to set a parameter corresponding to the parameter area to which the selected target is moved the selected target being selected from among the plurality of selectable targets with the contact operation.

For example, as illustrated in FIG. 8, the user touches with the finger 130 (or pen or the like) the specific pitch type card 100 among the four pitch type cards 100 as the plurality of selectable targets displayed on the screen. Then, while maintaining this contact state, the user moves the finger 130 on the specific pitch type card 100 as the selected target to the specific parameter area (the strike location area 121 or the ball location area 122) and then releases the finger 130 from the screen (a so-called a drag and drop operation). Alternatively, the user may contact the specific pitch type card 1000 on the screen, and perform an operation of quickly sliding the finger on the specific pitch type card 100 in the direction of the specific parameter area (the strike location area 121 or the ball location area 122) (a so-called a flick operation) to move the specific pitch type card to the specific parameter area. When the described operation is performed by the user, to the specific pitch type card 100 (pitch type) touched with the finger, the parameter setting unit 83 sets a parameter corresponding to the strike location area 121 or the bail location area 122 to which the specific pitch type card 100 is moved. Specifically, for example, when the user touches the pitch type card 100 of the fastball with the finger 130, and performs an operation of moving the pitch type card 100 to the strike location area 121, the parameter setting unit 83 sets the pitch location parameter of the "strike location" to the pitch type "fastball".

Only by moving the pitch type card 100 selected by the user to the strike location area 121 or the ball location area 122, a pitching operation by the pitcher character 111 is started automatically based car the pitch type and the pitch location as determined without requiring the user to perform a further operation As described earlier, it may be configured such that when a start operation is performed separately to start the patching operation, the pitching operation by the pitcher character 111 is started.

According to the foregoing configuration in the example of the baseball game, the game operation including a plurality of operation elements of the pitch type selection and the pitch location setting can be performed with ease by moving one of the plurality of pitch type cards 100 displayed on the screen to the specific parameter area (the strike location area 121 or the ball location area 122) with one finger. The foregoing configuration provides a user interface which is effective, in particular, for the game to be executed in the portable terminal such as a smartphone, etc., with a screen of a limited size.

Incidentally, according to the above described first embodiment the notification function is provided such that at the time the candidate is designated from among the plurality of selectable targets, the user is notified of the changes in parameters of the selectable targets other than the designated candidate. This notification function may be provided also in the interface of the present embodiment, or may be omitted from the interface of the present embodiment.

Figure 30:
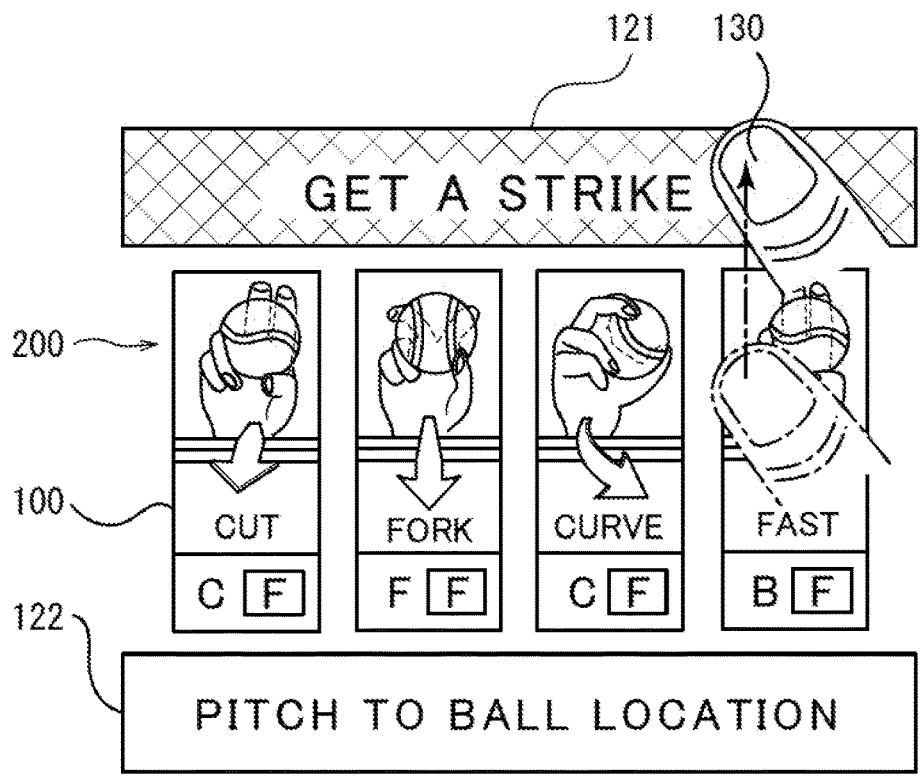
FIG. 30 is an explanatory diagram illustrating an example of an operation on the screen for the pitching operation.
Figure 31:
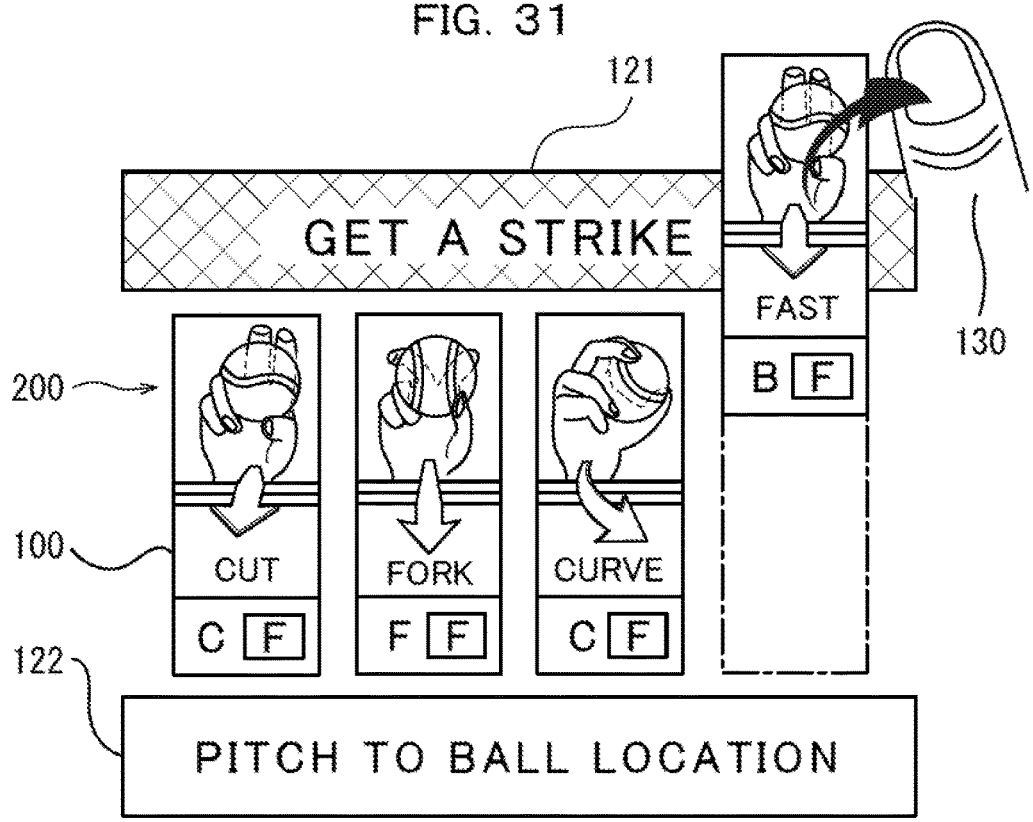
FIG. 31 is an explanatory diagram illustrating another example of the operation on the screen for the pitching operation.

In the operation of moving the pitch type card 100 selected by the user to the strike location area 121, etc., by moving the finger 130 on the pitch type card 100 on the screen while maintaining the contact state without releasing the finger 130 from the screen, the pitch type card 100 is moved in real time in association with the changes in coordinates of the contact position of the linger 130 as illustrated in FIG. 8. However, the present embodiment is not intended to be limited to this, and, for example, it may be configured that the pitch type card 100 selected by the user is moved in response to but behind the changes in coordinates of the contact positions of the finger 130. For example, as illustrated in FIG. 30, the finger 130 is made contact the pitch type card 100 of the fastball and while maintaining the finger 130 contact, the screen (the contact state is maintained while the finger 130 is being moved without releasing it from the screen), the finger 130 is moved to the strike location area 121. Then, as illustrated in FIG. 31, the finger 130 is released from the strike location area 121 of the screen. In this case, it may be configured as illustrated in FIG. 30 that the pitch type card 100 is kept at the initial position while the finger 130 is being moved on the screen. Then, as illustrated in FIG. 31, at the timing the finger 130 is released from the strike location area 121 of the screen, the pitch type card 100 is moved to the strike location area 121, and both the pitch type of the "fastball", and the pitch location of the "strike location" are confirmed at the same time.

Furthermore. in the same manner as the above described first embodiment, first, the user designates the candidate from the pitch type card 200, and performs an operation of moving the designated candidate to one of the parameter areas (for example, the strike location area 121 and the ball location area 122), whereby at the time the designated pitch card 100 as the candidate is moved to the parameter area, the selection (setting) of both the pitch type and the pitch location parameter are confirmed. In this case, when the candidate designated by the contact operation from the pitch type card group 200 is moved to one of the plural parameter areas (for example, the strike location area 121 and the ball location area 122), the parameter setting unit 83 confirms the designated candidate as the selected target, and sets to the selected target as confirmed, the parameter (the strike location or the ball location) corresponding to the parameter area to which the designated candidate is moved. In this case, until the pitch type card 100 is moved to the parameter area, the pitch type has not been confirmed. In this state, if the designation of the candidate is cancelled, for example, by releasing the finger from the candidate, the pitch type has not been selected. Therefore, until the pitch type is finally determined, it is possible for the user to reselect the pitch type with ease by repeating the designation and the cancelation of the pitch type.

Furthermore, in this case, by applying the configuration "wherein the user is informed of changes in parameters of the selectable targets other than the candidate at the time the candidate is designated; from among the plural selectable targets" as explained in the first embodiment, it is possible for the user to make use of simulation beforehand to see how the parameter of the pitch type would be changed for the pitch after next with the selection of the pitch type for the next pitch by repeating the designation and the cancellation for each of the candidates to try designating the respective pitch type cards 100 of various kinds. As a result, the game with high amusement properties can be realized in which the user is required to make a pitch sequence in consideration of not only the nest pitch but also the subsequent development.

As a variation, it may be configured to confirm the selection of the pitch type card 100 (pitch type) at the timing the contact object such as the user's finger or the like contacts one of the pitch type cards 100 of the pitch type card group 200. In this case, when performing the operation of moving the pitch type card 100, the selection of which is confirmed, to one of the plurality of parameter areas (for example, the strike location area 121 and the ball location area 122), the setting of the pitch location parameter is confirmed at the time the pitch type card 100 is moved to the parameter area.

It is preferable that the plurality of parameter areas include the first parameter area (for example, the strike location area 121) corresponding to the first parameter (for example, the strike location) and the second parameter area (for example, the ball location area 122) corresponding to the second parameter (for example, the ball location). Further, it is preferable that the area setting unit 82 is configured to arrange the first parameter area and the second parameter area so as to sandwich the plurality of selectable targets (for example, the four pitch type cards 100) in between.

For example, as illustrated in FIG. 5, the strike location area 121 as the first parameter area is arranged above the pitch type card group 200 as the plurality of selectable targets, and the ball location area 122 as the second parameter area is arranged below the pitch type card group 200. With this configuration, the user is only required to perform the operation of moving the pitch type card 100 to be used for the pitch upwards or downwards, to confirm both the pitch type and the pitch location (strike location or ball location), and the pitching is started.

Although not illustrated, it may be configured to arrange the strike location area 121 as the first parameter area and the ball location area 122 as the second parameter area respectively on the left side of the pitch type card group 200 and on the right side of the pitch type card group 200 so as to sandwich the pitch type card group 200 as the plurality of selectable targets in between.

According to the foregoing configuration, by arranging the strike location area 121 and the ball location area 122 so as to sandwich the pitch type group 200 in between, it is possible to perform a desired setting operation by merely selecting a specific pitch type card 100 from the pitch type card group 200 and changing the direction of moving the specific pitch type card 100, thereby realizing a simple and clear user interface.

The user interface shown in FIG. 5, etc., of the present embodiment is configured to limit the pitching function to the selection of the pitch type, and the selection of the pitch location between the strike location and the ball location. Further, the strike location area 121 and the ball location area 122 are respectively arranged so as to sandwich in between the pitch type group 200 for realizing the pitch type selection function. In the case where the game device 1 is the portable type, such as a smartphone or the like designed to have a screen of limited size, since it is expected to play the game by holding the game device 1 with a hand, the user would find it troublesome to perform operations made up of a plurality of steps and various setting operations. On the other hand, if a simplified configuration is adopted, which allows only the selection of the pitch type, it is concerned that the amusement properties would be degraded. In response, by adopting the user interface of the present embodiment, even with the screen of the limited size, like the case of smartphones, it is possible to realize a game which allows the pitching operation (the pitch type selection and the pitch location selection) without significantly degrading the amusement properties of the game with a simple operation.

As illustrated in the example of FIG. 5, it is preferable that the area setting unit 82 arranges the first parameter area (for example, the strike location area 121) and the second parameter area (for example, the ball location area 122) so as to extend from substantially the left end 141 of the screen to substantially the right end 142 of the screen.

According to the foregoing configuration, in the case where the user plays the game with the game device 1 such as a smartphone, etc., while holding the game device 1 with one hand, it is possible for the user to perform operations with one hand with ease (using the user's thumb of the hand holding the smartphone) both in the case of holding it with the right hand and the case of holding it with the left hand. Namely, in the case where the user holds the game terminal device with his/her right hand, generally, the user's thumb of the right hand would reach the right region of the screen but would be difficult to reach the left region. On the contrary, in the case where the user holds the game terminal device with his/her left hand, generally the user's thrum of the left hand would reach the left region of the screen but would be difficult to reach the right region. However, according to the foregoing configuration, since both the strike location area 121 and the ball location area 122 extend in the band shape from the left end 141 or substantially the left end 141 to the right end 142 or substantially near the light end 142, in both cases of holding the game device 1 with the left hand and the right hand, the thrum of the hand holding the game device 1 would reach both the strike location area 121 and the ball location area 122 without problem. Therefore, in both cases of holding the game device 1 with the left hand and the right hand, by performing the operation of contacting the screen with the thrum of the hand holding the game device 1, it is possible to surely move the pitch type card 100 of the selectable target either to the strike location area 121 or the ball location area 122.

According to the user interface of the present embodiment, "a specific parameter is set to a specific selectable target by moving the specific selectable target to the specific parameter area among the plurality of parameter areas in the state where the specific selectable target is selected from among the plurality of selectable targets (items)". For variations, the following configurations may be adapted.

First, explained is a variation of the user interface, which has at least three parameter areas. The plurality of parameter areas to be set within the screen by the area setting unit 82 include the first to the $n^{th}$ parameter areas respectively corresponding to the first to the $n^{th}$ parameter (n is a natural number of 3 or larger). The area setting unit 82 arranges the first to the $n^{th}$ parameter areas so as to surround the plurality of selectable targets. As a concrete example, explained is the configuration in which n=4, and the first to the fourth parameter areas are set in the screen.

Figure 32:
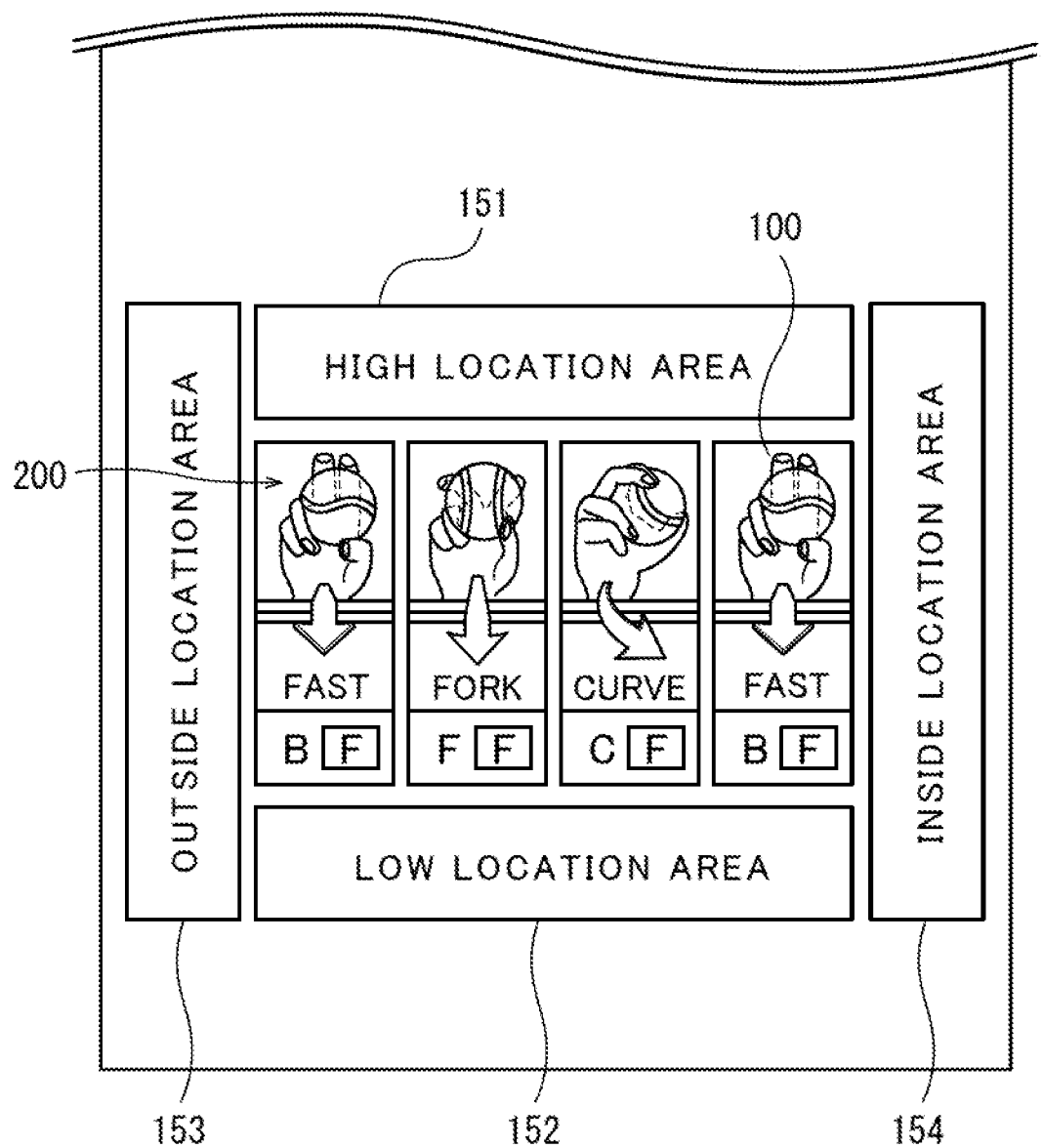
FIG. 32 is an explanatory diagram illustrating an example of a screen for the pitching operation, which has four parameter areas.

The first to the fourth parameters are the parameters of four pitch locations of, for example, the high location, the low location, the outside location and the inside location. As illustrated in FIG. 32, the first parameter area (for example, a high location area 151), the second parameter area (for example, a low location area 152), the third parameter area (for example, an outside location area 153) and the fourth parameter area (for example, an inside location area 154) are arranged so as to surround the pitch type card group 200 vertically and horizontally. In this case, in the state an arbitrary pitch type card 100 is selected with the finger from the pitch type card group 200, by dragging the pitch type card 100 and then releasing the finger from the screen in one of the first to the fourth parameter areas 151 to 154, it is possible for the user to set the pitch type and roughly set the pitch location (any one of the high location, the low location, the outside location, and the inside location). The above "outside location area 153" and the "inside location area 154" may be arranged so as to adjust the left and right positions thereof depending on whether the batter at bat is the right-handed batter or the left-handed batter. Namely, in the example of FIG. 32, shown is the display for the light-handed batter. For the display for the left-handed batter, the left and right positions can be reversed from the display shown in FIG. 32. According to the foregoing configuration, since the user can designate the inside and the outside intuitively, a desirable operability can be realized.

In an example where n=3, the first through the third parameters are the three pitch location parameters of the inside strike location, the outside strike location and the ball location. Furthermore, as illustrated in FIG. 33, "the inside strike location area 155" as the first parameter area, "the outside strike location area 156" as the second parameter area, and "the ball location area 157" as the third parameter area are arranged in a substantially triangle shape so as to surround the pitch type card group 200 as the plurality of selectable targets. In this example, when the user drags an arbitrary pitch type card 100 in the state the pitch type card 100 is selected from the pitch type card group 200, by releasing the finger in the inside strike location area 155, the user can throw a pitch of the pitch type corresponding to the selected pitch type card 100 at the inside strike location. Similarly, when the user drags an arbitrary pitch type card 100, by releasing the finger in the outside strike location area 156, the user can throw a pitch of the pitch type corresponding to the pitch type card 100 at the outside strike location. Similarly, when the user drags an arbitrary pitch type card 100, by releasing the finger in the ball location area 157, the user can throw a pitch of the pitch type corresponding to the pitch type card 100 at the ball location. Also in the foregoing configuration, in the same manner as FIG. 32, the "inside strike location area 155" and the "outside strike location area 156" may be arranged so as to adjust the left and right positions thereof depending on whether the batter at bat is the right-handed batter or the left-handed batter. Namely, in the example of FIG. 33, shown is the display for the right-handed batter. For the display for the left-handed batter, the left/right positions can be reversed from the display shown in FIG. 33. According to the foregoing configuration, since the user can designate the inside and the outside intuitively, a desirable operability can be realized.

Here, "n" can be any natural number of 3 or larger, and the first to the $n^{th}$ parameter areas can be arranged in the n-polygonal shape so as to surround the plurality of selectable targets (the pitch type card group 200, etc.).

As described, with the pitch type card group 200 as the plurality of selectable targets as the center, the plurality of (three or more) parameter areas are arranged so as to surround the pitch type card group 200 (see FIG. 32, FIG. 33). According to this configuration, since the plurality of parameter areas (the areas 151 to 154 of FIG. 32, the areas 155 to 157 of FIG. 33), to which the selectable target is moved, are collectively arranged, it is possible to perform the operation of selecting one pitch type card 100 from the pitch type card group 200 and the operation of moving the selected pitch type card 100 to the desired parameter area with ease. Furthermore, it is possible to perform a desired setting operation by merely selecting a specific pitch type card 100 from the pitch type card group 200 and changing the direction of moving the specific pitch type card 100, thereby realizing a simple and clear user interface.

As a variation of the foregoing configuration, explained is the configuration further including an $(n+1)^{th}$ parameter area corresponding to an $(n+1)^{th}$ parameter in addition to the first to the $n^{th}$ parameter areas. In this configuration, the area setting unit 82 sets the region outside the first to the $n^{th}$ parameter areas arranged so as to surround the pitch type card group 200 to be the $(n+1)^{th}$ parameter area. An example wherein n=4, and the first to the fifth parameter areas are set in the screen is explained in the following example with reference to FIG. 34.

Figure 34:
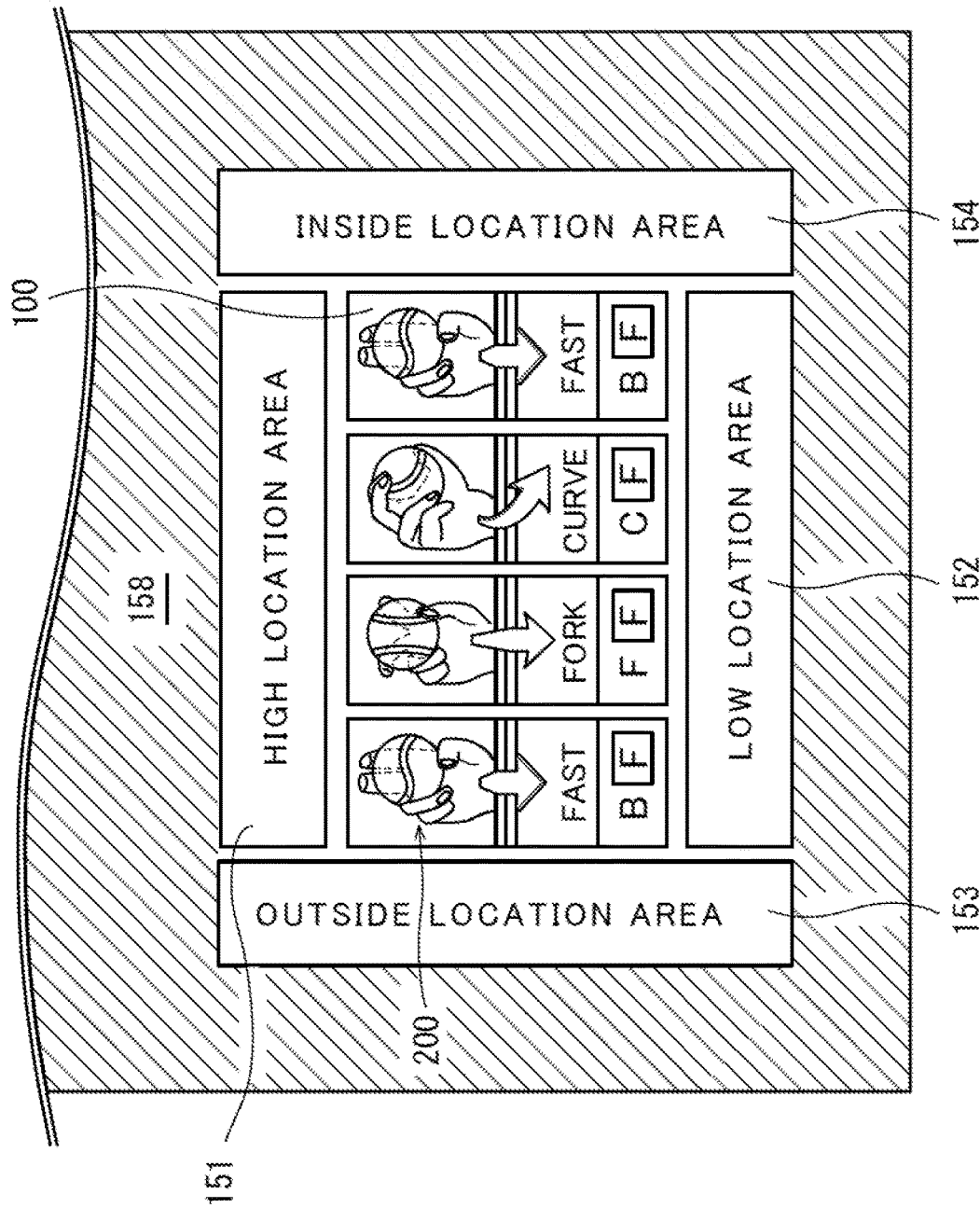
FIG. 34 is an explanatory diagram, illustrating an example of the screen for the pitching operation, which has five parameter areas.

FIG. 34 is a modified example of FIG. 32. Similar to FIG. 32, the first parameter area (for example, the high location area 151), the second parameter area (for example, the low location area 152), the third parameter area (for example, the outside location area 153) and the fourth parameter area (for example, the inside location area 154) are arranged so as to surround the pitch type card group 200 vertically and horizontally. Further, in the area outside these first to fourth parameter areas 151 to 154, a fifth parameter area (for example, a ball location area 158) is provided for setting the ball location parameter as a fifth parameter. In FIG. 34, the ball location area 158 is displayed by applying hatching for convenience of explanation; however, on the actual screen, such hatching is not displayed.

In this case, in the state an arbitrary pitch type card 100 is selected with the finger from the pitch type card group 200, by performing the operation of dragging the pitch type card 100 and then releasing the finger from the screen in one of the first to the fourth parameter areas 151 to 154, the user can set the pitch location to be the strike location (it is also possible to roughly set where in the strike location, the pitch location is, i.e., high, low, outside or inside location). Furthermore, if the finger is released from the screen at positive over the first to the fourth parameter areas 151 to 154 (i.e., in the ball location area 158 as the fifth parameter area), the user can set the pitch location to be the ball location. Also in this configuration, as in the case of FIG. 32, the "outside location area 153" and the "inside location area 154" may be arranged so as to adjust the left and right positions thereof depending on whether the batter at bat is the right-handed batter or the left-handed batter. Namely, in the example of FIG. 32, shown is the display for the right-handed batter. For the display for the left-handed batter, the left and light positions can be reversed from the display shown in FIG. 32.

According to the foregoing configuration, it is possible for the user to perform a desired setting operation based on the direction the contact object such as the finger, etc., in contact with the pitch type card 100, and the distance moved, thereby realizing a simple and clear user interface.

As a variation of the user interface shown in FIG. 34, it may be configured to roughly set a ball location based on where in the ball location area 158 arranged in the region outside the first to fourth parameter areas 151 to 154, the pitch type card 100 is moved (where in the ball location area 158, the finger dragging the pitch type card 100 is released from the screen) as explained below.

Specifically, when the pitch type card 100 is moved to the position over the high location area 151 (in the area above the high location area 151 of the ball location area 158), the parameter setting unit 83 sets a high ball location to the pitch type of the pitch type card 100. In the same manner, a low ball location may be set. Furthermore, when the pitch type card 100 is moved to the position over the outside location area 153 (in the area on the left hand side of the outside location area 153 of the ball location area 158), the parameter setting unit 83 sets the outside ball location to the pitch type of the pitch type card 100. Furthermore, when the pitch type card 100 is moved to the position over the inside location area 154 (in the area on the right hand side of the inside location area 154 of the ball location area 158), the parameter setting unit 88 sets the inside ball location to the pitch type of the pitch type card 100. In this manner, it is possible to roughly set the location among the high, low, outside and inside locations of the strike location or the ball location.

As the variation of the user interface shown in FIG. 32 or FIG. 34, as shown below, it may be configured to set a detailed location in the strike location based on at which position in the first to the fourth parameter regions 151 to 154, the pitch type card 100 is moved (at which position the finger dragging the pitch type card 100 is released from the screen).

Figure 35:
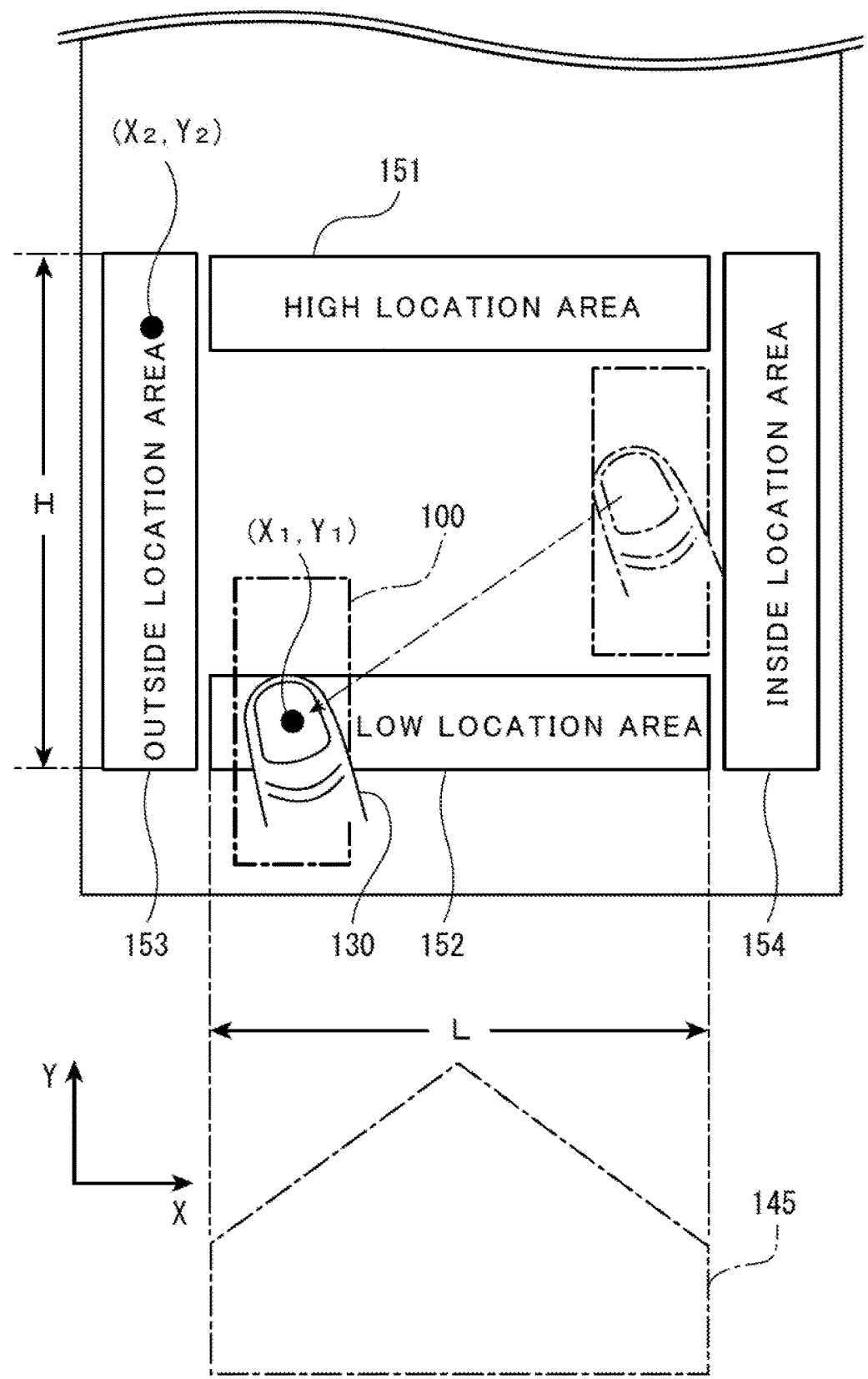
FIG. 35 is an explanatory diagram explaining a pitch location setting method.

As illustrated in FIG. 35, the length L in the horizontal direction (X-direction) of the high location area 151 and the low location area 152 is the same as the distance in the horizontal direction in the strike zone. The home plate 145 shown by the alternate long and short dash line in FIG. 35 is virtually described to explain the distance in the horizontal direction of the strike zone. The respective positions in the horizontal direction of the high location area 151 and the low location area 152 coincide with the position in the horizontal direction of the strike zone. Furthermore, in FIG. 35. the three pitch cards 100 are omitted for convenience sake, and only the pitch type card 100 as moved is shown by the alternate long and short dash line. For example, in the case where the user drags the pitch type card 100 to the low location area 152, and releases the finger 130 from the screen at the position of the coordinate (X1, Y1), the parameter setting unit 83 sets the pitch location in the horizontal direction of the strike zone based on the value X1 of the X coordinate of the position to which the pitch type card 100 is moved (the position at which the finger 130 is released). In the example of FIG. 35, the finger 130 is released at position X1 shifted to the left (shifted to the outside) in the low location area 152. Therefore, the parameter setting unit 83 sets the pitch location parameter to the low and outside the strike location.

The length H in the vertical direction (Y-direction) of the outside location area 153 and the inside location area 154 is the same as the distance in the vertical direction in the strike zone. The respective positions in the vertical direction of the outside location area 153 and the inside location area 154 coincide with the position in the vertical direction of the strike zone. For example, in the case where the user drags the pitch type card 100 to the outside location area 153, and releases the finger 130 from the screen at the position of the coordinate (X2, Y2), the parameter setting unit 83 sets the pitch location in the vertical direction of the strike zone based on the value Y2 of the Y coordinate of the position to which the pitch type card 100 is moved (the position at which the finger 130 is released). In this case, the finger 130 is released at position Y2 shifted to the upwards (shifted to the high location) in the outside location area 153. Therefore, the parameter setting unit 83 sets the pitch location parameter to the high and outside strike location.

Figure 36:
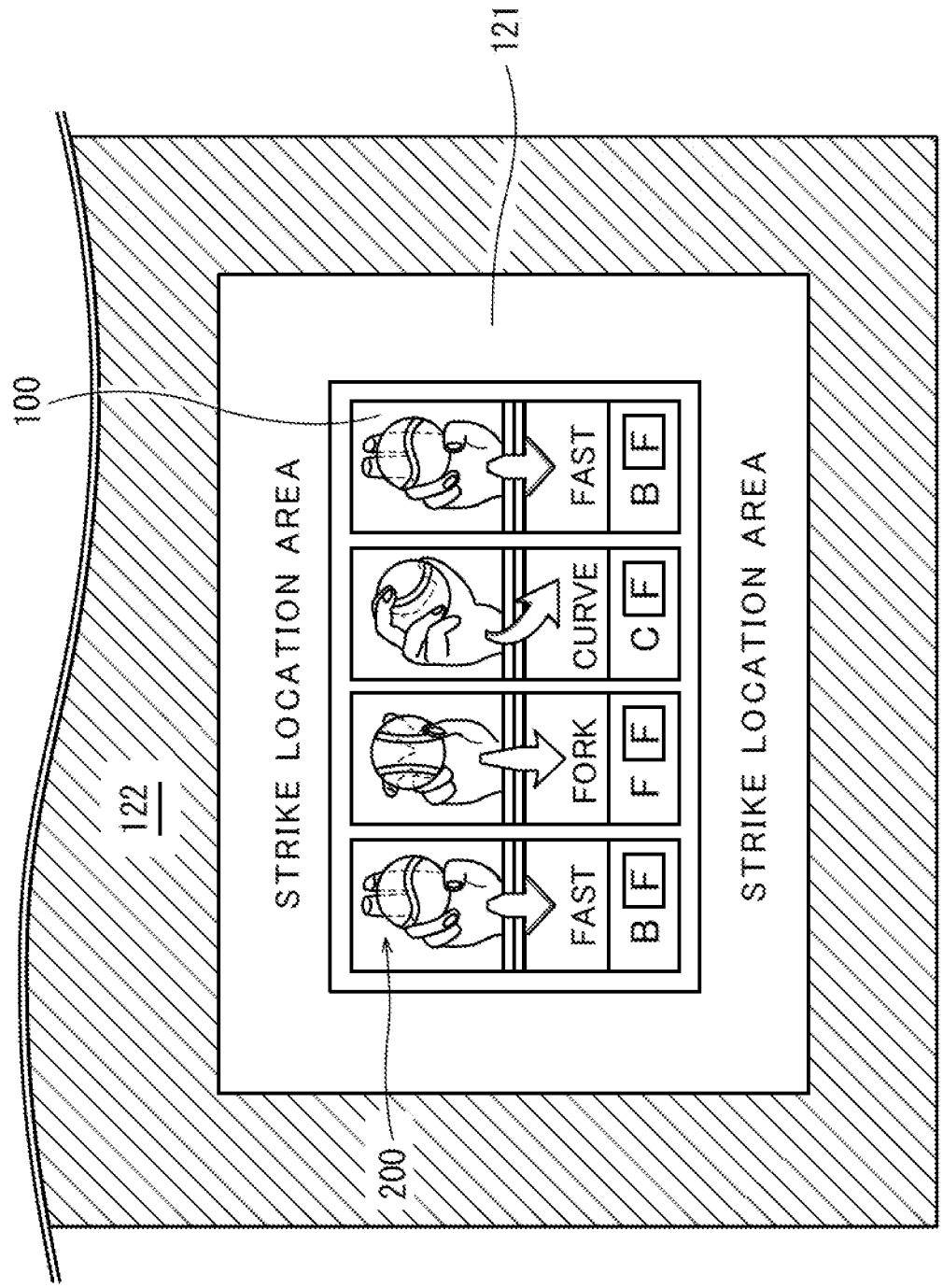
FIG. 36 is an explanatory diagram illustrating an example of a screen for the pitching operation, which has a circular parameter area.

Next, other variation of the user interface is explained. As illustrated in FIG. 36, the plurality of parameter areas includes the first parameter area (for example, the strike location area 121) corresponding to the first parameter for example, the strike location), and the second parameter area (for example, the ball location area 122) corresponding to the second parameter (for example, the ball location). Furthermore, the area setting unit 82 arranges the strike location area 121 as the first parameter area so as to annularly surround the pitch type card group 200 as the plurality of selectable targets, and arranges the ball location area 122 as the second parameter area outside the first parameter area.

Figure 38:
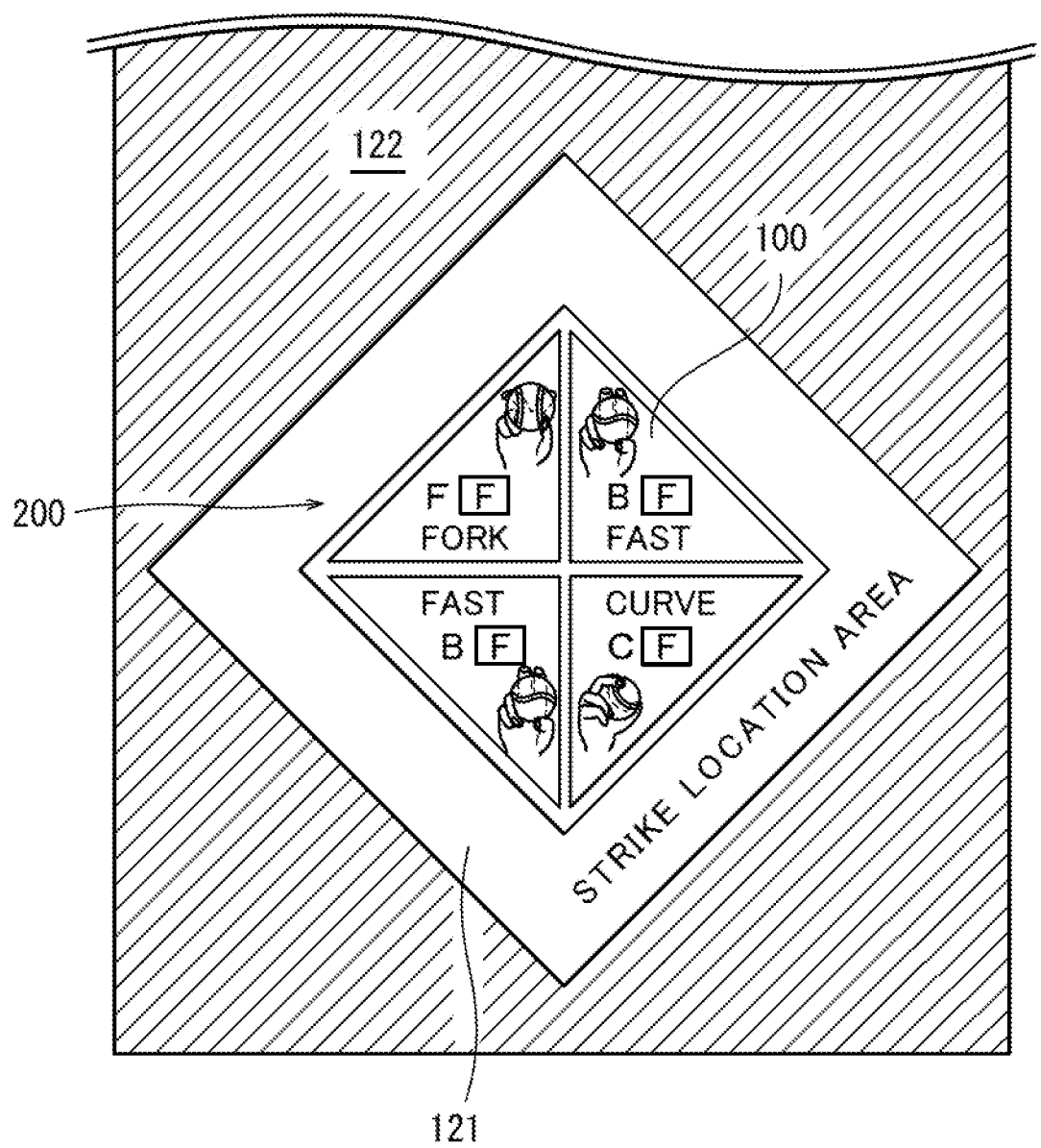
FIG. 38 is an explanatory diagram, illustrating another example of the screen for the pitching operation, which has the circular parameter area.

Incidentally, in FIG. 38, the ball location area 122 is displayed by applying hatching for convenience of explanation; however, on the actual screen, such hatching is not displayed.

In this example, in the state where the user drags an arbitrary pitch type card 100 selected with the finger from the pitch type card 200, by releasing the finger from the screen at the strike location area 121, it is possible to throw a pitch of the pitch type corresponding to the selected arbitrary pitch type card 100 at the strike location. On the other hand, in the state where the user drags an arbitrary pitch type card 100, by releasing the finger from the screen at positive over the strike location area 121 (i.e., at the ball location area 122), it is possible to throw a pitch of the pitch type corresponding to the selected arbitrary pitch type card 100 at the ball location.

Figure 37:
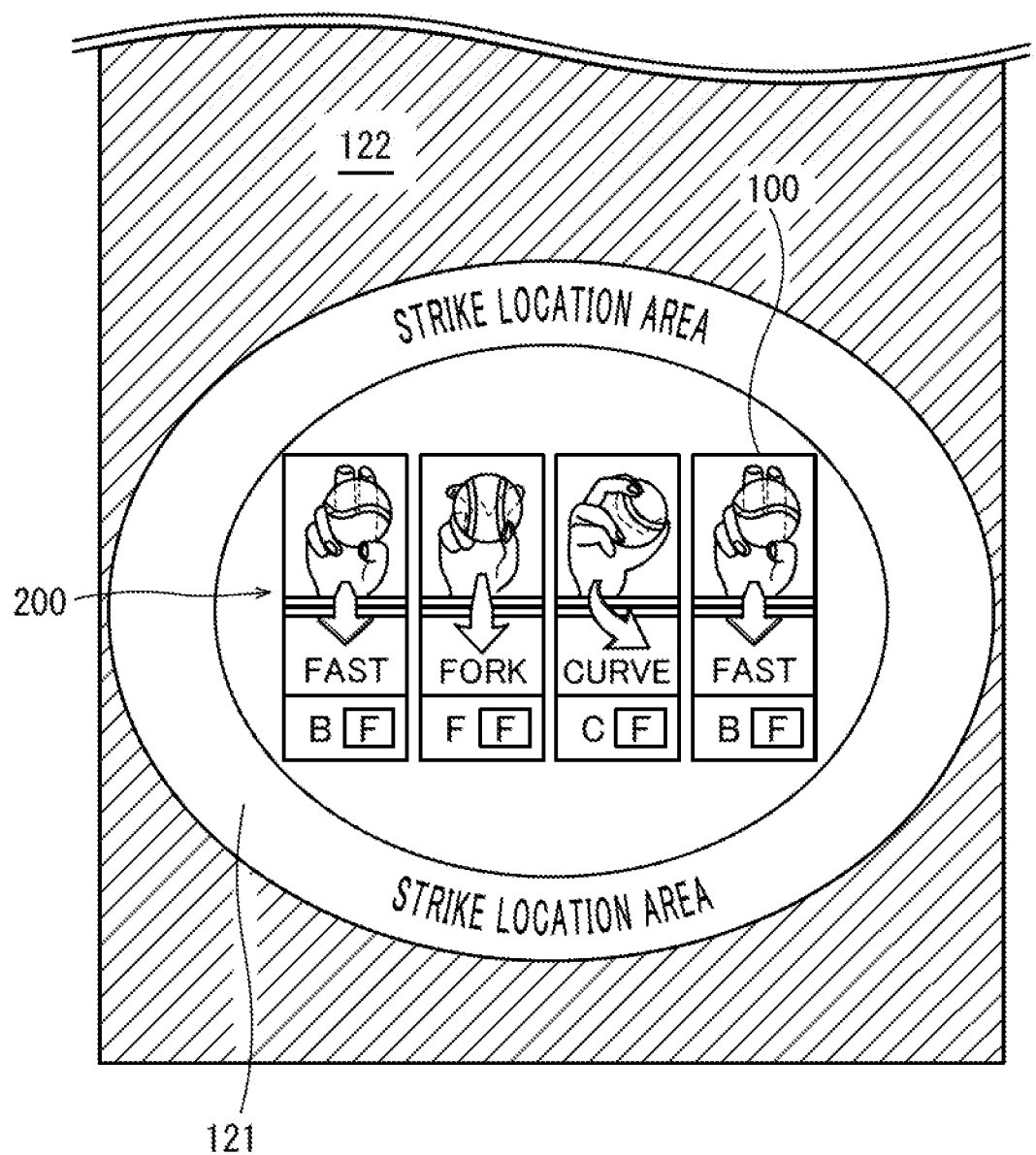
FIG. 37 is an explanatory diagram illustrating another example of the screen for the pitching operation, which has the circular parameter area.

Incidentally, although FIG. 36 shows an example in which the strike location area 121 arranged so as to surround the pitch type card group 200 has a rectangular shape (square shape), this is merely a non-limited example. As illustrated in FIG. 37, the strike location area 121 may be formed in an oval shape (circular shape), or as illustrated in FIG. 38, the strike location area 121 may be formed in a diamond shape.

According to the foregoing configuration, irrespectively of the direction of moving the contact object such as the finger, etc., in contact, with the pitch type card 100, it is possible to perform the desired setting operation depending on the distance moved, thereby realizing a simple and clear user interface.

The shape of the pitch type card 100 as the selectable target is not limited to the rectangular shape, and can be formed in an arbitrary shape. For example, in the example of FIG. 38, the pitch type card 100 is formed in a triangle shape in accordance with the shape of the strike location area 121.

Figure 39:
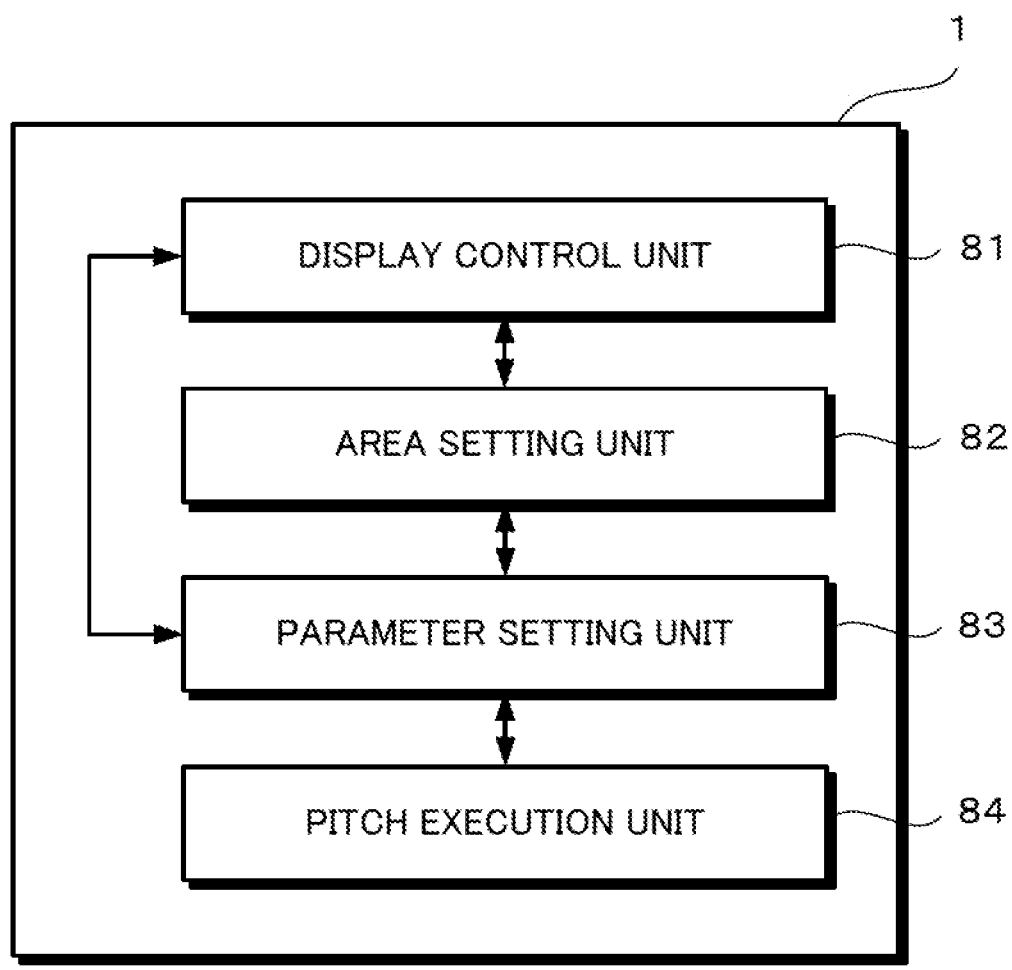
FIG. 39 is a functional block diagram illustrating another example of the major configuration of the game device.

As described, the game device according to the present embodiment manages (controls) the baseball game to be played by selecting with a touch operation, a pitch type to be pitched by a pitcher from a plurality of pitch types displayed on a screen. As a preferable configuration, as illustrated in FIG. 39, the game device 1 comprises the display control unit 81 configured to display the plurality of pitch type cards 100 as an example of the pitch type selectable targets for selecting the plurality of pitch types. Further, as illustrated in FIG. 5, the game device 1 comprises the area setting unit 82 configured to set the band-shaped strike location area 121 corresponding to the strike location parameter and the band-shaped ball location area 122 corresponding to the ball location parameter to be arranged within the screen at positions sandwiching the plurality of pitch type cards 100 in between. The game device 1 further comprises the pitch execution unit 84 configured to confirm the selection of the pitch type corresponding to a specific pitch type card 100 designated as the candidate from the plurality of pitch type cards 100 when performing an operation of moving the specific pitch type card 100 to the strike location area 121 or the ball location area 122, and to set as the pitch location parameter of the pitch type, the strike location or the ball location corresponding to the strike location area 121 or the ball location area 122, and then to start throwing the pitch.

According to the foregoing configuration, the pitching operation including three operation elements of the pitch type selection, the pitch location setting and the starting a pitch can be performed with case using one finger by moving one of the plurality of pitch type cards 100 displayed on the screen to the specific parameter area. The foregoing configuration provides a user interface which is effective, in particular, for the game to be executed in the portable terminal such as the smartphone, etc., with the screen of the limited size.

Figure 26:
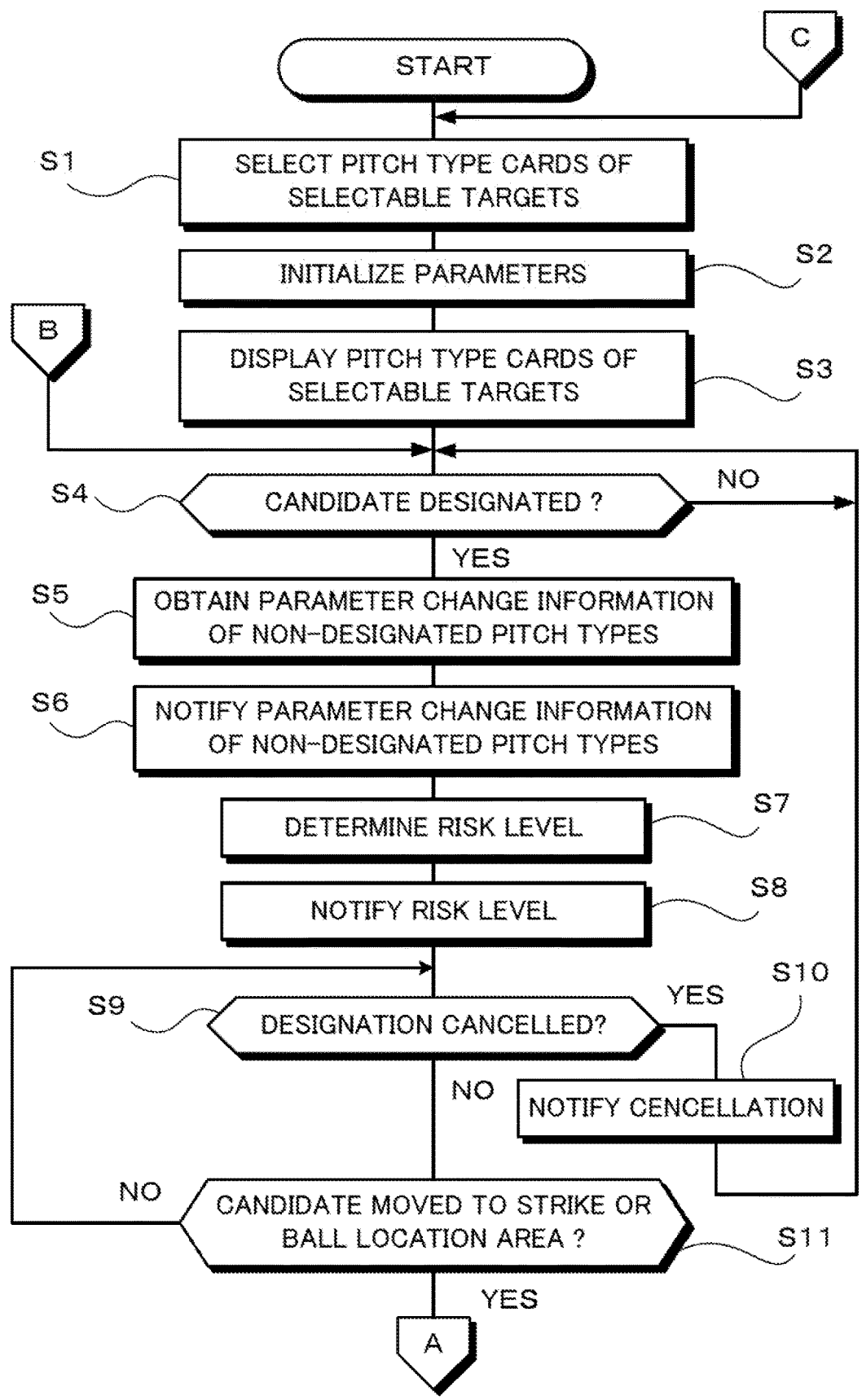
FIG. 26 is a flowchart illustrating an example of an operation of a game server.
Figure 27:
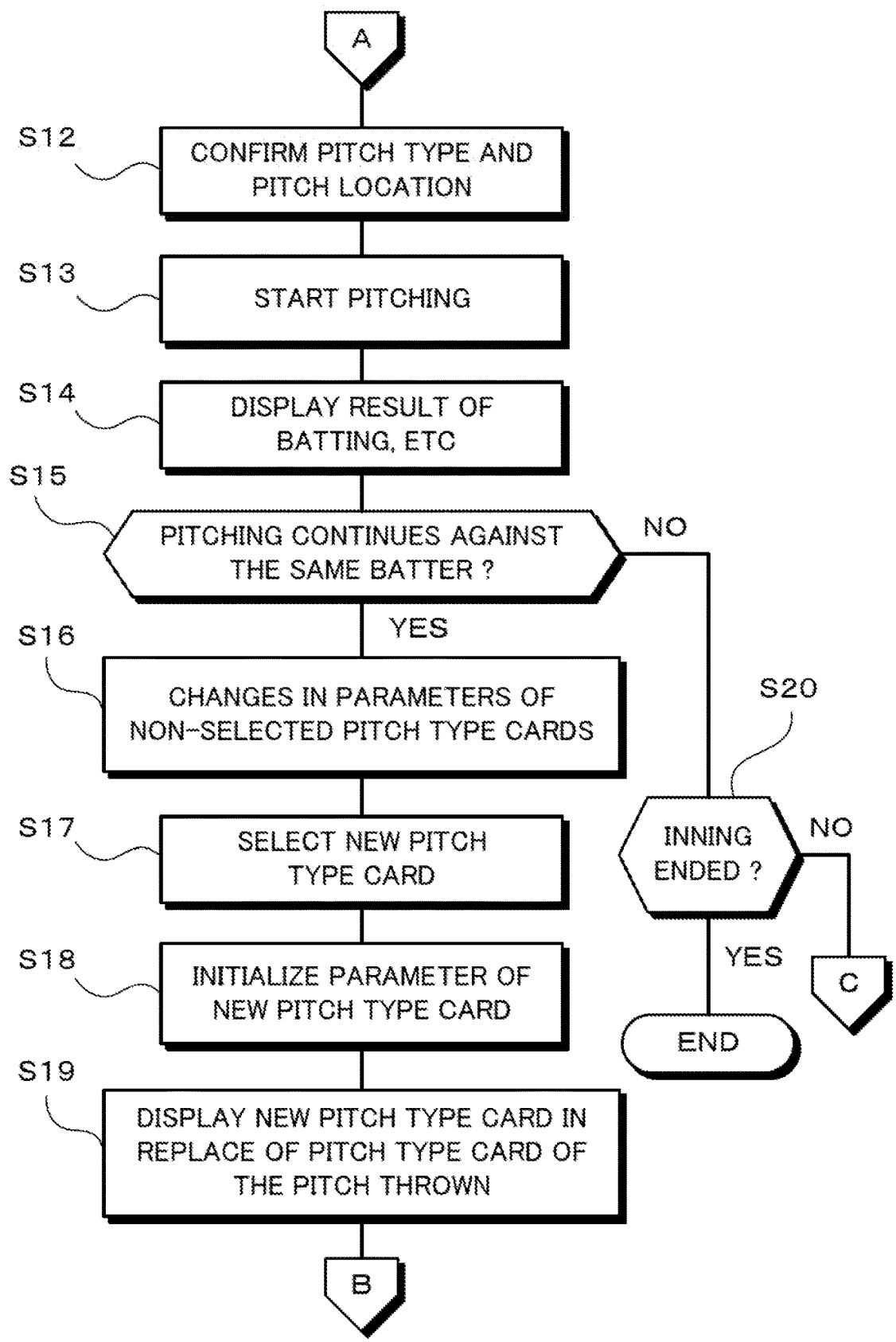
FIG. 27 is a flowchart illustrating another example of the operation of the game server.

Examples of the operations of the game device 1 adopting the user interface of the present embodiment are as described with the flowcharts of FIG. 26 and FIG. 27. In these flowcharts, both or either one of the operation of informing beforehand the changes in parameters of the selectable targets other than the candidate at the time the candidate is designated (S5, S6), and the operation of informing the risk level allowing the batter to make a hit (S7, S8) may be omitted.

It is the needless to mention that all or some of the configurations (units 71 to 76, etc.) of the second embodiment may be combined with the configuration of the game device 1 of the first embodiment.

In the above described baseball game, shown is the example in which the selectable target is the "pitch type", and the plurality of "pitch types" (pitch type cards 100) are displayed on the screen. However, in replace of the "pitch type", a "ball speed", a "ball power", or the like may be adopted for the selectable target. In the case where the selectable target is the "ball speed", for example, it may be configured that the user selects an arbitrary "ball speed" among the plurality of selectable targets, "high", "normal", and "low". For example, in replace of the plurality of pitch type cards 100 (pitch type card group 200) displayed on the screen of FIG. 5, FIG. 28, FIG. 32 to FIG. 34, FIG. 36 to FIG. 38, etc., the plurality of "ball speeds" <(ball speed cards) are displayed. In this case, when the operation of moving the "ball speed" (the ball speed card) of slow to the strike location 121 illustrated in FIG. 5, it can be set that the slow ball is pitched to the strike zone.

In the above, explanations have been given through the application example to the baseball game. However, this is merely a non-limited example. The game device 1 according to the present embodiment is characterized in that when the operation of moving the selectable target selected with the contact operation from among the plurality of selectable targets (items) to one of the plurality of parameter areas, the parameter is set to the selected target corresponding to the parameter area to which the selected target is moved. As long as the game device 1 has this characteristic configuration, the game device 1 of the present embodiment invention is applicable to various games. In the following, an application example to other game is explained.

In the match game rising characters or items, for example, the above described match game using the monster, for the plurality of selectable targets, a plurality of monsters are displayed on the screen. Further, in the game screen, for example, an offensive area and a defensive area are arranged as the plurality of parameter areas so as to sandwich the plurality of monsters. The offensive area is the parameter area in which the monster performs an offensive action. The defensive area is the parameter area in which the monster performs a defensive action. In this example, the user touches an arbitrary monster with his/her finger among the plurality of monsters displayed in the screen, and perform the operation moving the arbitrary monster to the offensive area or the defensive area. When the arbitrary monster is moved to the defensive area, the monster performs an offensive action against an opponent. On the other hand, when the arbitrary monster is moved to the defensive area, the monster performs the defensive action against the offensive action from the opponent.

For the variation of the monster match game, for example, a military offensive area, a naval offensive area, an aerial offensive area and a defensive arm are provided as the plurality of parameter areas, and these parameter areas are arranged so as to surround the plurality of monsters. In this variation, by moving an arbitrary monster from among the plurality of monsters to one of the four parameter areas, it is possible to perform an operation of making the monster to perform an offensive action or a defensive action rising any one of the military force, the naval force and the aerial force.

Furthermore, for example, the present embodiment is also applicable to games in which in replace of the above monsters, such items as weapons, fighters, tanks, offensive or defensive skills (skill cards) are adopted as the selectable target. In these games adopting such characters or items, by applying the configuration of the game device 1 which has been explained through the example of the baseball game, the same function and effect can be exhibited.

[Another Example of the Configuration of the Game Management Device]

In each of the above described embodiments, explanations have been given through the examples in which the game management device is realized by the game device 1 to be operated by the user. However, this is merely a non-limited example, and the game management device may be constituted by a computer such as a server capable of communicating with the terminal device of each user. Alternatively, the game management device may be constituted by a plurality of computers (servers, terminal devices, etc.) which can mutually communicate.

Figure 40:
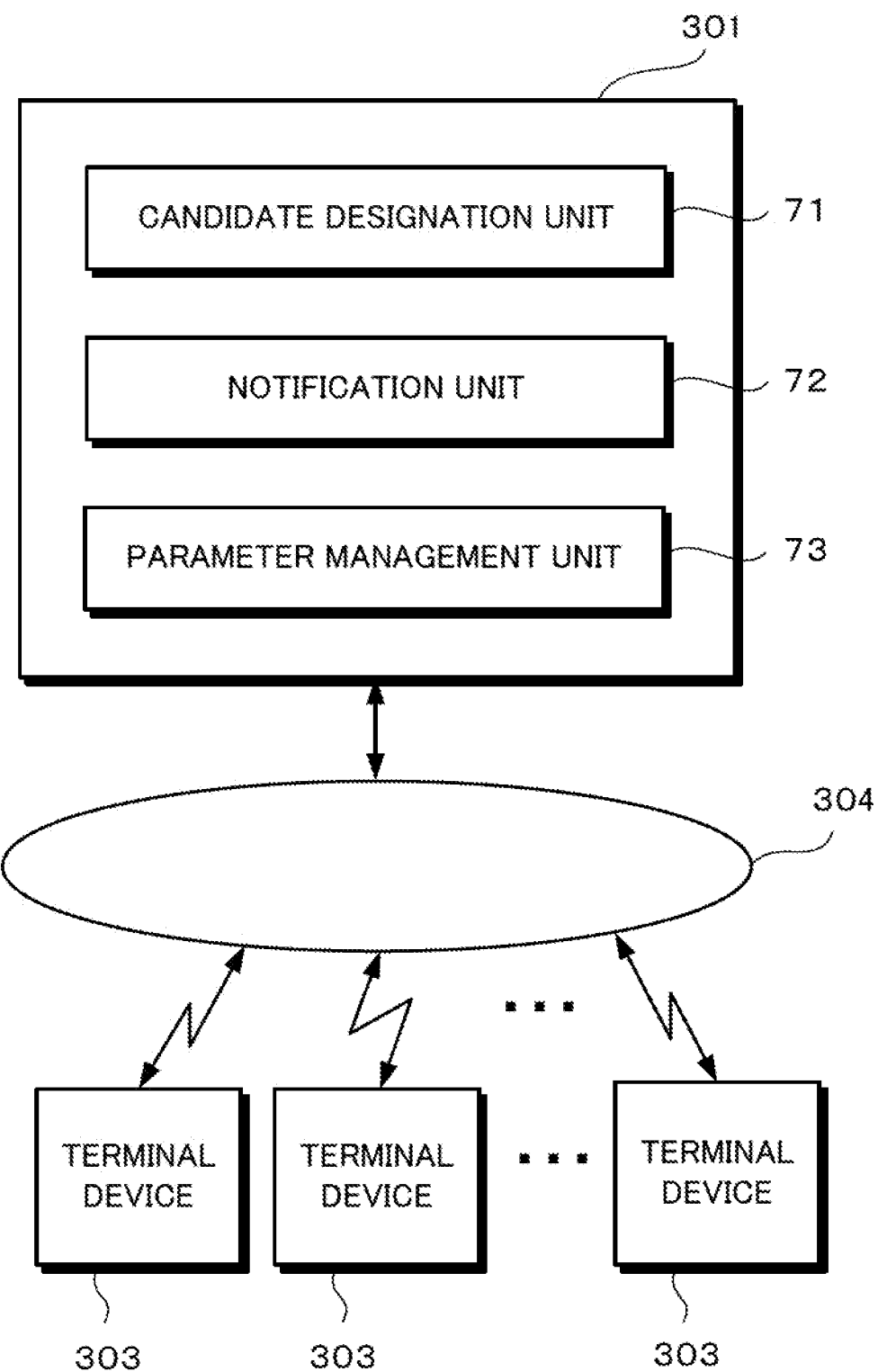
FIG. 40 is a block diagram illustrating a configuration example of a game management device.

An example in which the game management device is constituted by the server is explained. FIG. 40 shows the configuration example of the game system in which the server is incorporated as the game management device. As illustrated in FIG. 40, the game system comprises the game server 301 provided on the network 304 such as internet and the terminal devices 303 of respective users connected so as to allow communications with the game server 301 via a network 304.

In the example of this game system, the game server 301 is configured to accept an access via the network 304 from the terminal device 303 of each user who receives a game service, and manage the game information of each user by accumulating the user's game information in the storage device, and further provide the game service to each user via the network 304.

The game service can be provided by the game server 301 by the configuration wherein the game program (application software) is installed in the game server 301, and the game is executed in the game server 301 according to the inputs for the game operation by the terminal device 303, and the result of execution is transmitted to the terminal device 303 of each user. For example, the game server 301 provides a so-called web browser game to be played by a web browser installed in the terminal device 303 of each user. Alternatively, the game server 301 provides a service of a so-called cloud game, in which game images as a result of executing the game are transmitted to the terminal device 303 of each user, for example, in a streaming format.

Furthermore, it may be configured to install a part of the game program in the terminal device 303, to partially perform the game execution processing also in the terminal device 303.

For the hardware configuration of the game server 301 and the terminal device 303, the general configuration of a computer comprising the CPU, the ROM, the RAM, an auxiliary storage device, the communication interface or the like may he adopted. For the terminal device 303, various terminal which receive the provided game service by connecting to the game server 301 via the network 304 may be adopted such as a smart phone, a mobile phone terminal, a PHS (Personal Handy-phone System) terminal a PDA (Personal Digital assistant) terminal, a personal computer (PC), a tablet computer, a game device having communication function (stationary or portable game device), a multi-functional television receiver (so-called smart TV) having a bidirectional communication function or the like.

In the browser game or the crowd game, the terminal device 303 of the user basically operates as the input/output device having the operation input function and the output function of the game screen, sounds, and the like, and the substantial functions are provided in the game server 1. Therefore, for example, as illustrated in FIG. 40, it may be configured that the game serve 301 comprises the candidate designation unit 71, the notification unit 72, the parameter management unit 73 and the like. Further, although FIG. 40 shows the example in which the gamer server 301 only comprise the above units 71 to 73, all the other or some of the other units 74 to 76 described in the above first embodiment may be included in the constituents of the game server 301. With this configuration, the same functions and effects as those of the above described first embodiment maybe exhibited.

Figure 41:
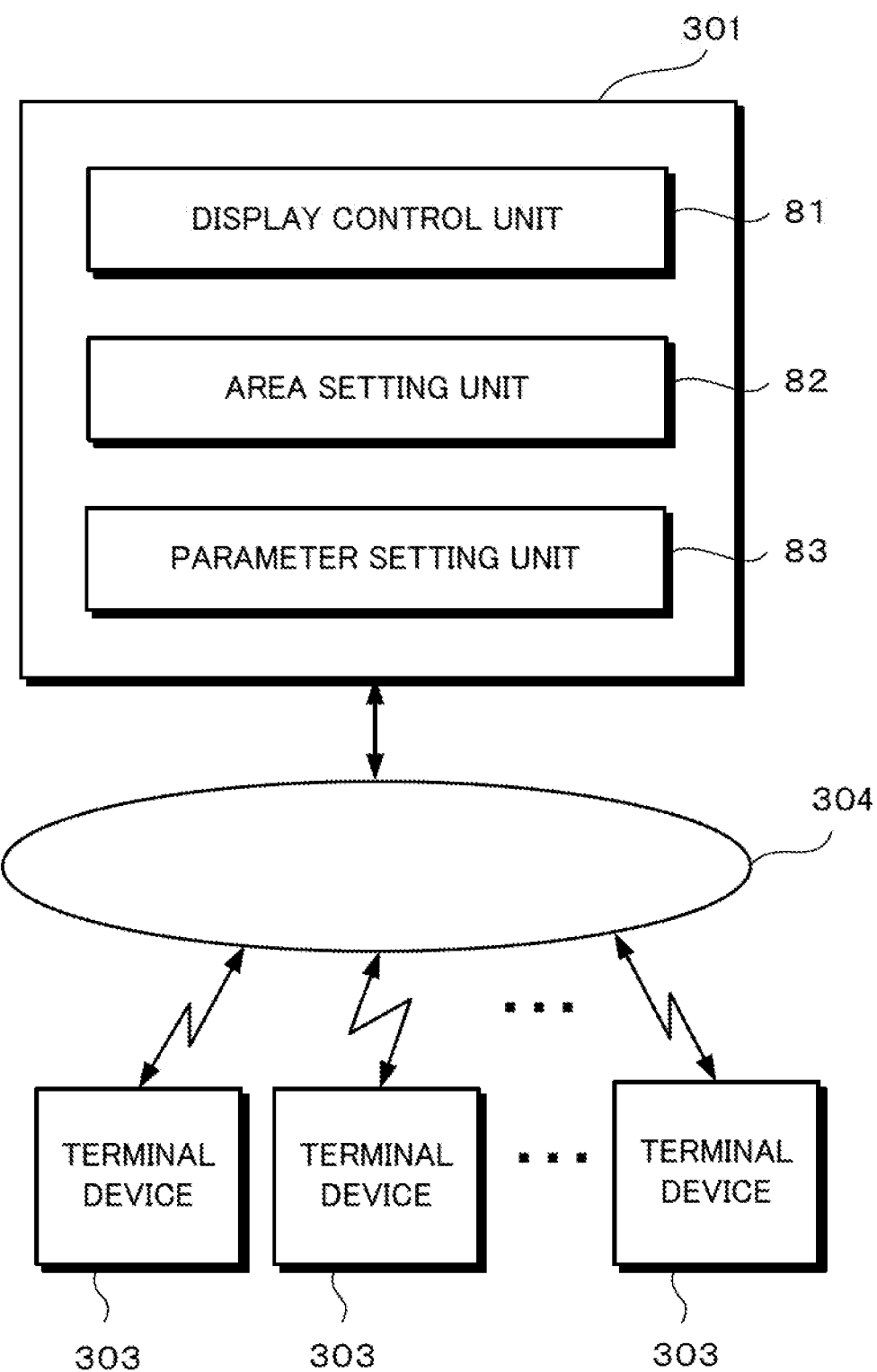
FIG. 41 is a block diagram illustrating another configuration example of the game management device.

Similarly, for example, as illustrated in FIG. 41, it may be configured that the game server 301 comprises the display control unit 81, the area setting unit 82, the parameter setting unit 83 and the like which are explained in the above second embodiment. Further, although FIG. 41 shows the example in which the gamer server 301 only comprise the above units 81 to 83, the pitch execution unit 84 and the like explained in the above second embodiment may be included in the constituents of the game server 301. With this configuration, the same functions and effects as those of the above described second embodiment may be exhibited.

It is the needless to mention that the game server 301 may be configured that the respective configurations (the units 71 to 78 and the like) of the above described first embodiment and the respective configurations (the units 81 to 84 and the like) of the above described second embodiment are combined.

Moreover, the game server 301 (server) and the terminal device 303 can receive and transmit various kinds of data by mutually communicating each other. Both of the game server 301 and the terminal device 303 are information processing devises (computers), each comprising the CPU, the ROM, the RAM, the auxiliary storage device, the communication interface or the like, and haw similar hardware configurations. Therefore, in the game system, comprising the game server 301 and the terminal device 303, it is only required that at least either the game server 301 or the terminal device 303 has all or some of the respective units 71 to 78, 81 to 84, etc., of the game device 1, which have been explained in each of the above embodiments. In this system configuration, similar functions and effects to those of each of the previous embodiments are exhibited.

For the configuration having the storage control function of storing various kinds of information in the storage device, since the storage device itself is not included in the configuration, the storage device may be provided anywhere irrespective of inside or outside the game device or the game system. For instance, the storage device can be the RAM or the auxiliary storage device of the game device, the game server, or the terminal device, or a file server (online storage) or the like separately provided from the game device, the game server or the terminal device.

The respective configurations explained in the above embodiments may be applied by appropriately combining any of the configurations.

Moreover, the computer readable programs according to the present embodiment are recorded in various computer-readable non-transitory recording mediums such as a hard disc, an optical disc (CD-ROM, DVD-ROM or the like), a flexible disk, a semiconductor memory, and the like and the programs are read from the recording medium and executed by the CPU of a computer which constitutes the game management device or the game system. Moreover, the means for providing the program to the computer am not limited to the foregoing recording mediums, and the program can also be provided via a communication network such as the internet or the like.

APPENDIXES

From the foregoing, the present invention will be understood as described below, for example. In the following, although the numerals given in accompanying drawings are illustrated in parentheses for the purpose of easier understanding, the invention is not limited to embodiments illustrated in the drawings.

1) A game management device (1, 301, 303) according to an embodiment of the present invention which manages a game to be played by selecting with a touch operation, a selectable target from a plurality of selectable targets displayed on a screen, includes a display control unit (81) configured to display the plurality of selectable targets on the screen; an area setting unit (82) configured to set a plurality of parameter areas respectively corresponding to the plurality of parameters within the screen; and a parameter setting unit (83) configured that when performing an operation of moving a selected target to one of the plurality of parameter areas, to set a parameter corresponding to the parameter area to which the selected target is moved, the selected target being selected from among the plurality of selectable targets with the contact operation.

The game management device of the foregoing configuration can be constituted, for example, by a computer as the game device capable of performing the contact operation (a smart phone, a mobile phone terminal, a PHS (Personal Handy-phone System), a tablet computer, a game dedicated machine, a personal computer, a multi-functional television receiver or the like). Alternatively, the game management device of the foregoing configuration can be constituted by a computer such as a server which can communicate with the terminal device of each user capable of performing the contact operation. Alternatively, the game management device of the foregoing configuration can be constituted by a plurality of computers (a server, terminal devices, etc.) which can mutually communicate.

2) In the foregoing configuration 1), it is preferable that the plurality of parameter areas include a first parameter area corresponding to a first parameter and a second parameter area corresponding to a second parameters and the area setting unit (82) is configured to arrange the first parameter area and the second parameter area so as to sandwich the plurality of selectable targets in between.

3) In the foregoing configuration 2), it is preferable that the area setting unit (82) arranges the first parameter area and the second parameter area so as to extend from substantially a left end to substantially a right end of the screen.

4) In the foregoing configuration 1), it is preferable that the plurality of parameter areas include a first to an $n^{th}$ parameter areas respectively corresponding to a first to an $n^{th}$ parameters (n is a natural number of 3 or larger); and the area setting unit (82) arranges the first to the $n^{th}$ parameter areas respectively so as to surround the plurality of selectable targets.

5) In the foregoing configuration 4), it is preferable that the plurality of parameter areas further include an $(n+1)^{th}$ parameter area corresponding to an $(n+1)^{th}$ parameter; and the area setting unit (82) sets a region outside the first to the $n^{th}$ parameter areas to the $(n+1)^{th}$ parameter area, the first to the $n^{th}$ parameter areas being arranged so as to surround the plurality of selectable targets.

6) In the foregoing configuration 1), it is preferable that the plurality of parameter areas include a first parameter area corresponding to a first parameter and a second parameter area corresponding to a second parameter and the area setting unit (82) arranges the first parameter area so as to annularly surround the plurality of selectable targets, and arranges the second parameter area outside the first parameter area.

7) In any of the foregoing configurations 1) to 6), it is preferable that the parameter setting unit (83) is configured to confirm a candidate designated by the contact operation from among the plurality of selectable targets when performing an operation of moving the designated candidate to one of the plurality of parameter areas, and further to set a parameter corresponding to the parameter area to which the designated candidate is moved.

8) In any of the foregoing configurations 1) to 7), it is preferable that the game is a baseball game in which a pitcher throws a pitch of a selected pitch type from a plurality of pitch types; the plurality of selectable targets are all or some of the pitch types the pitcher can throw; and the plurality of parameters are parameters on a plurality of pitch locations.

9) A game management device (1, 301, 303) according to another aspect of the present invention for managing a baseball game to be played by selecting with a touch operation, a pitch type to be pitched by a pitcher from a plurality of pitch types displayed on a screen, includes: a display control unit (81) configured to display a plurality of pitch type selectable targets for selecting the plurality of pitch types; an area setting unit (82) configured to set a band-shaped strike location area corresponding to a strike location parameter and a band-shaped ball location area corresponding a ball location parameter to be arranged within the screen at positions sandwiching the plurality of pitch type selectable targets in between; and a pitch execution unit (84) configured to confirm a selection of a pitch type corresponding to a specific pitch type selectable target designated as a candidate from the plurality of pitch type selectable targets when performing an operation of moving the specific pitch type selectable target to either the band-shaped strike zone or the band-shaped ball zone, and to set as a pitch location parameter of the pitch type, a strike location or a ball location corresponding to the strike location area or the ball location area, and then to start throwing a pitch.

10) A game system according to another aspect of the present invention comprises a server (301) and a terminal device (303) which communicates with the sewer (301), and the game system is configured to manage a game to be played by selecting with a touch operation in the terminal device (303), a selectable target from a plurality of selectable targets displayed on a screen, wherein either the server (301) or the terminal device (303) comprises: a display control unit (81) configured to display the plurality of selectable targets on the screen; an area setting unit (82)

configured to set a plurality of parameter arms respectively corresponding to the plurality of parameters within the screen; and a parameter setting unit (83) configured when performing an operation of moving a selected target to one of the plurality of parameter areas, to set a parameter corresponding to the parameter area to which the selected target is moved, the selected target being selected from among the plurality of selectable targets with the contact operation.

11) A recording medium according to yet another aspect of the present invention is a non-transitory computer-readable recording medium having recorded thereon a program for causing a computer to operate as the game management device according to any one of the foregoing configurations.

The embodiments and concrete examples of implementation discussed in the foregoing detailed explanation serve solely to illustrate the technical details of the present invention, which, should not be narrowly interpreted within the limits of such embodiments and concrete examples, but rather may be applied in many variations within the spirit of the present invention, provided such variations do not exceed the scope of the patent claims set forth below.

What is claimed is:

1. A game management device which manages a baseball game to be played by selecting with a contact operation, a selectable target from a plurality of selectable targets displayed on a screen, comprising:
    a display control unit configured to display the plurality of selectable targets on the screen, wherein the plurality of selectable targets are parameters which are each related to a pitching and are each different from a pitching location;
    an area setting unit configured to set a plurality of parameter areas respectively corresponding to a plurality of pitching locations within the screen, the plurality of parameter areas being not areas which include a strike zone;
    a change unit configured to change display state of one of the parameter areas at a time when one of the selectable targets is selected as a selected target by contacting operation, is dragged and moved toward the one of the parameter areas, and is superimposed on the one of the parameter areas; and
    a pitch execution unit configured, when performing a single operation of moving the selected target to the one of the plurality of parameter areas, execute three process steps in response to the single operation of moving, the three process steps include:
        to set a parameter related to the pitching corresponding to the selected target, the selected target being selected from among the plurality of selectable targets with the contact operation,
        to set a parameter of a pitching location corresponding to the parameter area to which the selected target is moved, and then
        to start throwing a pitch,
    wherein the three process steps are executed when the selected target is moved to any one of the plurality of parameter areas, and
    wherein:
        the plurality of parameter areas include a first parameter area corresponding to a first parameter and a second parameter area corresponding to a second parameter; and the area setting unit arranges the first parameter area so as to annularly surround the plurality of selectable targets, and arranges the second parameter area outside the first parameter area.

2. The game management device according to claim 1, wherein:
    the pitch execution unit is configured to confirm as a selected target, a candidate designated by the contact operation from among the plurality of selectable targets when performing an operation of moving the candidate designated to any one of the plurality of parameter areas, and is further configured to set to the selected target as confirmed, a parameter corresponding to the parameter area to which the designated candidate is moved.

3. The game management device according to claim 1, wherein:
    the game is a baseball game in which a pitcher throws a pitch of a selected pitch type from a plurality of pitch types;
    the plurality of selectable targets are all or some of the pitch types the pitcher can throw; and
    the plurality of parameters are parameters on a plurality of pitch locations.

4. A game system comprising a server and a terminal device which communicates with the server, the game system configured to manage a game to be played by selecting with a contact operation in the terminal device, a selectable target from a plurality of selectable targets displayed on a screen, wherein either the server or the terminal device comprises:
    a display control unit configured to display the plurality of selectable targets on the screen, wherein the plurality of selectable targets are parameters which are each related to a pitching and are each different from a pitching location;
    an area setting unit configured to set a plurality of parameter areas respectively corresponding to a plurality of pitching locations within the screen, the plurality of parameter areas being not areas which include a strike zone; and
    a change unit configured to change display state of one of the parameter areas at a time when one of the selectable targets is selected as a selected target by contacting operation, is dragged and moved toward the one of the parameter areas, and is superimposed on the one of the parameter areas;
    a pitch execution unit configured, when performing a single operation of moving the selected target to the one of the plurality of parameter areas, execute three process steps in response to the single operation of moving, the three process steps include:
        to set a parameter related to the pitching corresponding to the selected target, the selected target being selected from among the plurality of selectable targets with the contact operation,
        to set a parameter of a pitching location corresponding to the parameter area to which the selected target is moved, and then
        to start throwing a pitch,
    wherein the three process steps are executed when the selected target is moved to any one of the plurality of parameter areas, and
    wherein:

the plurality of parameter areas include a first parameter area corresponding to a first parameter and a second parameter area corresponding to a second parameter; and the area setting unit arranges the first parameter area so as to annularly surround the plurality of selectable targets, and arranges the second parameter area outside the first parameter area.

5. A non-transitory computer-readable recording medium having recorded thereon a program for causing a computer to operate as the game management device according to claim 1, which causes the computer to function as respective units of the game management device.

\* \* \* \* \*